(12) United States Patent
Shei et al.

(10) Patent No.: US 8,258,440 B2
(45) Date of Patent: Sep. 4, 2012

(54) RETHERMALIZING APPARATUS

(75) Inventors: Steven M. Shei, Fort Wayne, IN (US); Scott E. Willis, Sedalia, MO (US)

(73) Assignee: Duke Manufacturing Co., St. Louis, MS (US)

( * ) Notice: Subject to any disclaimer, the term of this patent is extended or adjusted under 35 U.S.C. 154(b) by 518 days.

(21) Appl. No.: 12/633,611

(22) Filed: Dec. 8, 2009

(65) Prior Publication Data
US 2010/0140252 A1 Jun. 10, 2010

Related U.S. Application Data

(60) Provisional application No. 61/120,641, filed on Dec. 8, 2008, provisional application No. 61/185,905, filed on Jun. 10, 2009.

(51) Int. Cl.
*H05B 3/02* (2006.01)
(52) U.S. Cl. .................. 219/483; 219/486; 219/506
(58) Field of Classification Search .............. 219/483, 219/484, 485, 486, 506, 492, 497
See application file for complete search history.

(56) References Cited

U.S. PATENT DOCUMENTS

| | | | |
|---|---|---|---|
| 1,940,353 A | 12/1933 | Jenkins | |
| 3,573,430 A | 4/1971 | Eisler | |
| 3,608,627 A | 9/1971 | Shevlin | |
| 3,746,837 A | 7/1973 | Frey et al. | |
| 3,978,238 A | 8/1976 | Frey et al. | |
| 4,020,310 A | 4/1977 | Souder, Jr. et al. | |
| 4,102,256 A | 7/1978 | John et al. | |
| 4,303,820 A | 12/1981 | Stottmann et al. | |
| 4,309,592 A | 1/1982 | Le Boeuf | |
| 4,473,739 A | 9/1984 | Scheiwe et al. | |
| 4,481,405 A | 11/1984 | Malick | |
| 4,801,777 A | 1/1989 | Auerbach | |
| 5,368,093 A | 11/1994 | Takehashi | |
| H1623 H | 1/1997 | Reed et al. | |
| 5,802,958 A | 9/1998 | Hermansson | |
| 5,834,737 A | 11/1998 | Hirose et al. | |
| 5,852,967 A | 12/1998 | Fortmann et al. | |
| 5,927,184 A | 7/1999 | Hermansson | |
| 5,938,959 A | 8/1999 | Wang | |
| 6,175,099 B1 | 1/2001 | Shei et al. | |
| 6,262,394 B1 | 7/2001 | Shei et al. | |
| 6,278,093 B1 | 8/2001 | Iacovacci et al. | |
| 6,541,739 B2 | 4/2003 | Shei et al. | |
| 6,601,642 B1 | 8/2003 | Randall | |

(Continued)

FOREIGN PATENT DOCUMENTS
FR 2889029 A1 2/2007
(Continued)

*Primary Examiner* — Toan Le
(74) *Attorney, Agent, or Firm* — Senniger Powers LLP

(57) ABSTRACT

Apparatus for and methods of rethermalizing a package of refrigerated or frozen food are disclosed. In general, heating mechanisms are brought into conductive heat transfer contact with the package of food and operated for a duration of rethermalization time to rethermalize the package of food by heating the food to a rethermalized temperature, and then, if desired, to hold the rethermalized package of food at a desired holding temperature for a duration of holding time. The rethermalization time can be relatively short (e.g., thirty minutes or less), and the holding time can range from a very short period of time to a very long period of time (e.g., four, six, eight or more hours) without significant loss of food quality. Other features of the apparatus and methods are disclosed.

21 Claims, 66 Drawing Sheets

U.S. PATENT DOCUMENTS

| | | |
|---|---|---|
| 6,619,189 B1 * | 9/2003 | Tippmann et al. ............ 99/330 |
| 7,011,797 B2 | 3/2006 | Bakke |
| 7,045,751 B2 | 5/2006 | Kim |
| 7,105,779 B2 | 9/2006 | Shei |
| 7,227,102 B2 * | 6/2007 | Shei ............................ 219/394 |
| 7,328,654 B2 | 2/2008 | Shei |
| RE40,290 E | 5/2008 | Shei et al. |
| 2005/0252905 A1 | 11/2005 | De'Longhi |
| 2006/0081627 A1 | 4/2006 | Shei et al. |
| 2006/0191918 A1 | 8/2006 | Ashford et al. |
| 2008/0023462 A1 | 1/2008 | Shei et al. |

FOREIGN PATENT DOCUMENTS

| | | |
|---|---|---|
| JP | 58107162 A | 6/1983 |
| JP | 7213431 | 8/1995 |
| JP | 2006333841 A | 12/2006 |
| JP | 2007061245 A | 3/2007 |
| JP | 2007317507 A | 12/2007 |

* cited by examiner

FIG. 4
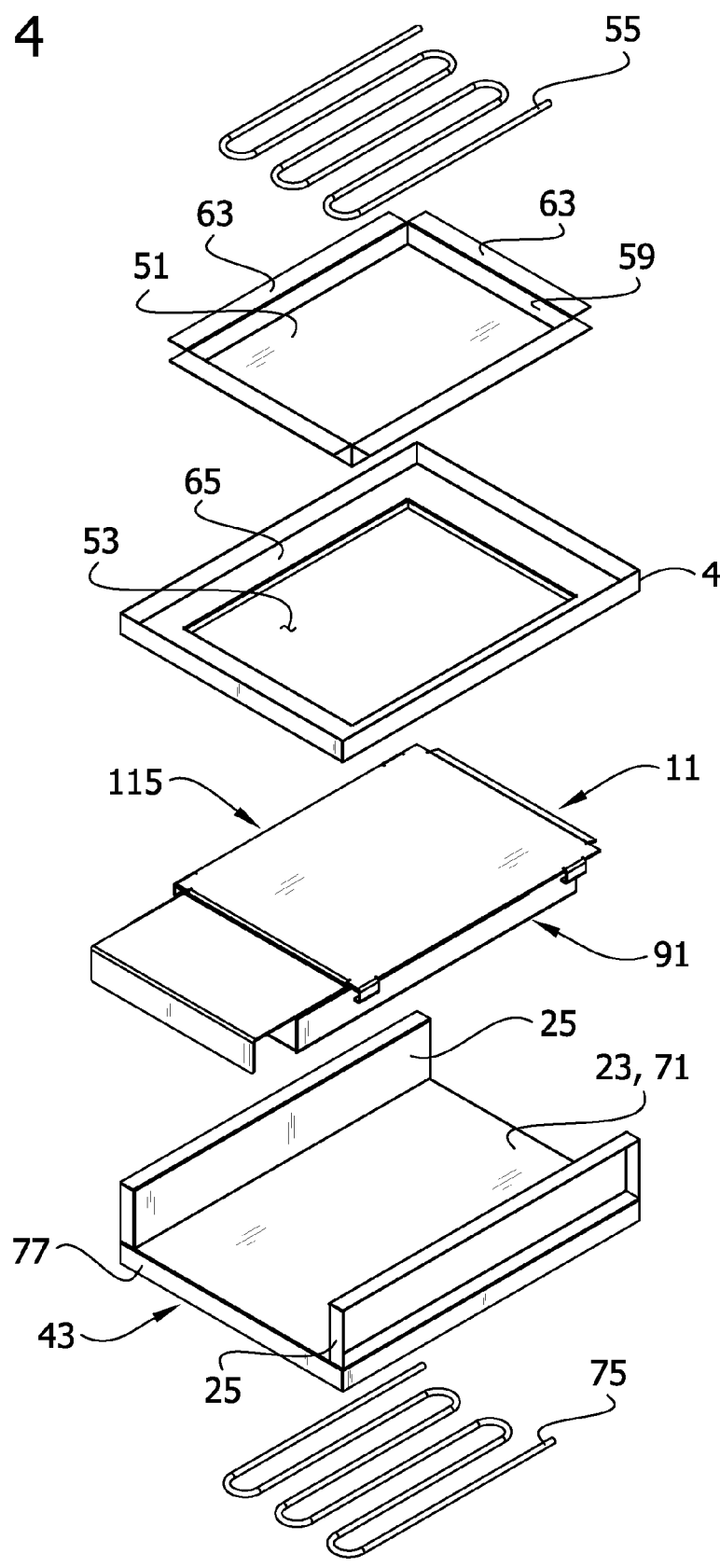
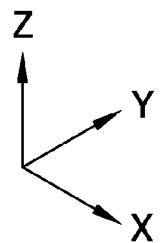

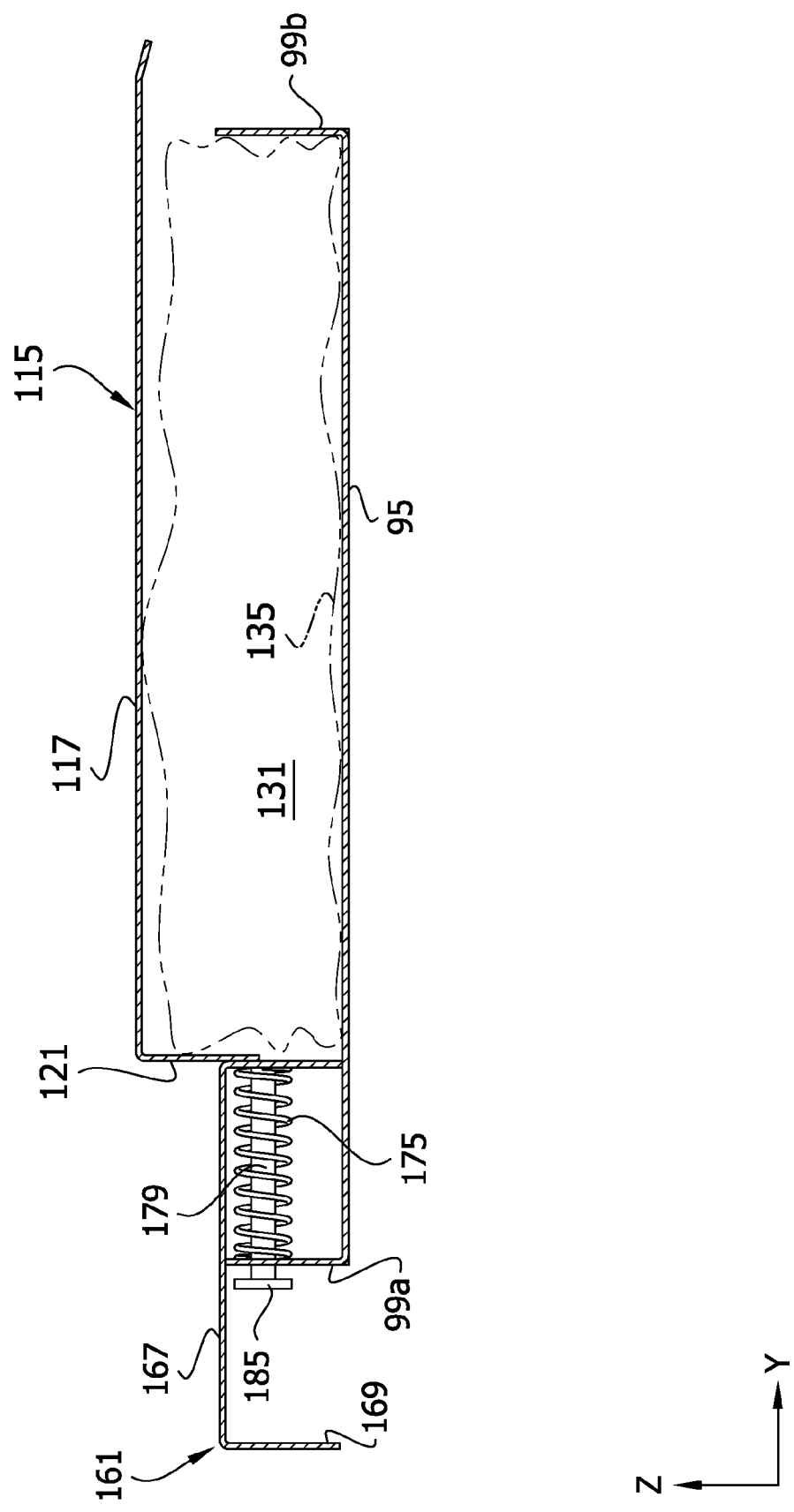

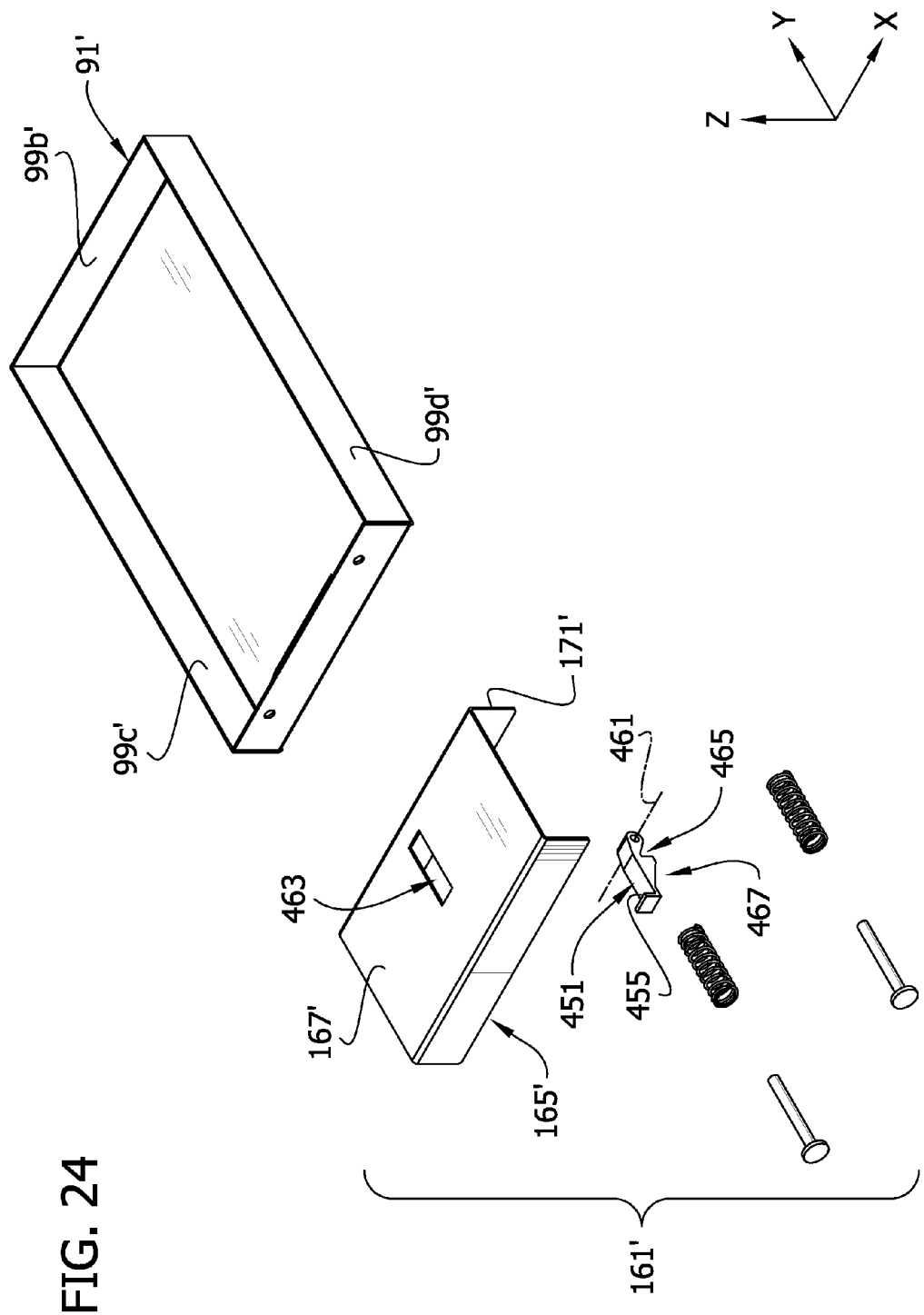

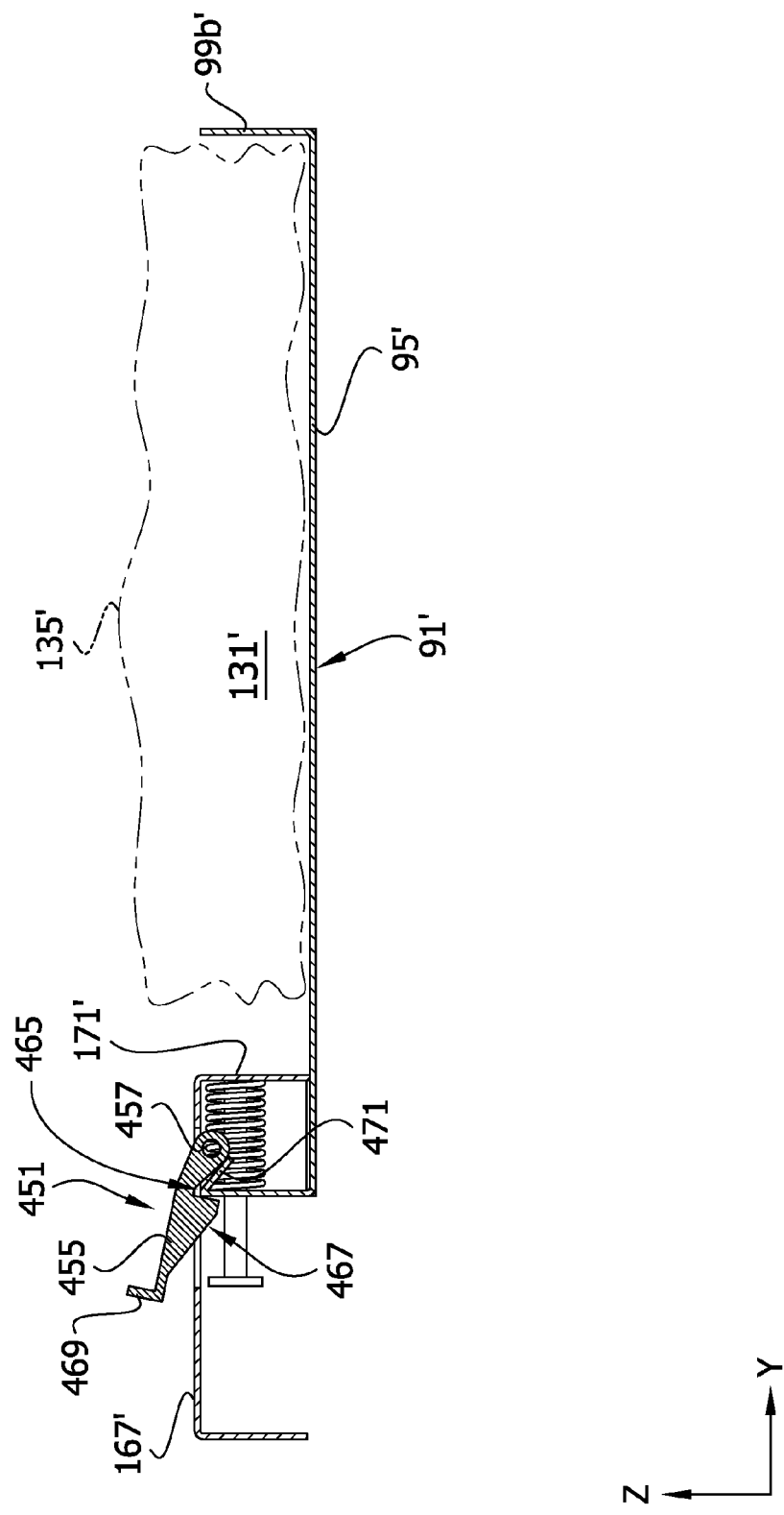

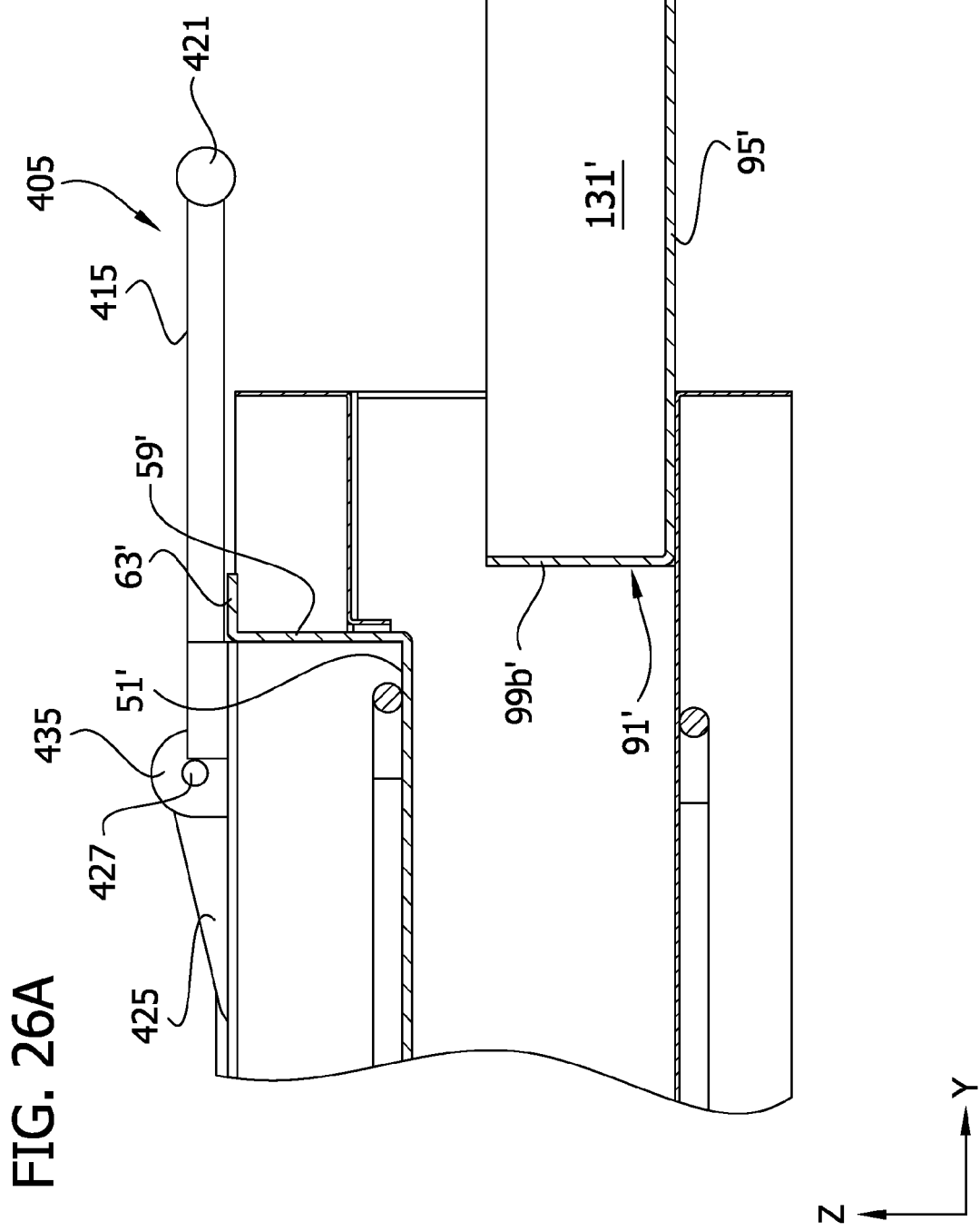

FIG. 27
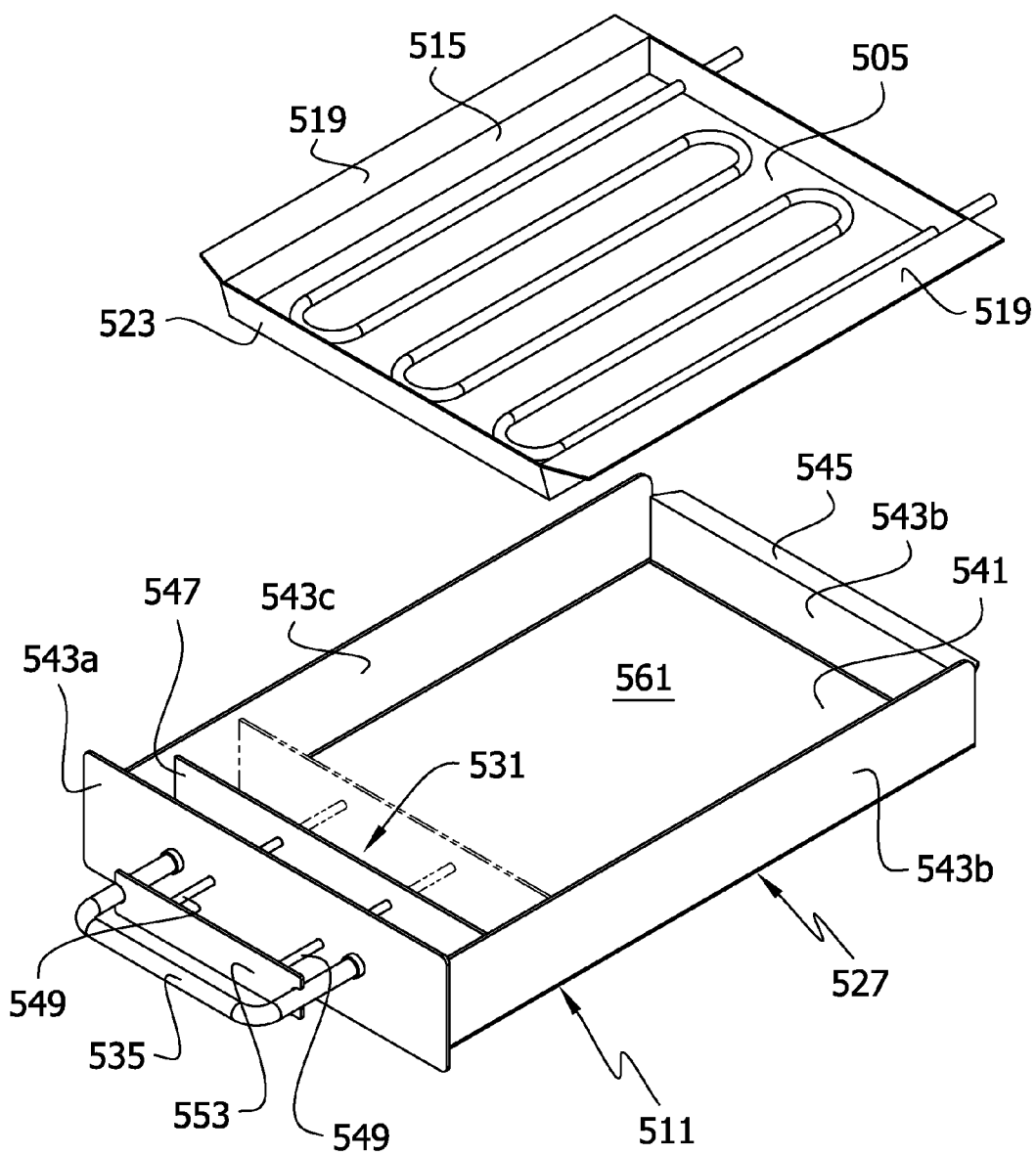
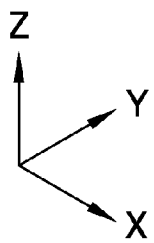

FIG. 37
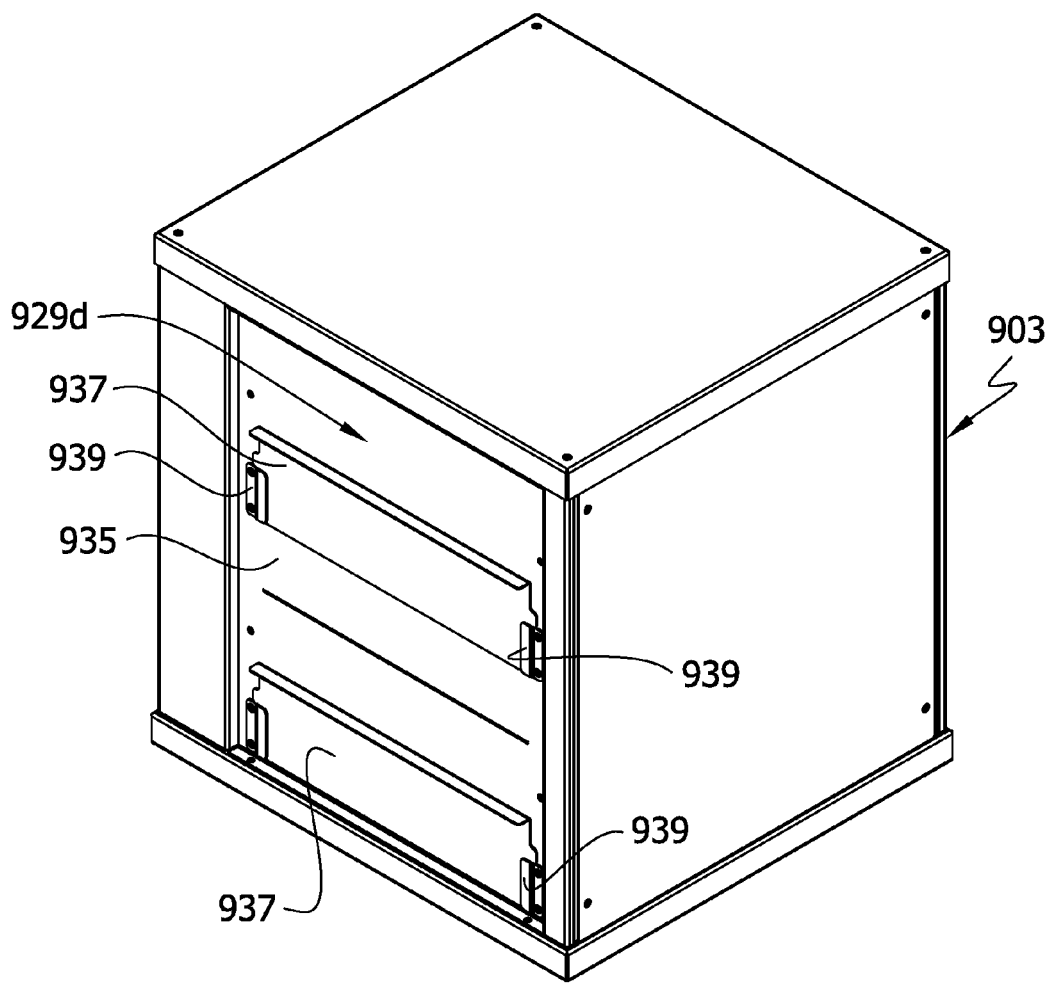
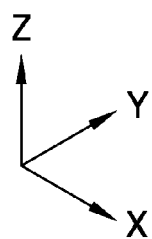

FIG. 38
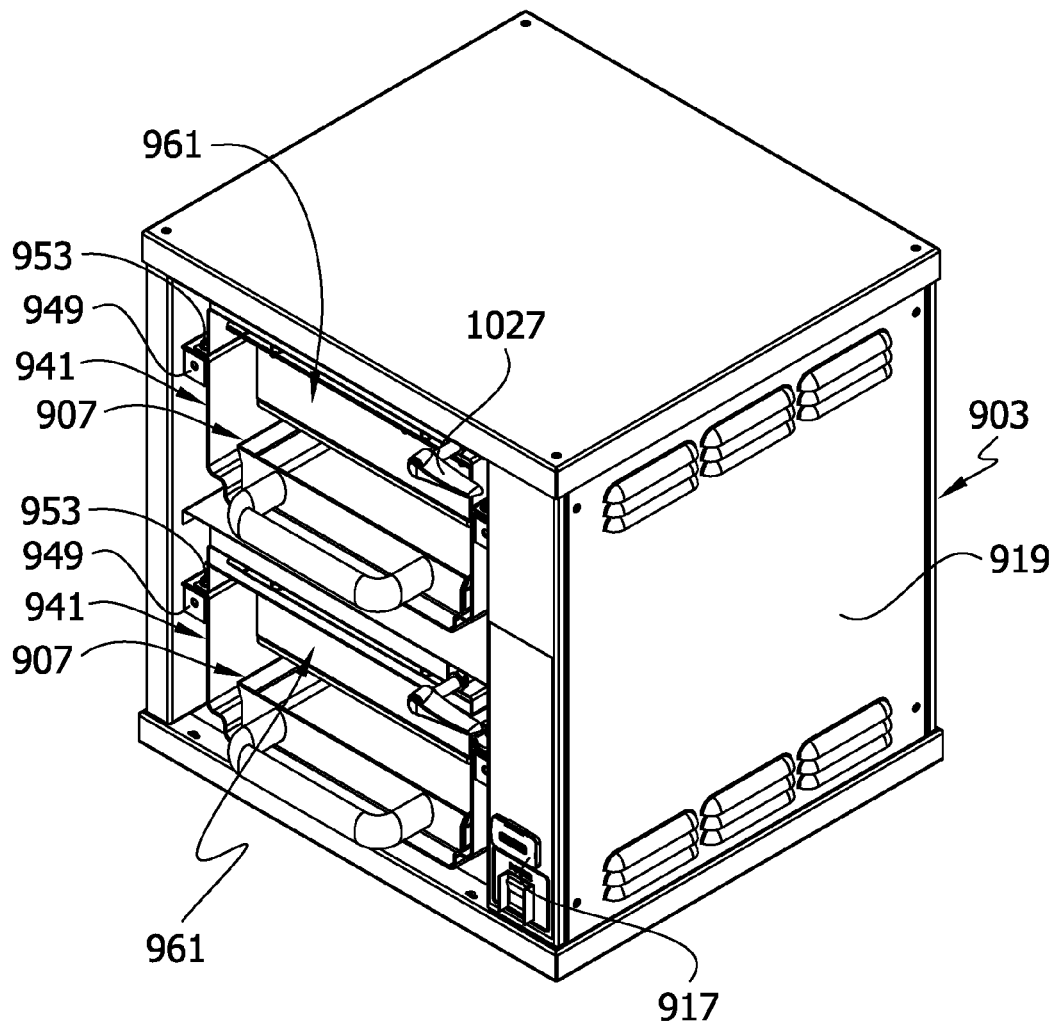
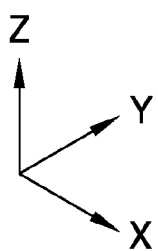

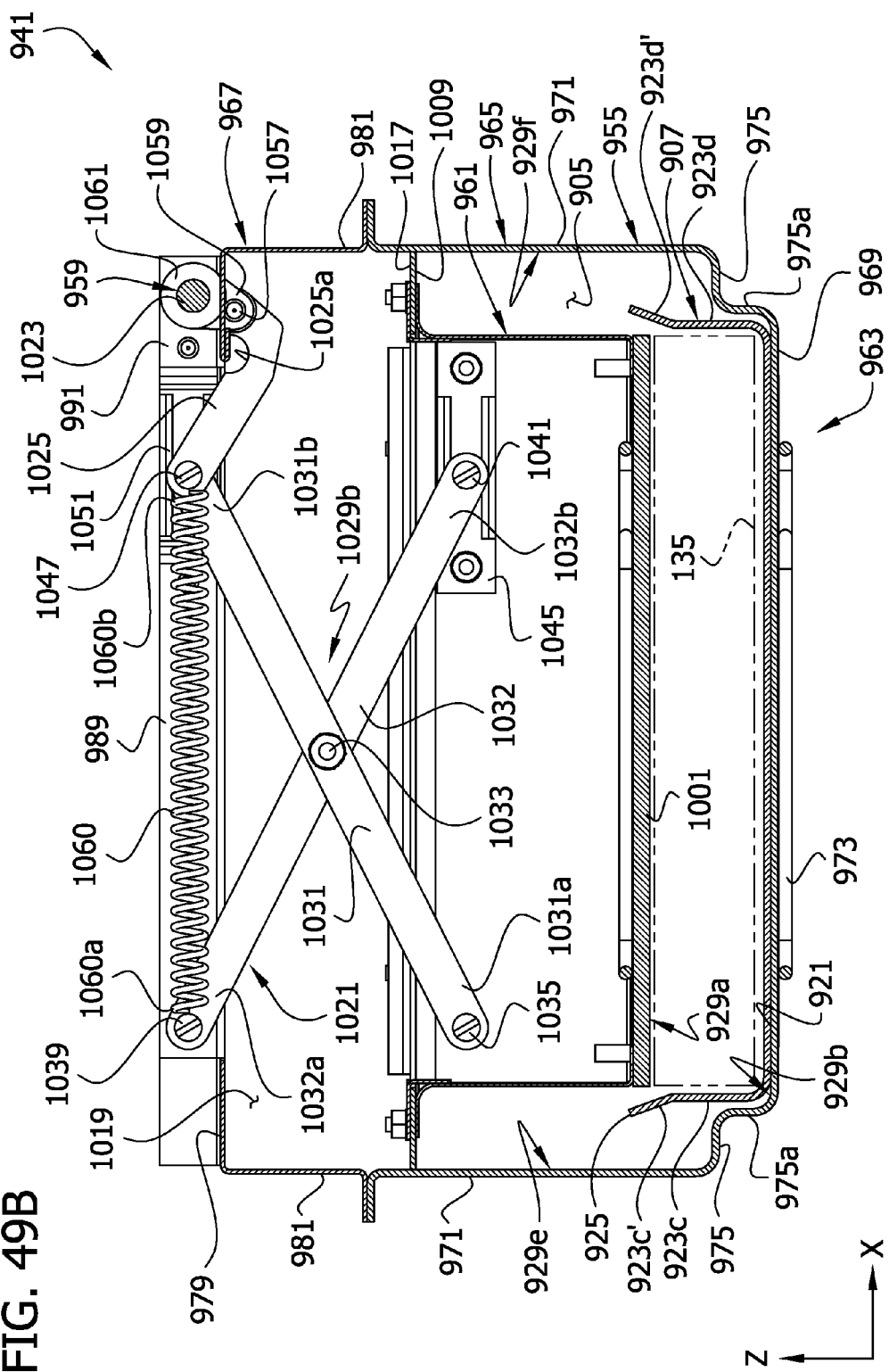

RETHERMALIZING APPARATUS

FIELD OF THE INVENTION

The present invention generally relates to food serving equipment and, more particularly, to apparatus for cooking of food or for reheating of pre-cooked food to be served.

BACKGROUND OF THE INVENTION

In the fast-food industry, pre-cooked food is typically packaged in flexible material (e.g., plastic bags or film) and then frozen or refrigerated to be preserved until needed. To be prepared for consumption, the food must be heated or "rethermalized." The food may then be held at a proper temperature until it is finally served.

Various techniques are used to rethermalize the food before it is served, such as by water bath, steam, convection with steam, forced convection, natural convection, infrared, conduction, and microwave. However, each of these techniques has certain drawbacks. In a water bath, for example, packages of frozen or refrigerated food are placed in a reservoir of heated water. This operation requires water supply lines, drain lines, input of substantial energy to heat the water and maintain it at a high temperature, venting of steam and water vapor from the reservoir, and regular cleaning of the reservoir. If a bag containing pre-cooked food breaks or leaks in the water bath, the water becomes contaminated and requires personnel to drain, refill, and reheat the water bath.

Two general disadvantages of existing rethermalization techniques are the inability to impart unique thermal treatment to separate bags of food, and the inability to accomplish even or uniform thermal treatment throughout the thickness of the food. In techniques such as water bath, steam, and various forms of convection, food bags are treated in a common chamber. Because the bags are not treated in individual compartments, they cannot be heated to different temperatures or at different rates. Rethermalization techniques such as infrared and microwave do not uniformly rethermalize food because infrared penetration depths vary significantly for various foods, and microwaves are not absorbed well by frozen food.

Another disadvantage of some existing rethermalization techniques, such as infrared, is that the pre-cooked food must be removed from its packaging and placed in a separate container before being re-heated. This process is inefficient and can reduce the amount of time the food can be held in a high-quality state prior to serving.

There is a need, therefore, for an improved process for rethermalizing food.

SUMMARY OF THE INVENTION

In one embodiment, this invention is directed to a method of rethermalizing a package of refrigerated or frozen food and then holding the package of food at a selected holding temperature for a duration of holding time. The package of food comprises a portion of food contained in a flexible packaging material. The method comprises placing the package of food between opposing first and second heating mechanisms, moving the first heating mechanism toward the second heating mechanism to bring the heating mechanisms into conductive heat transfer contact with respective first and second surfaces of the package, and operating the first and second heating mechanisms in a rethermalizing mode for a duration of rethermalizing time during which the food is heated to a rethermalized temperature. After the food has reached the rethermalized temperature, the first and second heating mechanisms are operated in a holding mode while the heating mechanisms are in conductive heat transfer contact with the package to hold the food at a selected holding temperature for a duration of holding time. An electrical input/output device is operated to display information relating to the operation of the heating mechanisms in the rethermalizing and holding modes.

In another aspect, this invention is directed to apparatus for rethermalizing a package of refrigerated or frozen food and then holding the food in the package at a selected holding temperature for a duration of holding time. The package of food comprises a portion of food contained in a flexible packaging material. The apparatus comprises opposing first and second heating mechanisms. The first heating mechanism is movable toward the second heating mechanism to bring the heating mechanisms into conductive heat transfer contact with respective first and second surfaces of the package. The apparatus further comprises an electrical device for operating the first and second heating mechanisms. A tangible computer-readable storage medium has instructions for operating the first and second heating mechanisms in a rethermalizing mode for a duration of rethermalizing time during which the food is heated to a rethermalized temperature, and then in a holding mode while the heating mechanisms are in conductive heat transfer contact with the package to hold the food at a selected holding temperature for a duration of holding time. A controller is connected to the storage medium for executing the instructions and connected to the electrical device for controlling the electrical device. The apparatus also comprises an input/output device for inputting and displaying information relating to the operation of the heating mechanisms in the rethermalizing and holding modes.

In another aspect, this invention is directed to a method of rethermalizing a package of refrigerated or frozen food. The package of food comprises a portion of food contained in a flexible synthetic resin packaging material having a softening temperature. The method comprises placing the package of food between opposing first and second heating mechanisms, moving the first heating mechanism toward the second heating mechanism to bring the heating mechanisms into conductive heat transfer contact with respective first and second surfaces of the package, and operating the first and second heating mechanisms for a duration of rethermalizing time during which the food is heated to a rethermalized temperature. The duration of rethermalizing time comprises a first interval during which the first heating mechanism is heated to a first rethermalizing temperature greater than said softening temperature and a second interval following the first interval during which the first heating mechanism is heated to a second rethermalizing temperature less than said softening temperature but greater than said rethermalized temperature.

In another aspect, this invention is directed to apparatus for rethermalizing a package of refrigerated or frozen food. The package of food comprises a portion of food contained in a flexible synthetic resin packaging material having a softening temperature. The apparatus comprises opposing first and second heating mechanisms. The first heating mechanism is movable toward the second heating mechanism to bring the heating mechanisms into conductive heat transfer contact with respective first and second surfaces of the package. An electrical device operates the first and second heating mechanisms. A tangible computer-readable storage medium has instructions for operating the first and second heating mechanisms for a duration of rethermalizing time during which the food is heated to a rethermalized temperature. The duration of rethermalizing time comprises a first interval during which the first heating mechanism is heated to a first rethermalizing temperature greater than the softening temperature and a second interval following the first interval during which the first heating mechanism is heated to a second rethermalizing temperature less than the softening temperature but greater than the rethermalized temperature. The apparatus further comprises a controller connected to the storage medium for executing the instructions and connected to the electrical device for controlling the electrical device.

In another aspect, this invention is directed to a method of rethermalizing a package of refrigerated or frozen food. The package of food comprises a portion of food contained in a packaging material. The method comprises placing the package of food between opposing first and second heating mechanisms, moving the first heating mechanism toward the second heating mechanism to bring the heating mechanisms into conductive heat transfer contact with respective first and second surfaces of the package, and operating the first and second heating mechanisms for a duration of rethermalizing time during which the food is heated to a rethermalized temperature. The duration of rethermalizing time comprises a first interval during which the first heating mechanism is heated to a first rethermalizing temperature at least 20% greater than said rethermalized temperature, and a second interval following the first interval during which the first heating mechanism is heated to a second rethermalizing temperature less than said first rethermalizing temperature but greater than said rethermalized temperature.

In another aspect, this invention is directed to a method of rethermalizing food comprising placing a package of refrigerated or frozen food in a tray of thermally conductive material having a bottom wall, side walls and an open top, moving the modular unit into a compartment of a cabinet to a position in which the bottom wall of the modular unit is in conductive heat transfer contact with a lower heating mechanism in the compartment, and moving an upper heating mechanism in the compartment into conductive heat transfer contact with an outer upper face of the package in the open-top tray.

In another aspect, this invention is directed to apparatus for rethermalizing a package of frozen or refrigerated food. The apparatus comprises a frame including a bottom wall and two side walls partially defining a compartment for receiving the package. A heating mechanism defines an upper boundary of the compartment, and the heating mechanism is movable between a raised position and a lowered position to bring the heating mechanism into conductive heat transfer contact with the package. An actuating device on the frame is connected to the heating mechanism and operable to move the heating mechanism between the raised and lowered positions. A gasket between the side walls of the frame and the heating mechanism is in sealing contact with the side walls and the heating mechanism to isolate a space above the gasket from the compartment.

In another aspect, this invention is directed to apparatus for rethermalizing a package of frozen or refrigerated food. The apparatus comprises a frame including a bottom wall and two side walls partially defining a compartment for receiving the package. A heating mechanism defines an upper boundary of the compartment, and the heating mechanism is movable between a raised position and a lowered position to bring the heating mechanism into conductive heat transfer contact with the package. An actuating device on the frame is connected to the heating mechanism and operable to move the heating mechanism between the raised and lowered positions. The actuating device comprises a scissors mechanism that is expansible and contractible to move the heating mechanism between the raised and lowered positions.

In another aspect, this invention is directed to apparatus for rethermalizing a package of frozen or refrigerated food. The apparatus comprises a cabinet having at least one cavity therein and a heating module mounted within the cavity and being removable from the cavity. The heating module comprises a frame partially defining a compartment for receiving the package and a heating mechanism defining an upper boundary of the compartment. The heating mechanism is movable between a raised position and a lowered position to bring the heating mechanism into conductive heat transfer contact with the package.

In another aspect, this invention is directed to apparatus for rethermalizing a package of frozen or refrigerated food. The apparatus comprises at least three thermally conductive walls defining a cavity for receiving the package. The cavity has a width along an X-axis, a length along a Y-axis, and a height along a Z-axis. A first wall of the at least three walls is movable along a first axis of the X, Y and Z-axes, and a second wall of the at least three walls is movable along a second axis of the X, Y and Z-axes different from the first axis. The first and second walls are movable to bring the at least three walls into conductive heat transfer contact with an outside surface of the package. A heating system is provided for heating the at least three walls.

In another aspect, this invention is directed to apparatus for rethermalizing a package of frozen or refrigerated food which is adapted to change shape during rethermalization. The apparatus comprises a top wall, a bottom wall and at least one side wall defining a cavity for receiving the package. The walls are thermally conductive. The at least one side wall and either the top wall or the bottom wall are biased for movement toward the interior of the cavity for maintaining the three walls in conductive heat transfer contact with the outside surface of the package as the package changes shape during rethermalization.

In another aspect, this invention is directed to a method of rethermalizing food comprising placing a package of refrigerated or frozen food in a cavity of a modular unit, the cavity being defined by at least three thermally conductive walls. The method further comprises, manipulating the modular unit to bring the three walls into conductive heat transfer contact with an outside surface of the package, and heating the three walls to rethermalize the food in the package.

In another aspect, this invention is directed to apparatus for rethermalizing a package of frozen or refrigerated food. The apparatus comprises two opposing vertical side walls and a bottom wall. The side and bottom walls are of a thermally conductive material and define a cavity for receiving the package. An opening is provided for insertion of the package into the cavity. An actuating mechanism is operable for moving at least one of the side walls relative to the other of the side walls between a loading position in which the side walls are spaced sufficiently far apart for insertion of the package into the cavity through the opening, and a rethermalizing position in which the side walls are spaced closer together for conductive heat transfer contact with an outside surface of the package. A heating system is provided for heating the side and bottom walls.

Other objects and features will be in part apparent and in part pointed out hereinafter.

BRIEF DESCRIPTION OF THE DRAWINGS

FIG. 4 is an exploded perspective of components of a heating system and the modular unit of FIGS. 2 and 3;

FIGS. 6A-6C are sequential views illustrating one method of loading packaged food into the modular unit;

FIG. 24 is an exploded perspective of components of the modular unit;

FIGS. 25A-25C are sequential views illustrating one method of loading packaged food into the modular unit;

FIGS. 26A-26B are sequential sectional views illustrating one method of loading the modular unit into the compartment, the section of FIG. 26A being taken along line 26A-26A in FIG. 20 and the section of FIG. 26B being taken along line 26B-26B shown in FIG. 19;

FIG. 27 is a perspective of another embodiment of an upper heater plate and a modular unit of the present invention having a U-shaped handle, the upper heater plate being shown removed from a compartment;

FIG. 37 is a back perspective of the cabinet of FIG. 36;

FIG. 38 is a front perspective of the cabinet, a front panel of the cabinet being removed;

FIG. 49B is a view similar to FIG. 49 but showing an optional spring element biasing the heating mechanism in the lowered position;

Corresponding reference characters indicate corresponding parts throughout the drawings.

DETAILED DESCRIPTION

Figure 1:
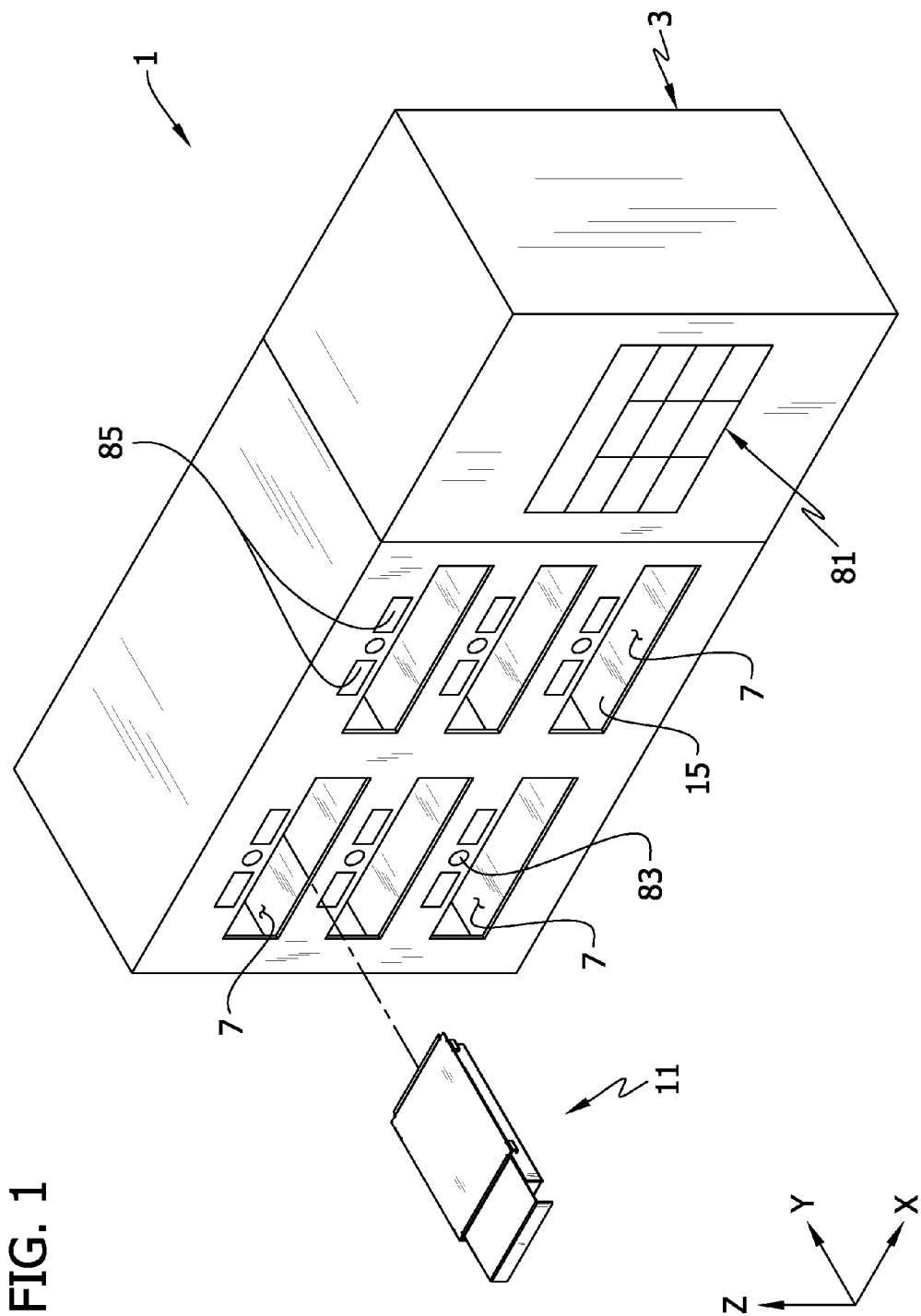
FIG. 1 is a perspective of one embodiment of apparatus of this invention for rethermalizing frozen or refrigerated food contained in flexible packaging.

Referring now to the drawings, and more particularly to FIG. 1, a first embodiment of rethermalizing apparatus of the present invention is designated in its entirety by the reference numeral 1. In general, the apparatus comprises a cabinet 3 having one or more compartments 7 each of which is sized for receiving one or more modular units 11 containing food to be rethermalized, i.e., heated to a temperature suitable for serving. A heating system 15 is provided in each compartment for heating a respective modular unit or units 11 in the compartment.

Figure 2:
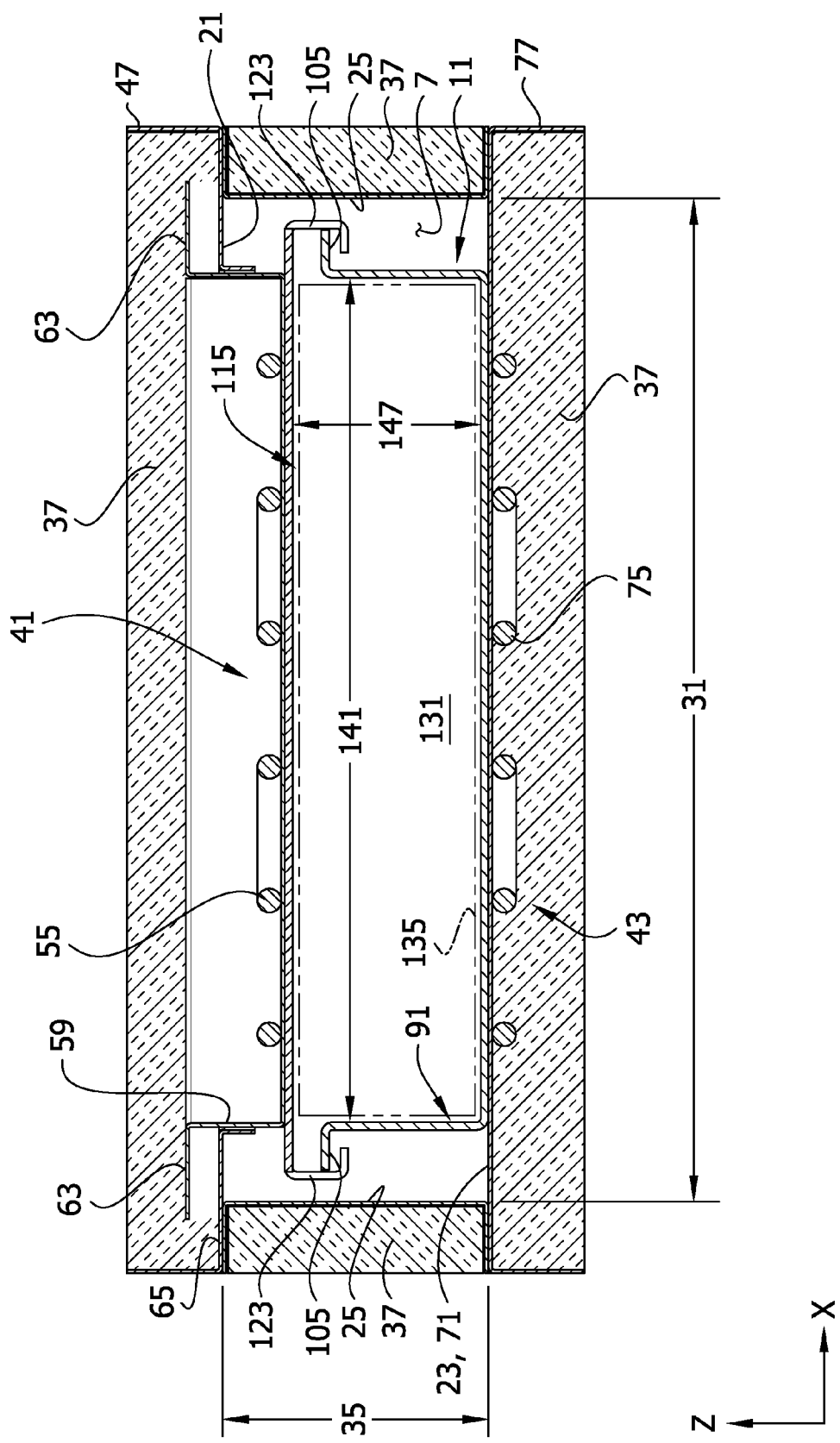
FIG. 2 is an enlarged section showing a modular unit received in a compartment of a cabinet of the apparatus of FIG. 1, the section being taken widthwise of the compartment.
Figure 3:
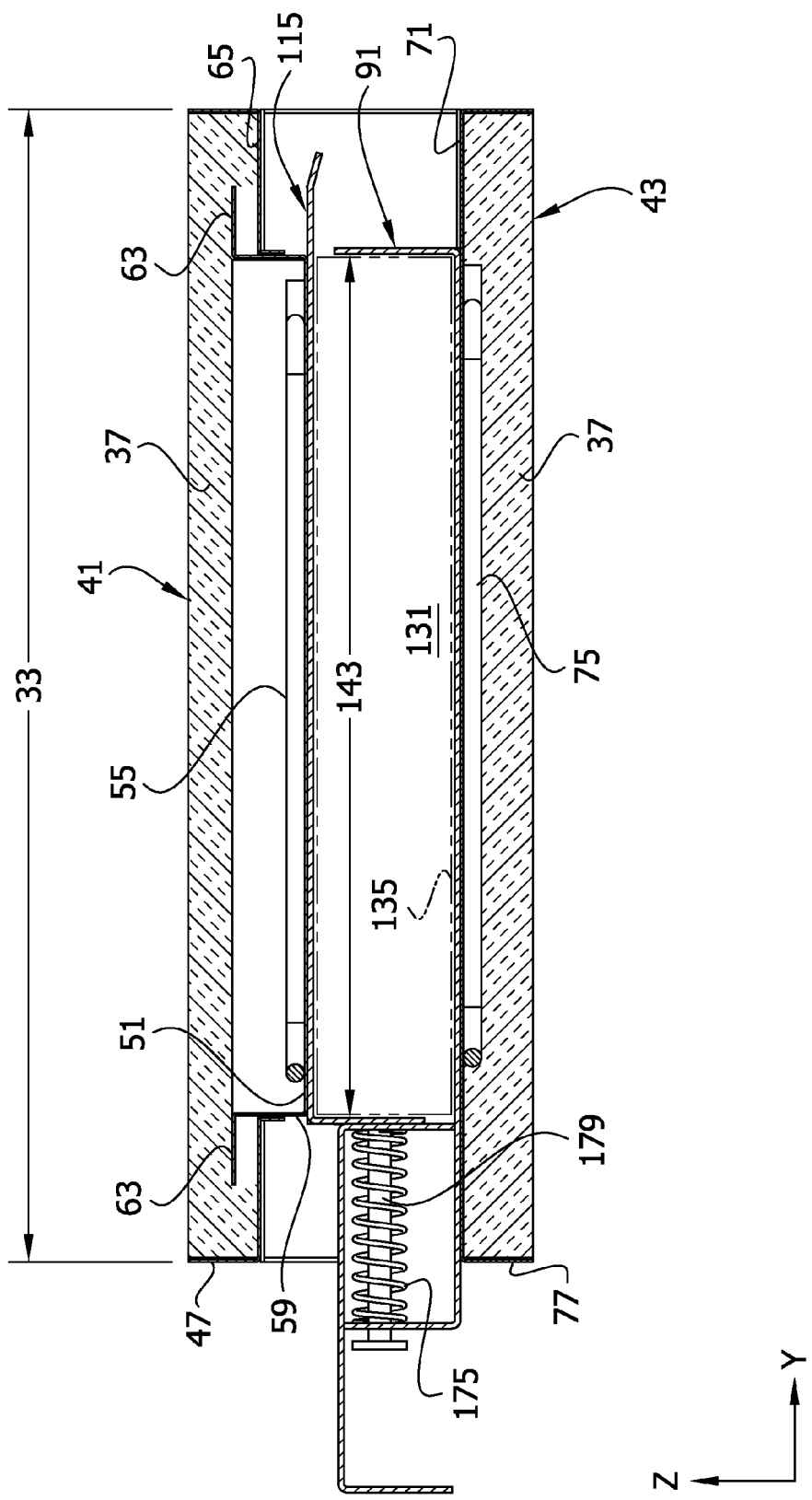
FIG. 3 is a view similar to FIG. 2 but taken lengthwise of the compartment.

In the embodiment of FIG. 1, the cabinet has several rows of compartments 7, and each compartment is bounded by an upper surface 21, a bottom surface 23, and opposite side surfaces 25. Each compartment 7 has a width 31 along an X-axis, a length 33 along a Y-axis, and a height 35 along a Z-axis (FIGS. 2 and 3). Desirably, the front and back of each compartment 7 are open for "pass-through" loading and unloading, but the back of the compartment could be closed without departing from the scope of the invention. If desired, the front and/or back of each compartment 7 can be closed by a door(s). In FIG. 1, each compartment 7 is sized for receiving only one modular unit 11, i.e., each compartment is sized such that only one modular unit can fit in the compartment. Moreover, thermal insulation generally indicated at 37 (FIGS. 2 and 3) preferably lines each compartment 7. As a result, each modular unit 11 is substantially thermally isolated from the other units, and food flavor from the food in one modular unit is substantially prevented from transferring to the food in another unit. It will be understood that the number of compartments may vary, and that one or more of the compartments may be sized to contain any number (one, two, three, etc.) of modular units.

The heating system 15 in each compartment 7 comprises a first heating mechanism 41 adjacent the top of the compartment and a second heating mechanism 43 adjacent the bottom of the compartment. The first heating mechanism 41 comprises a rectangular frame 47 affixed to the structure of the cabinet 3, an upper heater plate 51 movable up and down in an opening 53 in the frame, and a heating element 55 comprising an electric coil on the upper surface of the heater plate 51 for heating the plate. The heater plate 51, preferably made of thermally conductive material, has an upstanding peripheral rim 59 having a telescoping fit in the frame opening 53. Flanges 63 extend laterally outward from the rim 59 and overlie an upwardly facing surface 65 of the frame. The arrangement is such that the heater plate 51 can move freely up and down relative to the frame 47. Downward movement of the heater plate 51 is limited by the contact of the flanges 63 with the upwardly facing frame surface 65. In this embodiment, the heater plate 51 is biased downward only by the force of gravity, but a suitable spring mechanism can be provided to add an additional downward bias.

The second heating mechanism 43 comprises a lower heater plate 71 affixed to the structure of the cabinet 3 and a heating element 75 comprising an electric coil on the lower surface of the heater plate for heating the plate. The lower heater plate is also preferably made of thermally conductive material and has a downward extending rim 77.

The upper and lower heater plates 51, 71 may have other configurations, including different shapes and sizes. Further, the heating surfaces of these plates may be irregular (e.g., dimpled or waffled) to increase the heat transfer area of the plates. The heating surfaces may also be coated or impregnated with a non-stick material so that the surfaces are easier to clean and are less prone to sticking to contents (e.g., a receptacle or bag of food) within the compartments, even when the heating surfaces are heated to high temperatures. Still further, the heating plates 51, 71 may be heated by means other than electric resistance heating elements, such as infrared heating, induction heating, or forced convection heating.

The apparatus includes a control system programmed for controlling the operation of the first and second heating mechanisms 41, 43 in each compartment 7. In one embodiment, the control system includes sensors (not shown) in the compartments 7 for sensing the temperatures of the upper and lower heater plates 51, 71, and a processor (not shown) programmed with suitable software for controlling the operation of the heating elements 55, 75 in response to signals from the sensors. Desirably, the processor is programmed for controlling the heating elements 55, 75 of the upper and lower heater plates 41, 43 independently. Further, the control system is desirably programmed to operate the heating mechanisms in one compartment 7 independent of the heating mechanisms in the other compartments. The advantages of these features will become apparent later. The control system includes an operator interface 81 (e.g., touch screen, key pad, or the like) on the cabinet. The interface 81 can include one or more input devices 83 associated with particular compartments for controlling temperature and/or time parameters of those compartments.

Optionally, suitable displays 85 (FIG. 1) may be provided on the cabinet for displaying information relating to the status of each compartment. This information may include the availability of the compartment for use, the type of food in the compartment, and the status of an ongoing activity in the compartment, such as the remaining time in a rethermalization event. Other types of information may also be displayed.

Figure 5:
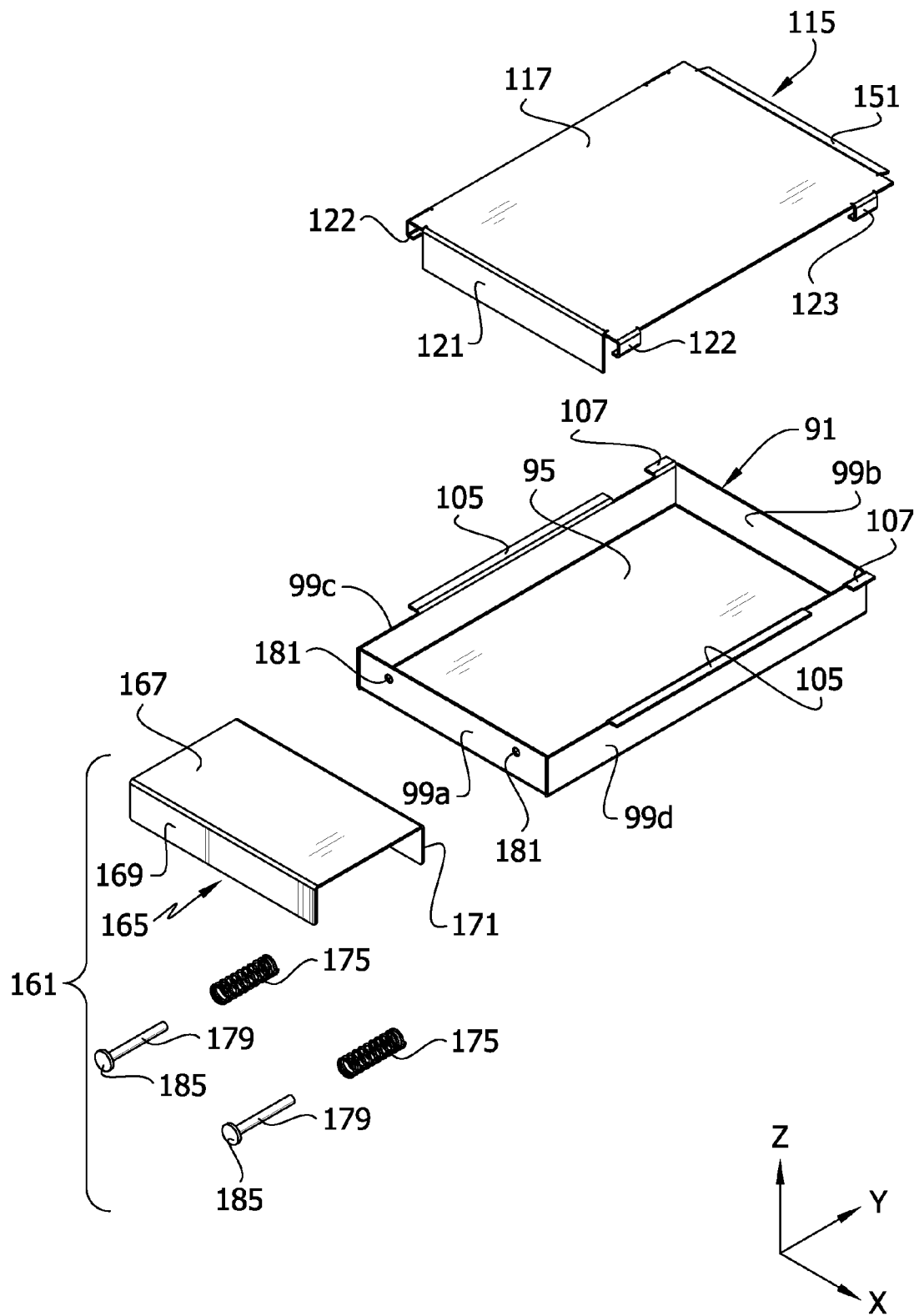
FIG. 5 is an exploded perspective of components of the modular unit.

Referring to FIGS. 4 and 5, the modular unit 11 comprises a receptacle in the form of a generally rectangular tray 91 and a cover 115 that are both desirably made of a thermally conductive material. Exemplary materials include metal, such as aluminum, ceramic materials, and certain synthetic resin materials. The rectangular tray 91 has a bottom wall 95, four upstanding side walls 99a-99d (i.e., front and back walls 99a, 99b extending widthwise of the compartment in the X-direction and two side walls 99c, 99d extending lengthwise of the compartment in the Y-direction), and an open top. Front flanges 105 and rear flanges 107 extend laterally outward from each of the two side walls 99c, 99d. The cover 115 comprises a top wall 117 spaced above the bottom wall of the tray and a front side wall 121 which extends down from the top wall 117 into the tray 91 generally parallel to the front and back walls 99a, 99b of the tray. Front catches 122 and rear catches 123 formed as L-shaped hooks extend down from opposite sides of the top wall 117 of the cover 115. When the cover is in its closed position (FIG. 2), the catches 122 underlie respective front and rear flanges 105, 107 of the tray. For reasons which will become apparent, the catches 122 are configured to allow the cover 115 to move freely up and down relative to the tray 91 within a certain range of movement (e.g., 0 to 1 in.). The tray 91 and cover 115 can have other shapes within the scope of this invention.

The interior surfaces of the tray 91 and cover 115 may be lined with a suitable layer or coating of non-stick material such as Teflon®.

When the cover 115 is closed, the top wall 117 of the cover overlies the bottom wall 95 of the tray 91 and the side wall 121 of the cover is spaced from the back wall 99b of the tray to define a cavity 131 for receiving a package 135 of food to be rethermalized. In particular, the package 135 comprises a portion of food contained in a flexible packaging material (e.g., plastic film) configured as a bag, wrapper or other envelope for holding the food. The cavity has a width 141 along the stated X-axis (FIG. 2), a length 143 along the stated Y-axis (FIG. 3), and a height 147 (FIG. 2) along the stated Z-axis. The cover 115 is movable from its closed position to an open position by sliding the cover in a forward direction (along the Y-axis) to a position in which the front catches 122 on the cover are spaced forward of the front flanges 105 of the tray 91 and the rear catches 123 on the cover are spaced forward from the of the rear flanges 107 of the tray. In this position, the cover can be lifted off the tray and removed to allow packaged food to be placed into the tray and removed from the tray.

Figure 7A:
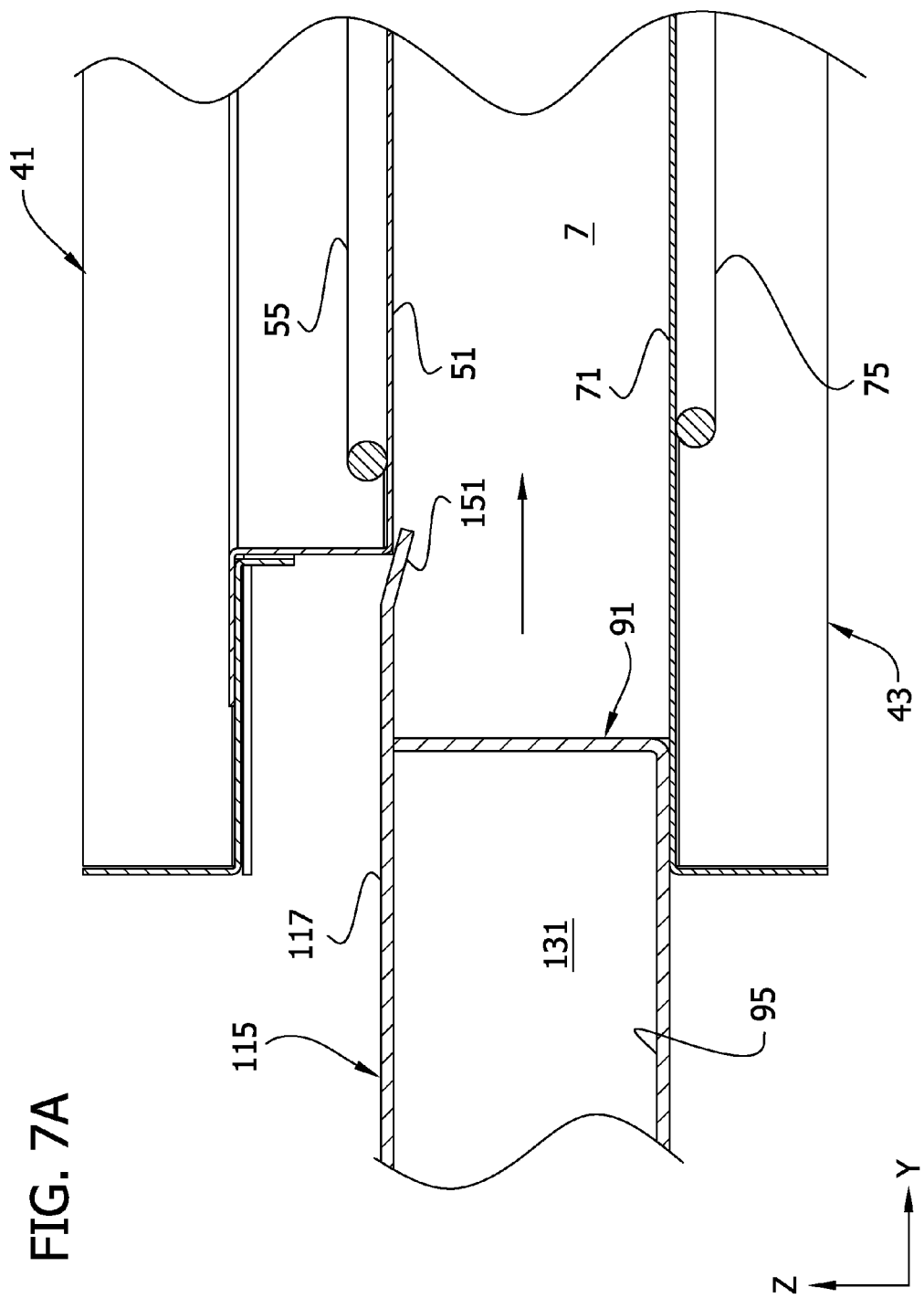
FIGS. 7A-7B are sequential views illustrating one method of loading the modular unit into the compartment.
Figure 7B:
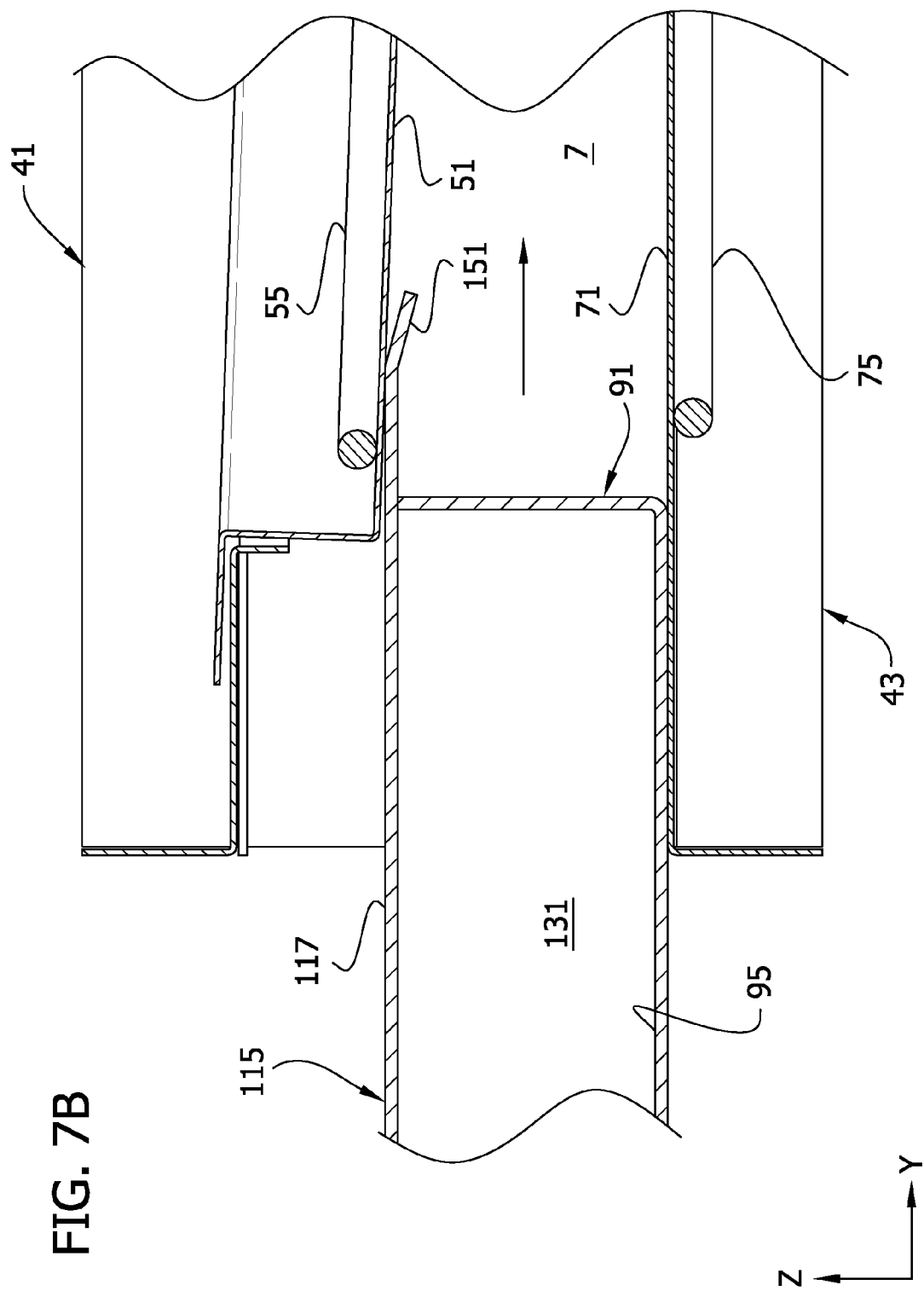

When the cover 115 is on the tray 91, the modular unit 11 has a Z-axis dimension which is somewhat greater than the Z-axis distance between the upper and lower heater plates 51, 71 in a compartment, at least when the upper heater plate is in its lowermost (gravity-biased) position. Thus, to facilitate loading of the modular unit 11 into the compartment 7, the front margin of the top wall 117 of the tray cover 115 is angled down to create a ramp 151 which is configured to engage the upper heater plate 51 and to raise it up as the modular unit is moved into a compartment of the cabinet (see FIGS. 7A and 7B). Thus, during rethermalization, the upper heater plate 51 is gravity biased into conductive heat transfer contact with the top wall 117 of the cover 115, and the lower heater plate 71 is in conductive heat transfer contact with the bottom wall 95 of the tray 91. Alternatively, a suitable hold-and-release mechanism can be provided in the compartment 7 for retaining the upper heater plate 51 in a raised position to provide the clearance necessary to move the modular unit 11 into position below the heater plate, and then releasing the heater plate to allow it to descend downward into contact with the tray cover 115.

Figure 6A:
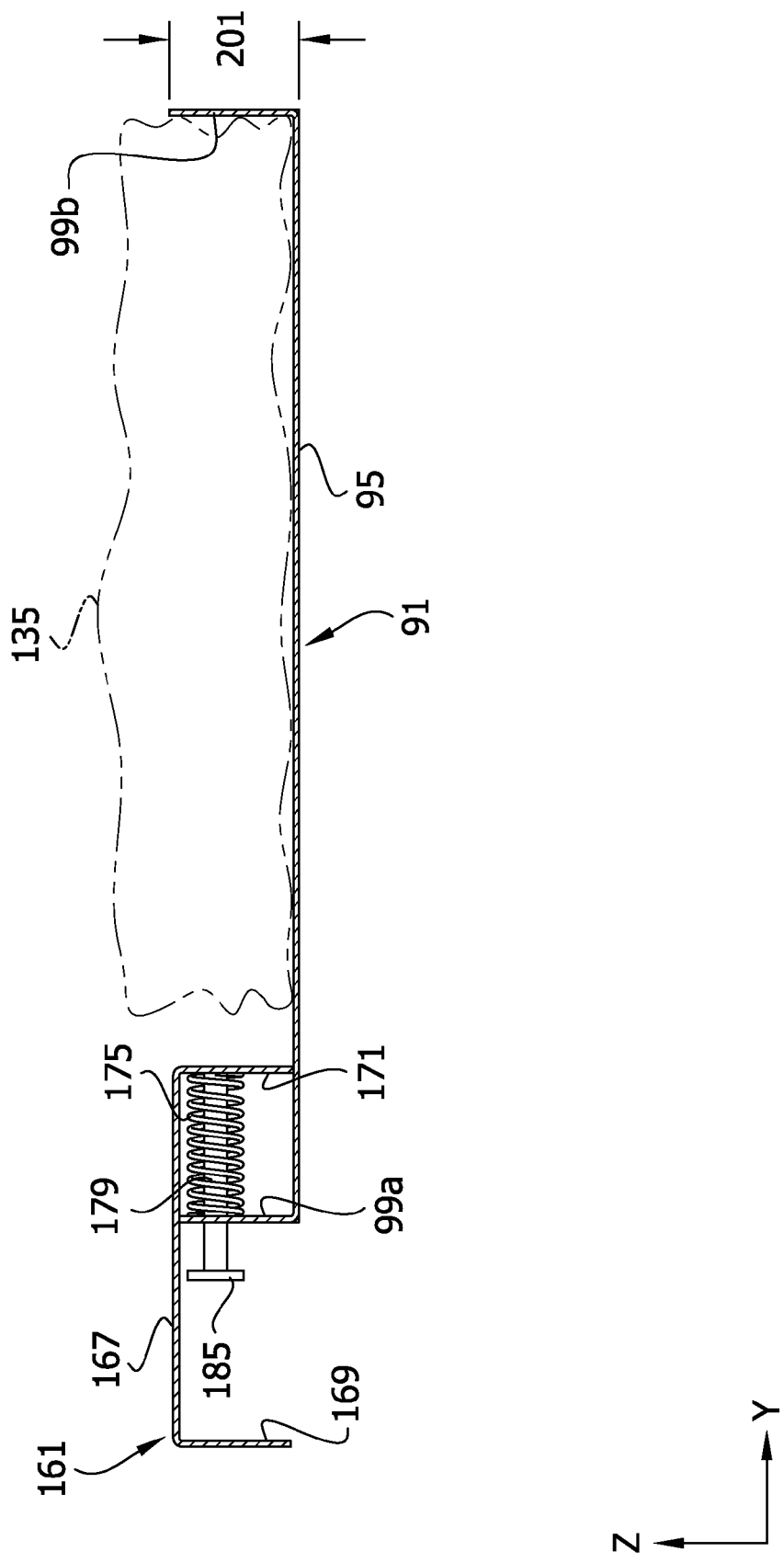
Figure 6B:
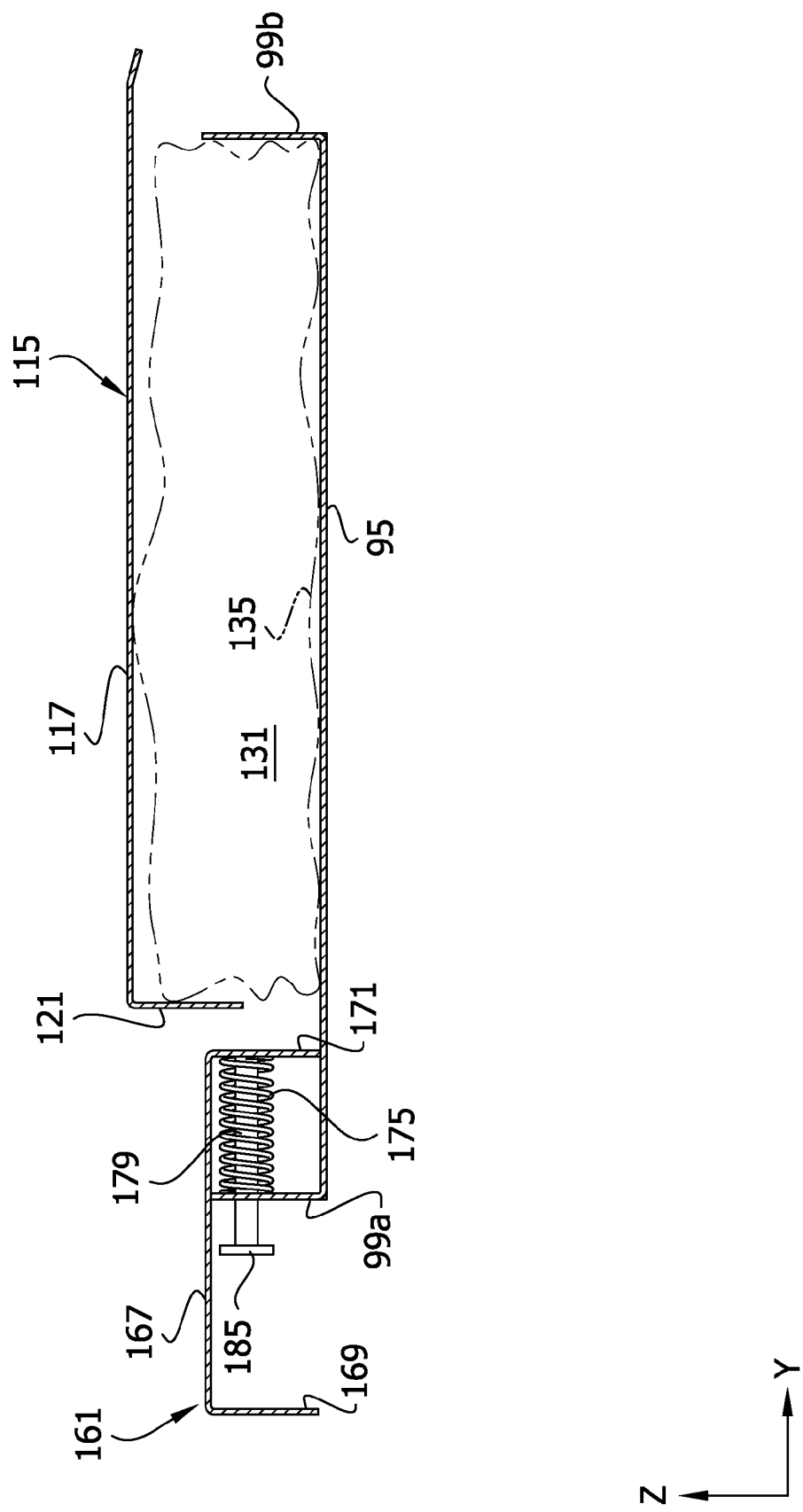

Referring to FIGS. 5 and 6A-6C, the tray cover 115 is biased in a rearward direction (along the Y-axis) relative to the tray 91 toward a closed position by a spring mechanism 161 comprising, in one embodiment, a biasing member 165 of inverted channel shape having a top wall 167 and front and back walls 169, 171 extending down from the top wall. The front wall 169 of the biasing member 165 is disposed outside of the tray 91 in a position forward of and generally parallel to the front wall 99a of the tray, and the back wall 171 of the biasing member is disposed inside the tray in a position rearward of and generally parallel to the front wall 99a of the tray. The biasing member is urged in a rearward direction by a pair of coil compression springs 175 mounted on pins 179. The pins are affixed to the back wall 171 of the biasing member 165 and slide in openings 181 in the front wall of the tray. The springs 175 are positioned between the front wall 99a of the tray 91 and the rear wall 171 of the biasing member 165 to urge the biasing member in a rearward direction along the Y-axis. When the tray cover 115 is mounted on the tray 91, the biasing member 165 is adapted to contact the front side wall 121 of the cover 115 and urge it in a rearward direction along the Y-axis toward the back wall of the tray 99b, i.e., toward a closed position of the cover, as shown in FIGS. 6B and 6C. When the cover 115 is removed from the tray 91, movement of the biasing member 165 in the rearward direction is suitably limited, as by contact of heads 185 on the pins 179 with the front wall 99a of the tray, or by contact of the rear wall 171 of the biasing member 165 with the front flanges 105 on the tray. Desirably, the front wall 169 of the biasing member 165 remains spaced from the front wall 99a of the tray 91 so that the biasing member can be used as a handle for moving the modular unit 11 into and out of a compartment 7, and also for moving the biasing member 165 as needed during the process of loading and unloading a package of food into the modular unit (as described later herein).

Optionally, a latching device (not shown) may be provided on the tray 91 (e.g., on the front wall 99a of the tray) for holding the biasing member 165 in a retracted position against the bias of the springs 175 (FIG. 6A). In one embodiment, the latching device comprises a spring-biased latch which automatically engages the biasing member when the biasing member is pulled forward to a predetermined retracted position, and which can be operated by a user to release the biasing member to allow it to move under the urging of the springs 175 in a rearward direction. The latching device facilitates one-handed manipulation of the modular unit 11 during loading and unloading of the tray 91.

Other mechanisms can be used for spring biasing the front wall 121 of the cover toward the back wall 99b of the tray 91. In this regard, the term "spring" as used herein is intended to encompass any mechanism or force generated using one or more elastic members (e.g., coil springs, gas springs, elastic bands, etc.).

Desirably, the modular unit 11 is dimensioned such that respective walls 95, 99b, 99c, 99d, 117 and 121 of the unit are in conductive heat transfer contact with at least three (and preferably all six) faces of the outside surface of a package 135 placed in the unit. The package 135 may have any size and shape but is typically generally rectangular (e.g., 8.5 in. wide×12 in. long×1.75 in. high) such that its outside surface has what can be referred to as a top face, a bottom face, front and back faces extending in a generally X-direction, and two side faces extending in a generally Y-direction. During the rethermalization process, the contents of the package will change shape as it is heated and converts from a frozen or refrigerated (e.g., chilled or slacked) state to a more liquid or vaporous state. For maximum efficiency, it is desirable that conductive heat transfer contact be maintained between heated surfaces of the modular unit 11 and respective faces of the outside surface of the package. The modular unit achieves this result by maintaining contact between at least three heated walls of the unit and respective faces of the food package.

Desirably, the modular unit 11 has a Z-axis dimension 201 (FIG. 6A) from the bottom wall 95 of the tray 91 to the top surface of the tray less than the overall height of the food package 135 both before and after rethermalization of the contents of the package. As a result, the top wall 117 of the cover 115, which is in conductive heat transfer contact with the upper heater plate 51, maintains conductive heat transfer contact with the top face of the outside surface of the food package 135, and the bottom wall 95 of the tray 91, which is in conductive heat transfer contact with the lower heater plate 71, maintains conductive heat transfer contact with the bottom face of the outside surface of the food package. Further, the depending front wall 121 of the cover 115, which is in conductive heat transfer contact with the upper heater plate 51, is spring biased by the spring mechanism 161 in the Y-direction toward the back wall 99b of the tray 91, which is in conductive heat transfer contact with the lower heater plate 71. As a result, these two heated surfaces 121, 99b maintain conductive heat transfer contact with respective front and back faces of the outside surface of the food package 135.

As used herein, "conductive heat transfer contact" means direct or indirect contact through which heat can be transferred by conduction. For example, as described above, the upper heater plate 51 is in direct (touching) contact with the cover 115. The package of food 135 is in indirect contact with the upper heater plate 51 through the cover 115, which is in direct (touching) contact with both the upper heater plate 51 and the package of food 135. The cover 115 and package of food 135 are both in conductive heat transfer contact with the heater plate 51. In various embodiments, heating mechanisms in direct contact or in indirect contact with a package of food 135 are considered to be in conductive heat transfer contact with the package of food.

Figure 6D:
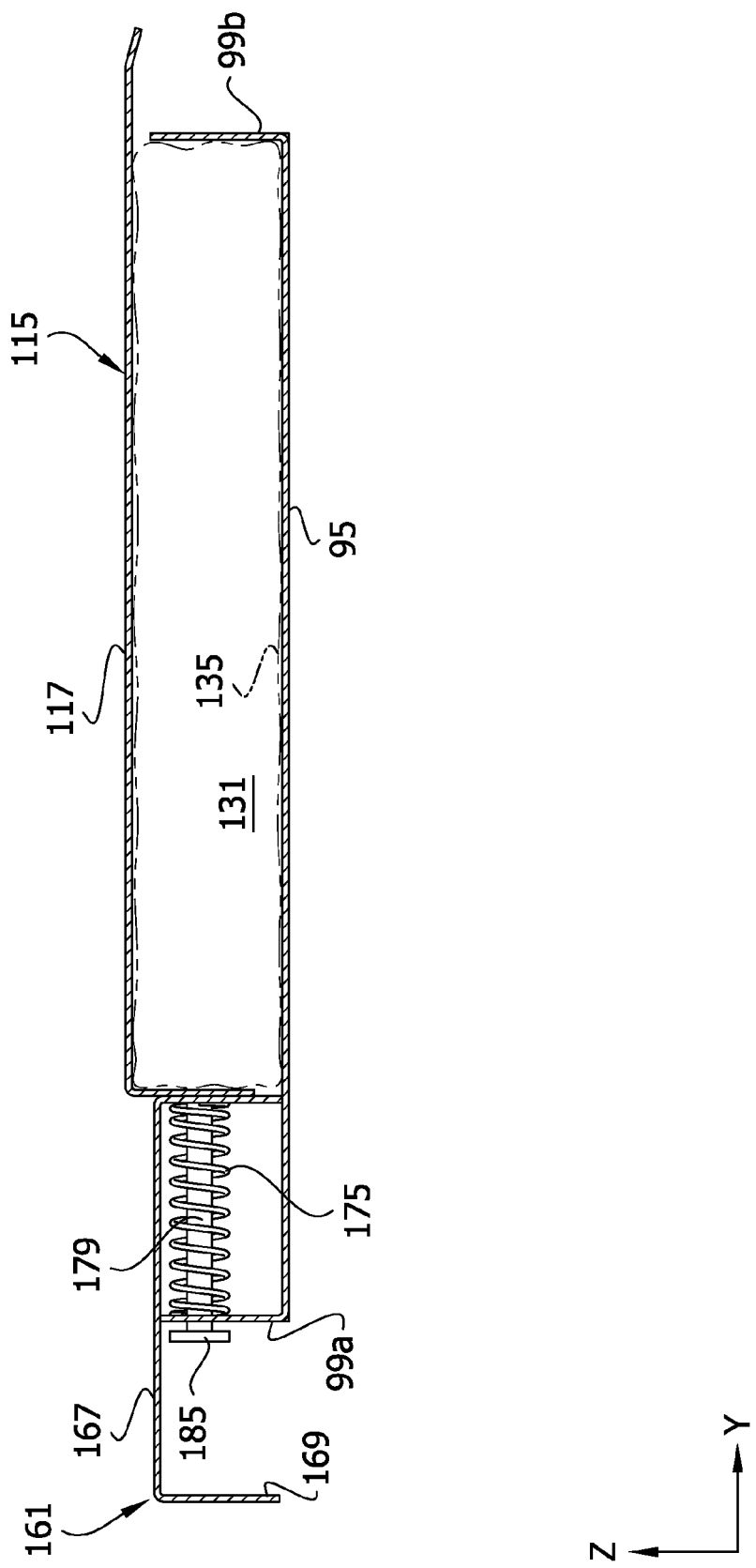
FIG. 6D is a view similar to FIGS. 6A-6C but showing the food in a rethermalized state.

Desirably, the tray 91 has an X-dimension which is substantially the same as the food package 135 in its frozen or refrigerated (e.g., chilled or slacked) state such that the two side walls 99c, 99d of the tray 91 maintain conductive heat transfer contact with respective side faces of the food package. The above-described operation of the modular unit to maintain conductive heat transfer contact is illustrated by comparison of, e.g., FIG. 6C to 6D. FIG. 6C shows a frozen or refrigerated food package 135 fully loaded into modular unit 11, and FIG. 6D shows the food package in a rethermalized state, with the top wall 117 and front wall 121 of the cover 115 of the modular unit having moved downward and to the right, respectively, to maintain conductive heat transfer contact with the outer surface of the food package which has flattened (settled) during rethermalization. The cover 91 and tray 115 can have other configurations for maintaining conductive heat transfer contact between at least three walls of the modular unit 11 and the outside surface of the packaged food 135 received in the cavity 131.

In another embodiment, the cover 115 and front wall 121 are not biased or movable in the Y-direction. In this embodiment, the front wall 121 and the back wall 99b of the tray define a Y-dimension which is substantially the same as the food package 135 in its frozen or refrigerated state such that the walls 121 and 99b maintain conductive heat transfer contact with respective side faces of the food package.

The modular units 11 are "modular" in the sense that they are constructed to have similar components. However, the units 11 may vary in size to accommodate food packages of substantially different size. Further, the compartments 7 may have different sizes to accommodate modular units of different sizes or to accommodate more than one unit in a single compartment. In the latter case, the two (upper and lower) heater plates 51, 71 in each compartment 7 should be sized to cover the top and bottom walls 95, 117 of adjacent modular units. Alternatively, separate sets of upper and lower heater plates can be provided for the modular units in the compartment.

In some instances, as where package 135 contains air or other gas that may expand during heating, it may be desirable to vent the package before it is heated to a temperature which might otherwise cause it to rupture due to a build-up in pressure. To accomplish this, one or more projections can be provided on an interior surface of the tray cover 115, such as the lower surface of the top wall 117 of the cover, for piercing the package to allow venting of heated gas from the package.

In general, a method of using the apparatus involves placing a refrigerated (e.g., chilled or slacked) or frozen package 135 of food in the cavity 131 of a modular unit 11, manipulating the modular unit to bring at least three walls (e.g., 95, 117 and 121) into conductive heat transfer contact with an outside surface of the package, and heating the three walls to rethermalize the food in the package.

More specifically, a rethermalization process is started by removing the cover 91 of a modular unit 11 and, using the front wall 169 of the biasing member 165 as a handle, pulling the biasing member in a forward direction against the bias of the springs 175 to move the rear wall 171 of the biasing member toward a retracted position closer to the front wall 99a of the tray, as shown in FIG. 6A. Optionally, the aforementioned latching device operates to hold the biasing member in its retracted position. The food package 135 is then placed in the tray in the space defined by the bottom wall 95, back wall 99b and side walls 99c, 99d of the tray 91, and by the rear wall 171 of the biasing member 165. After the package 135 is in position, the cover 115 is placed on the tray 91 in a position in which the top wall 117 of the cover overlies the bottom wall 95 of the tray and the front wall 121 of the cover is disposed between the package 135 and the back wall 171 of the biasing member (FIG. 6B). The biasing member is then released and allowed to move in a rearward direction to contact the front wall 121 of the cover 115. The force generated by the springs 175 pushes the biasing member 165 and cover 115 in a rearward direction. This movement fully closes the cover and brings the front wall 121 of the cover and the back wall 99b of the tray 91 into conductive heat transfer contact with respective front and back faces of the outside surface of the food package (FIG. 6C). The range of movement of the biasing member 165 also allows the modular unit 11 to accept food packages which vary in dimension along the Y-axis.

Once the food package 135 is loaded into the modular unit 11 as described above, the unit is moved into a compartment 7 of the cabinet 3 in the manner previously described. During this movement, the ramp 151 at the front of the cover 115 engages the upper heater plate 51 and raises it, thereby allowing the modular unit to be pushed into a rethermalizing position in which the upper heater plate 51 is in conductive heat transfer contact with the top wall 117 of the cover and the lower heater plate 71 is in conductive heat transfer contact with the bottom wall 95 of the tray 91. The operator then uses the operator interface 81 and/or the respective input device 83 to initiate a rethermalization operation.

After the rethermalization process is finished, the modular unit 11 is removed from the compartment 7 and the above steps are reversed to unload the rethermed package 135 from the unit. The contents of the package can be emptied into suitable holding equipment, such as a food serving unit of the type described in co-assigned application Ser. No. 11/250,778, filed Oct. 14, 2005, and published as Pub. No. US 2006/0081627 on Apr. 20, 2006. Once unloaded, the modular unit 11 can be used again to rethermalize another food package.

The control system can be programmed to operate the heating mechanisms 41, 43 in each compartment 7 in various ways. By way of example but not limitation, the control system can be programmed to operate the upper and lower heater plates 51, 71 in each compartment independent of the heater plates in other compartments. This flexibility allows the food in each compartment to be heated to different temperatures and/or for different times, if desired. Further, the control system can be programmed to operate the upper and lower heater plates 51, 71 in each compartment 7 independently. For example, it may be desirable to heat the upper and lower plates to different temperatures depending on the amount of heat to be transferred by respective plates.

Figure 8:
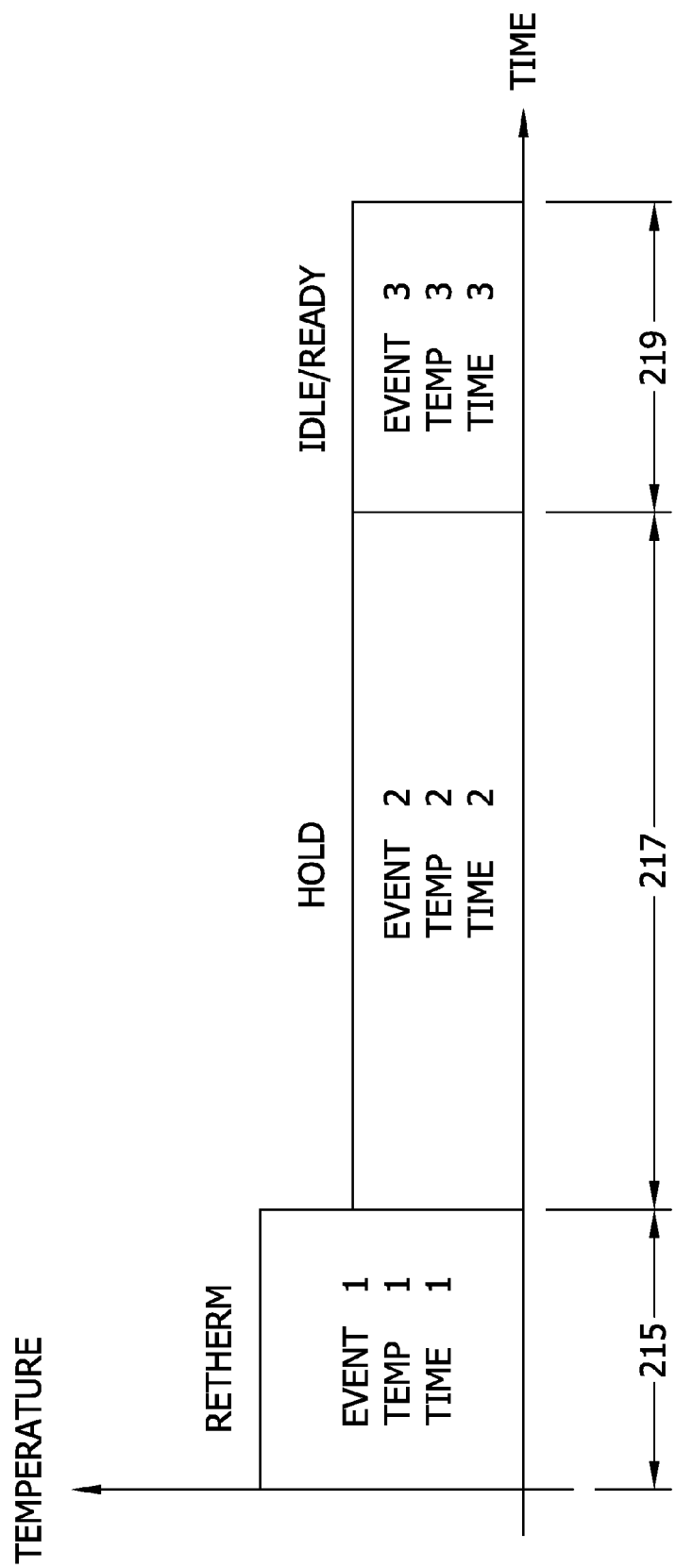
FIG. 8 is a diagram illustrating an exemplary time and temperature control program for a rethermalization process.

FIG. 8 illustrates an exemplary time and temperature control program for a rethermalization process which includes a first retherm interval 215, a second holding interval 217, and a third idle/ready interval 219.

During the first interval 215, which is initiated by using the operator interface 81 and/or the respective input device 83, the control system operates the upper and lower heater plates 51, 71 in one or more compartments 7 at a predetermined temperature (or temperatures) to rethermalize the food in the compartment(s). During rethermalization, heater plate temperatures may range from 140 to 400 degrees F. (preferably below the softening temperature of the food packaging material if the packaging material is thermoplastic), and packaged food temperatures may range from 140 to 190 degrees F., although these ranges may vary. During this process, the temperatures of the heater plates 51, 71 are measured by the sensors, and the processor thermostatically controls the temperature of the heater plates by comparing signals from the sensors to predetermined set points. If the actual temperature of the heater plates is below the programmed set point, the appropriate heating element or elements 55, 75 are energized. If the actual temperature of the heater plates is above the programmed set point, the appropriate heating element or elements are not energized. During this retherm interval 215, the display 85 associated with each compartment 7 may indicate relevant information, such as the amount of retherm time remaining and the type of food in each compartment. A suitable alarm (visual and/or audible) may be activated by the control system to indicate the end of the rethermalization interval (e.g. upon expiration of a countdown clock).

After the retherm interval 215 has ended (i.e., timed out), the control system operates the upper and/or lower heater plates 51, 71 during the hold interval 217 to maintain the food in each compartment at a suitable and safe holding temperature, which may be a temperature the same as or different from the food rethermalization temperature (e.g., between 140 and 190 degrees F.). The food is held at this temperature while it remains in its packaging, thus preventing water evaporation and oxidation of the contents of the package. As a result, the quality of the food is maintained for a longer period of time. If the modular unit 11 containing the food is not removed by the end of the holding interval 217, the modular unit is removed for suitable disposal of the food. A suitable alarm (visual and/or audible) may be activated to indicate the end of the holding interval.

After the holding interval 217 has ended, as determined by the expiration of a predetermined interval of time or by input to the operator interface 81 and/or the respective input device 83 when an operator removes the modular unit 11 from the compartment 7, the control system operates the upper and/or lower heater plates 51, 71 to maintain them at an idle temperature in readiness for the start of another rethermalization event. The control operates the display 85 to indicate the idle/ready status of an empty compartment. Alternatively, the upper and/or lower heater plates 51, 71 may be de-energized after the holding interval 217 has ended and until initiation of another rethermalization event.

Figure 9:
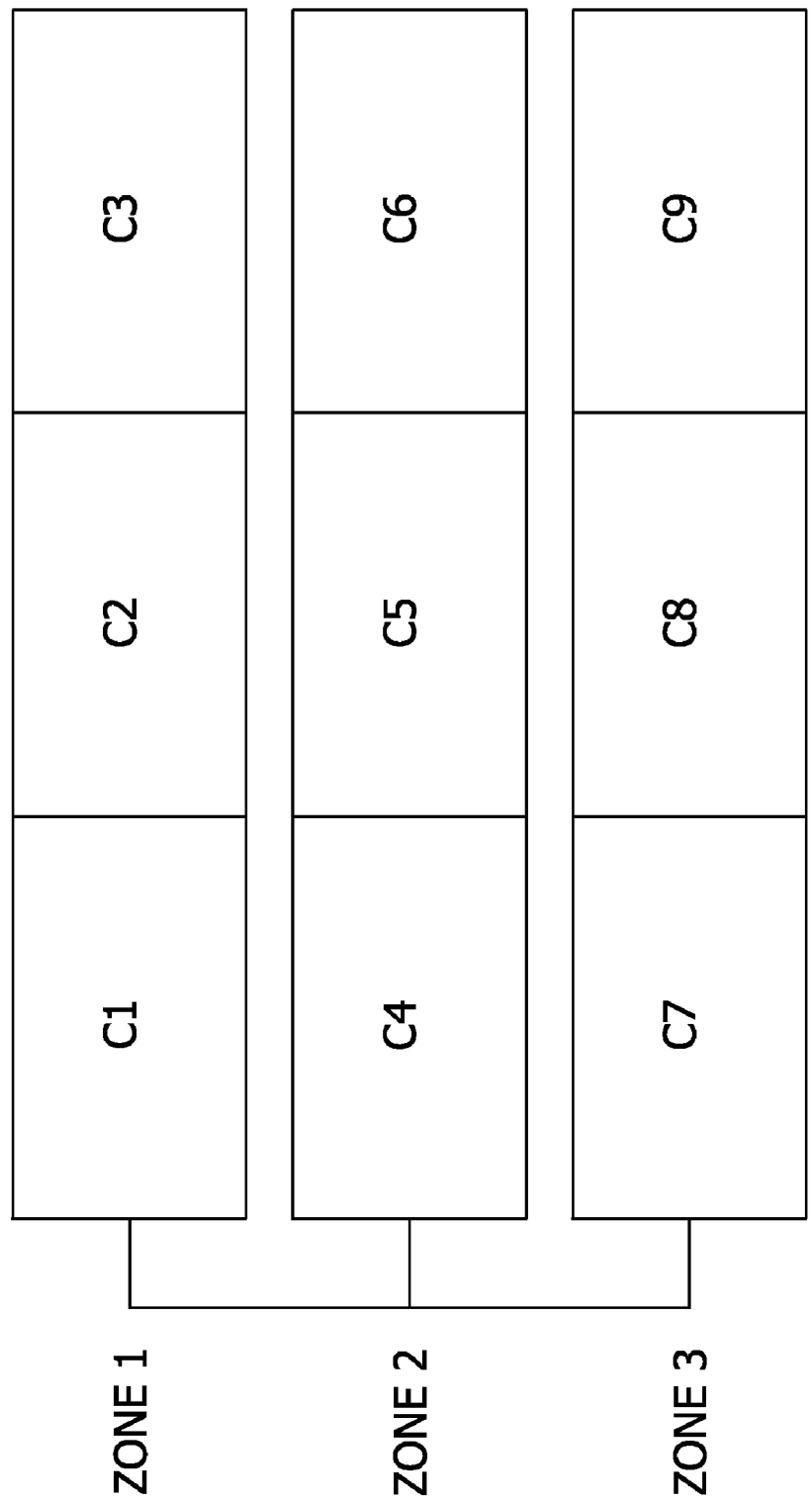
FIG. 9 is a diagram illustrating possible control configurations of the apparatus.

FIG. 9 illustrates a control diagram for a matrix of nine compartments C1-C9 arranged in a first zone comprising compartments C1-C3, a second zone comprising compartments C4-C6, and a third zone comprising compartments C7-C9. In one configuration, the control system is programmed to heat all of the compartments C1-C9 in the same manner (i.e., according to the same time and temperature profile). In a second configuration, the control system is programmed to heat the three compartments in each zone in the same manner, but the compartments in different zones are heated in different manners (i.e., according to different time and temperature profiles). In a third configuration, the control system is programmed to operate each of the nine compartments C1-C9 in a different manner (i.e., according to different time and temperature profiles). Other configurations are possible. Desirably, each zone or compartment may have an operator input to perform certain functions such as starting and stopping a rethermalization or holding event, and for re-programming the time and temperature profile for such an event. The control system can also include a USB port for transfer of web-based programs and configurations.

Figure 10:
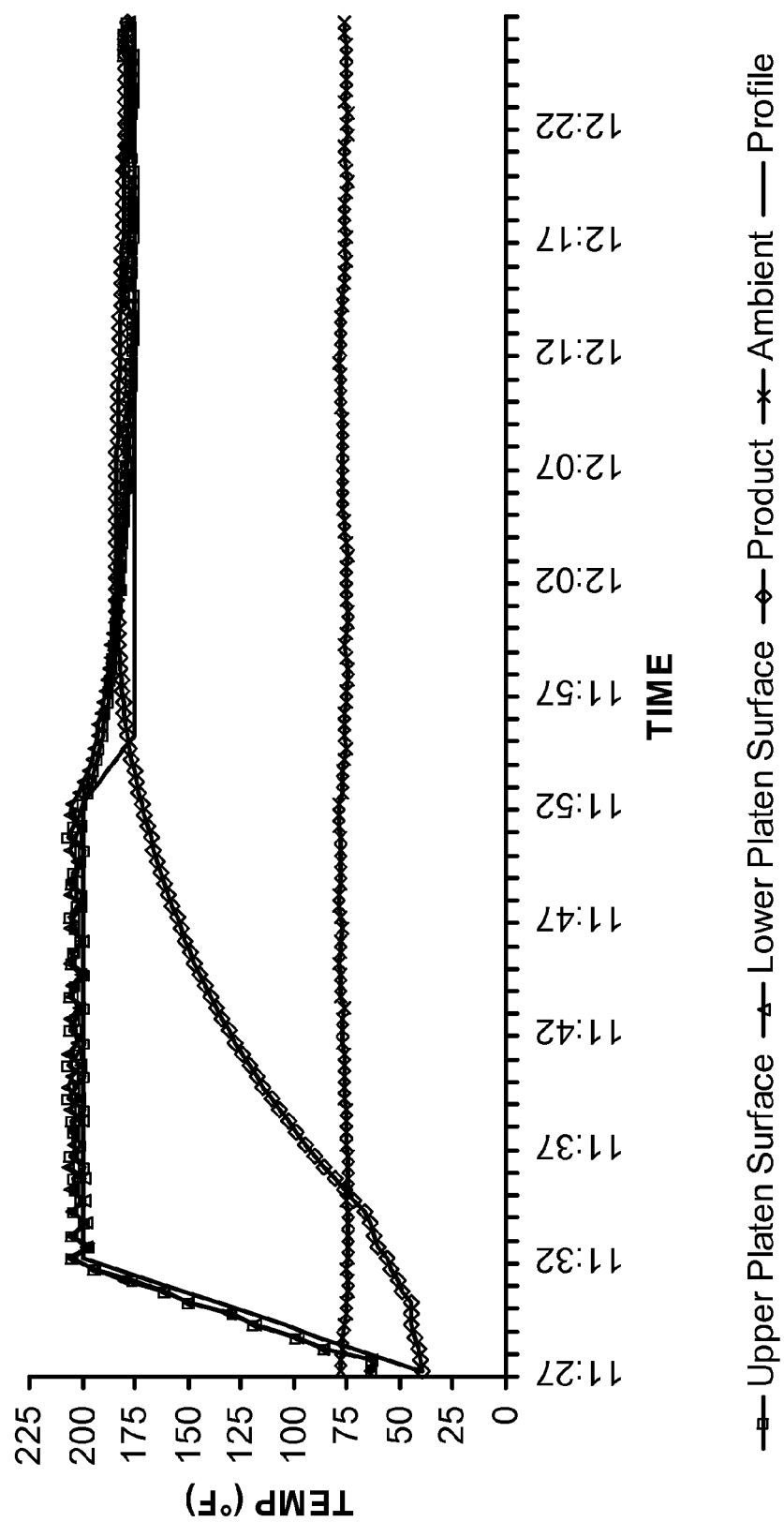
FIGS. 10-12 are graphs illustrating temperature profiles in three rethermalization experiments conducted using apparatus constructed according to the principles of this invention.
Figure 11:
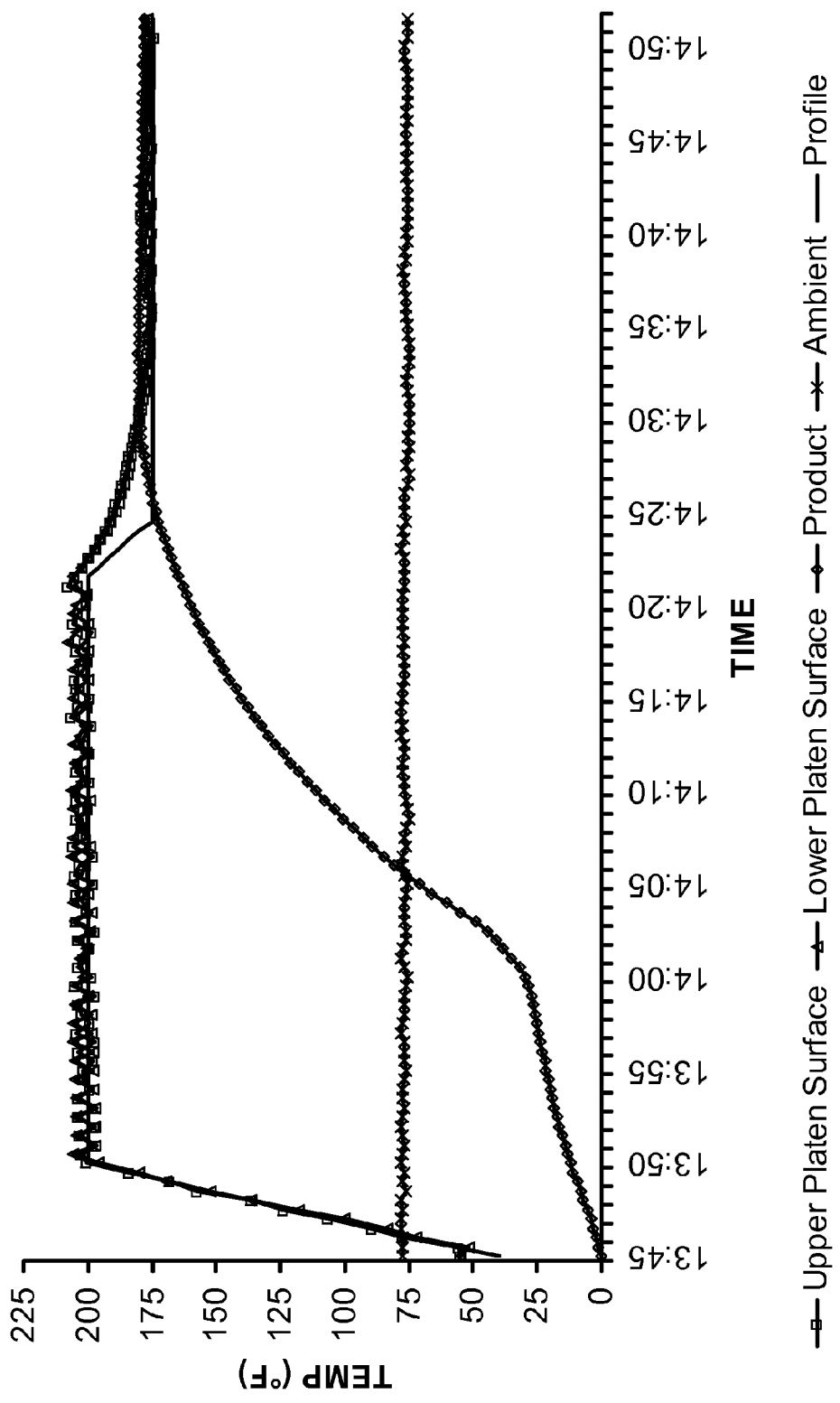
Figure 12:
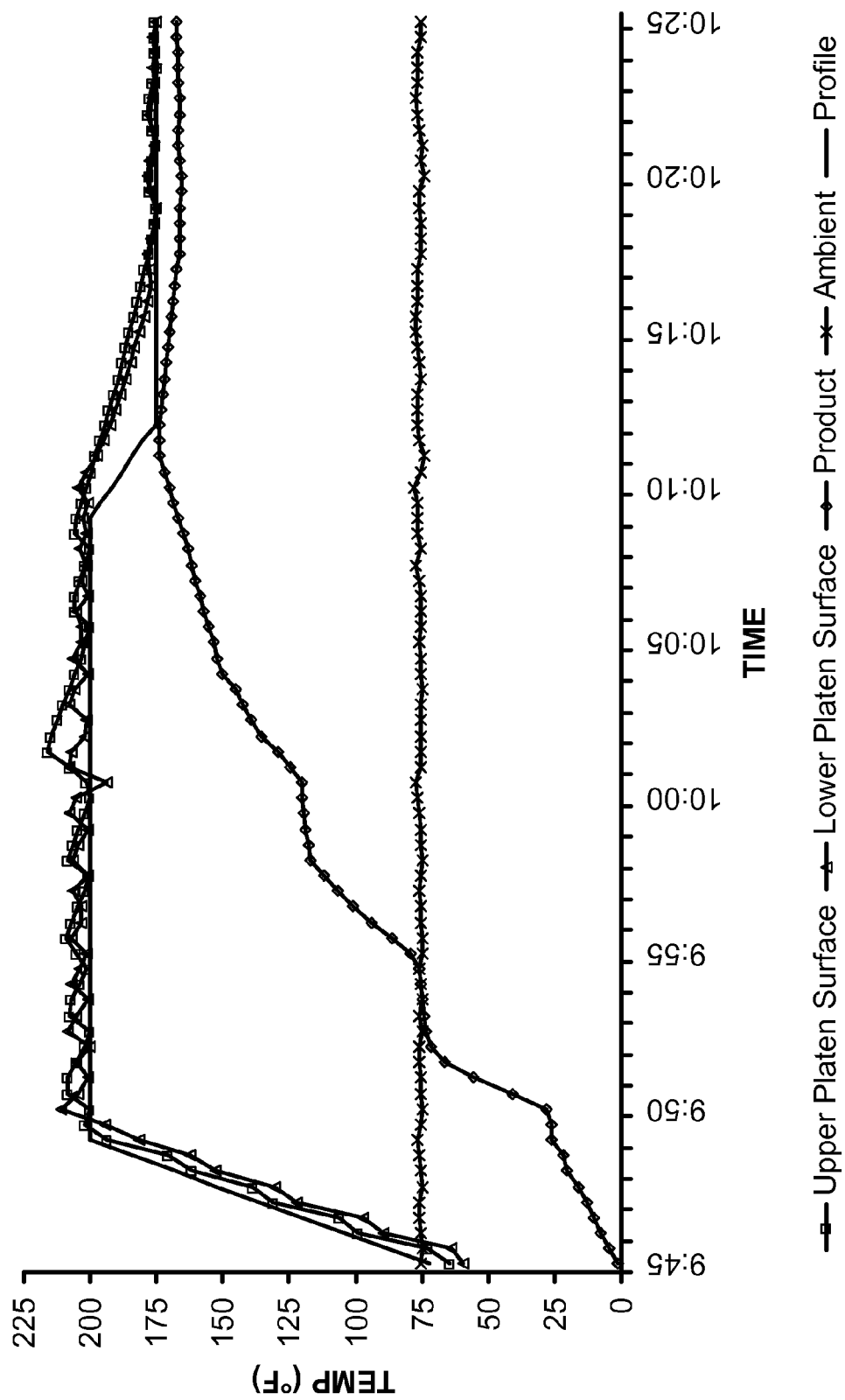

FIGS. 10-12 are graphs illustrating temperature profiles in three rethermalization experiments conducted using apparatus constructed according to the principles of this invention. The apparatus included upper and lower heater plates and four heater side plates defining a cavity in which packaged food product to be rethermalized was placed. The upper heater plate was weighted to maintain the plate in conductive heat transfer contact with the packaged food during the entire rethermalization process. The six heater plates were heated using heating elements operated at 208V and 425 W, for a total power input of 2550 W. FIGS. 10-12 record ambient temperature, the temperatures of the upper and lower heater plates, the temperature of the packaged food in the cavity, and the length of time for the packaged food to reach a rethermalization temperature of 175 degrees F.

In the first experiment (FIG. 10), a package of refrigerated (about 40 degrees F.) beef was placed in the cavity and the heater plates were heated at full power to a temperature of about 200 degrees F. and then heated using less power to maintain that same temperature. The packaged food reached its target retherm temperature of about 175 degrees in about 23 minutes. The temperature of the heated plates was then reduced to hold the packaged food at a holding temperature of about 175 degrees for a holding interval of about 37 minutes. The power consumed during rethermalization was about 0.244 kWh, and the power consumed during the holding interval was about 0.0174 kWh.

In the second experiment (FIG. 11), a package of frozen (about 0 degrees F.) beef was placed in the cavity and the heater plates were heated at full power to a temperature of about 200 degrees F. and then heated using less power to maintain that same temperature. The packaged food reached its target retherm temperature of about 175 degrees in about 37 minutes. The temperature of the heated plates was then reduced to hold the packaged food at a holding temperature of about 175 degrees for a holding interval of about 23 minutes. The power consumed during rethermalization was about 0.389 kWh, and the power consumed during the holding interval was about 0.0288 kWh.

In the third experiment (FIG. 12), a package of frozen (about 0 degrees F.) chicken was placed in the cavity and the heater plates were heated at full power to a temperature of about 200 degrees F. and then heated using less power to maintain that same temperature. The packaged food reached its target retherm temperature of about 175 degrees in about 24 minutes. The temperature of the heated plates was then reduced to hold the packaged food at a holding temperature of about 175 degrees for a holding interval of about 26 minutes. The power consumed during rethermalization was about 0.158 kWh, and the power consumed during the holding interval was about 0.071 kWh.

Figure 13:
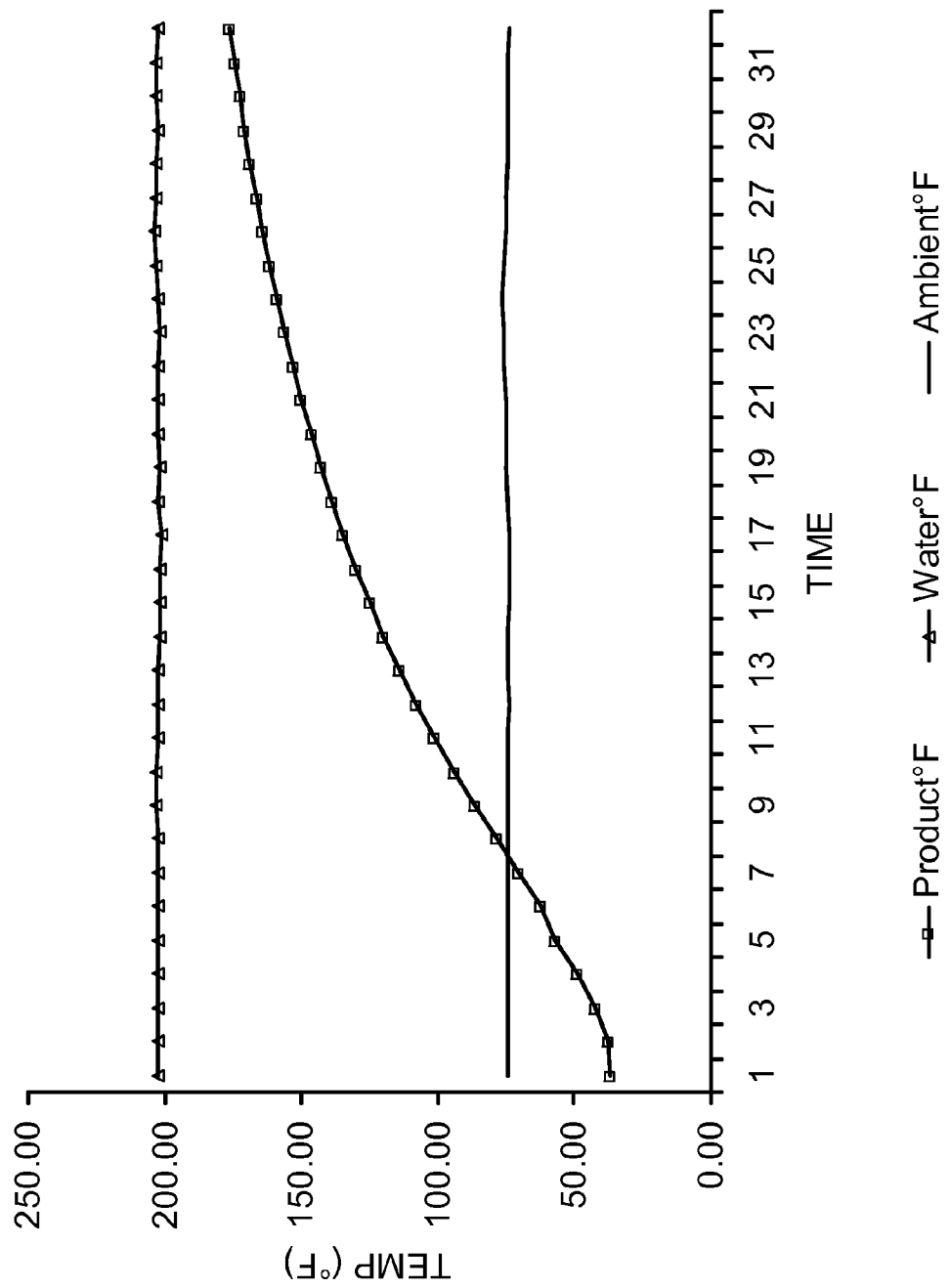
FIGS. 13-15 are graphs illustrating temperature profiles in rethermalization experiments using a conventional water bath technique.
Figure 14:
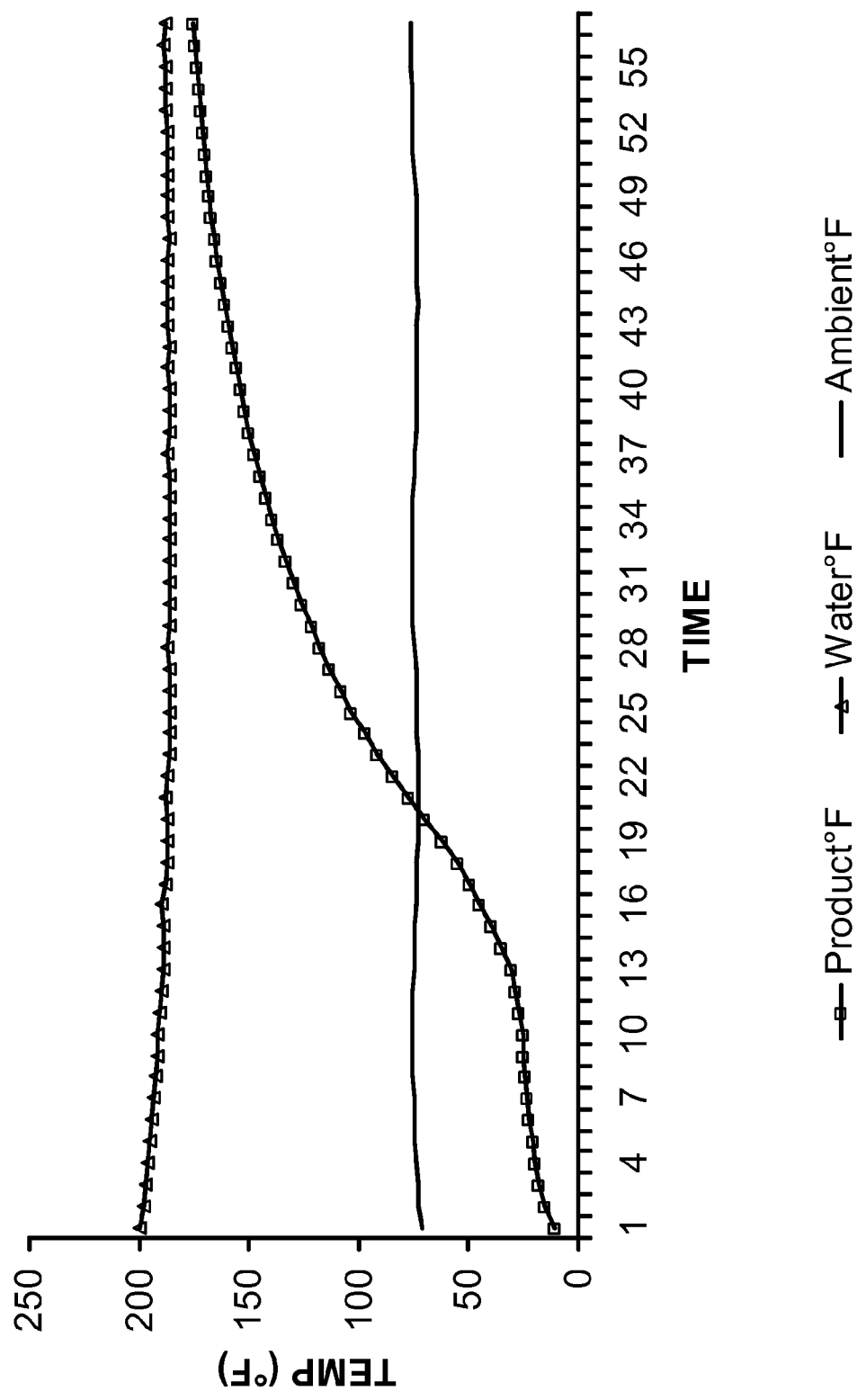
Figure 15:
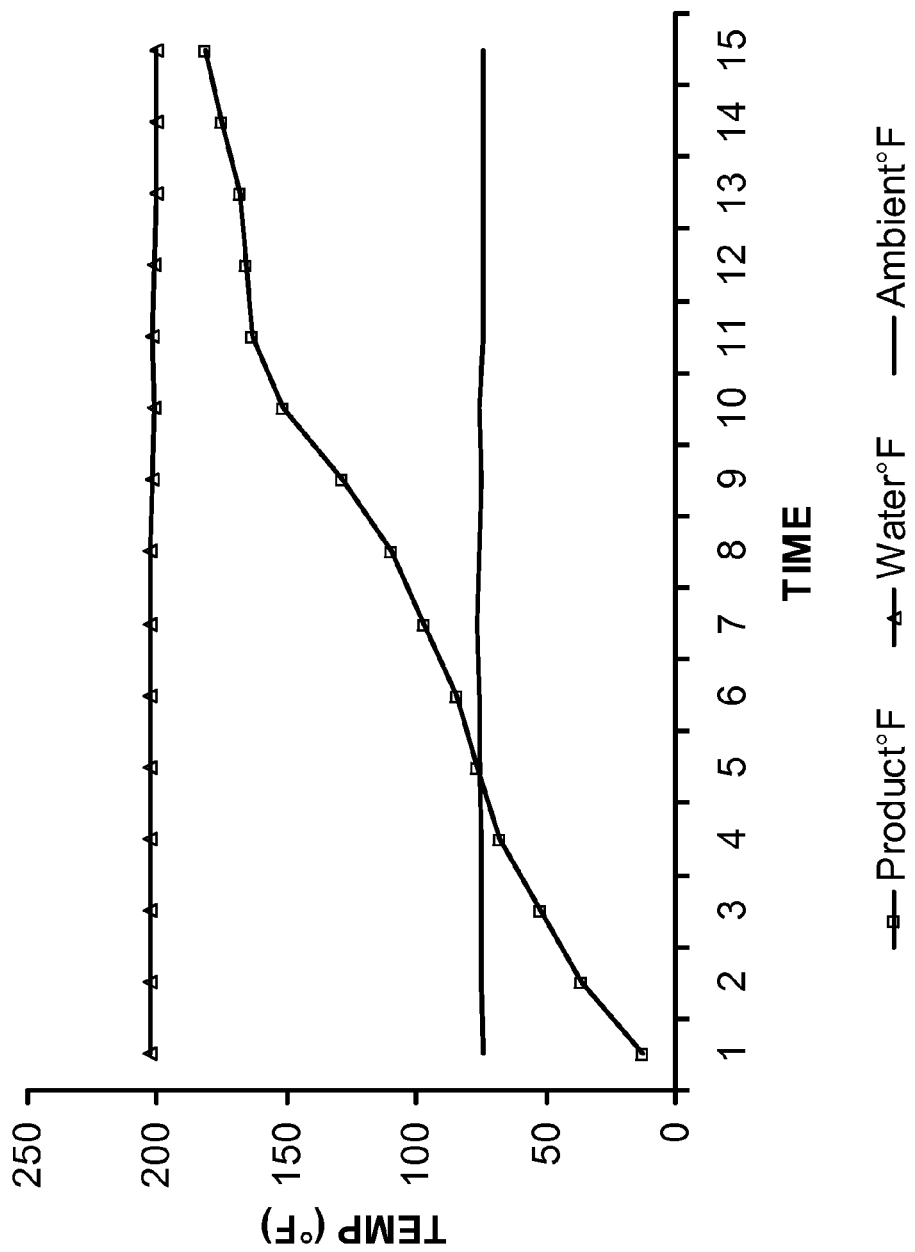

FIGS. 13-15 are graphs illustrating the temperature profiles in three rethermalization experiments comparable to the three experiments reported in FIGS. 10-12 but using a conventional water bath technique. In these experiments, similar packages of refrigerated beef at 37 degrees F. (FIG. 13), frozen beef at 11 degrees F. (FIG. 14) and frozen chicken at 12 degrees F. (FIG. 15) were rethermalized in a water bath containing 6.0 gallons of water initially heated to and maintained at a temperature of 200 degrees by flame heat from a gas burner. In the first experiment (FIG. 13), the packaged food reached its target retherm temperature of about 175 degrees in about 31 minutes, compared to 23 minutes in FIG. 10. In the second experiment (FIG. 14), the packaged food reached its target retherm temperature of about 175 degrees in about 56 minutes, compared to 37 minutes in FIG. 11. In the third experiment (FIG. 15), the packaged food reached its target retherm temperature of about 175 degrees in about 14 minutes, compared to 24 minutes in FIG. 12.

The results of the above experiments indicate that the heat transfer efficiency of the rethermalizing apparatus of this invention compares favorably to the heat transfer efficiencies achieved in a conventional water bath process but without the many drawbacks associated with using a water bath, as discussed above. This objective is achieved by bringing heated surfaces into conductive heat transfer contact with at least three faces of the outside surface of the packaging containing the food, and even more desirably with all six faces of the packaging. Further, the heated surfaces are biased inward toward the packaging so that they remain in contact with the packaging during the entire rethermalizing process, even as the food liquifies and the packaging changes shape during the process. As a result, the heat transfer efficiency is enhanced to an even greater degree.

Figure 16:
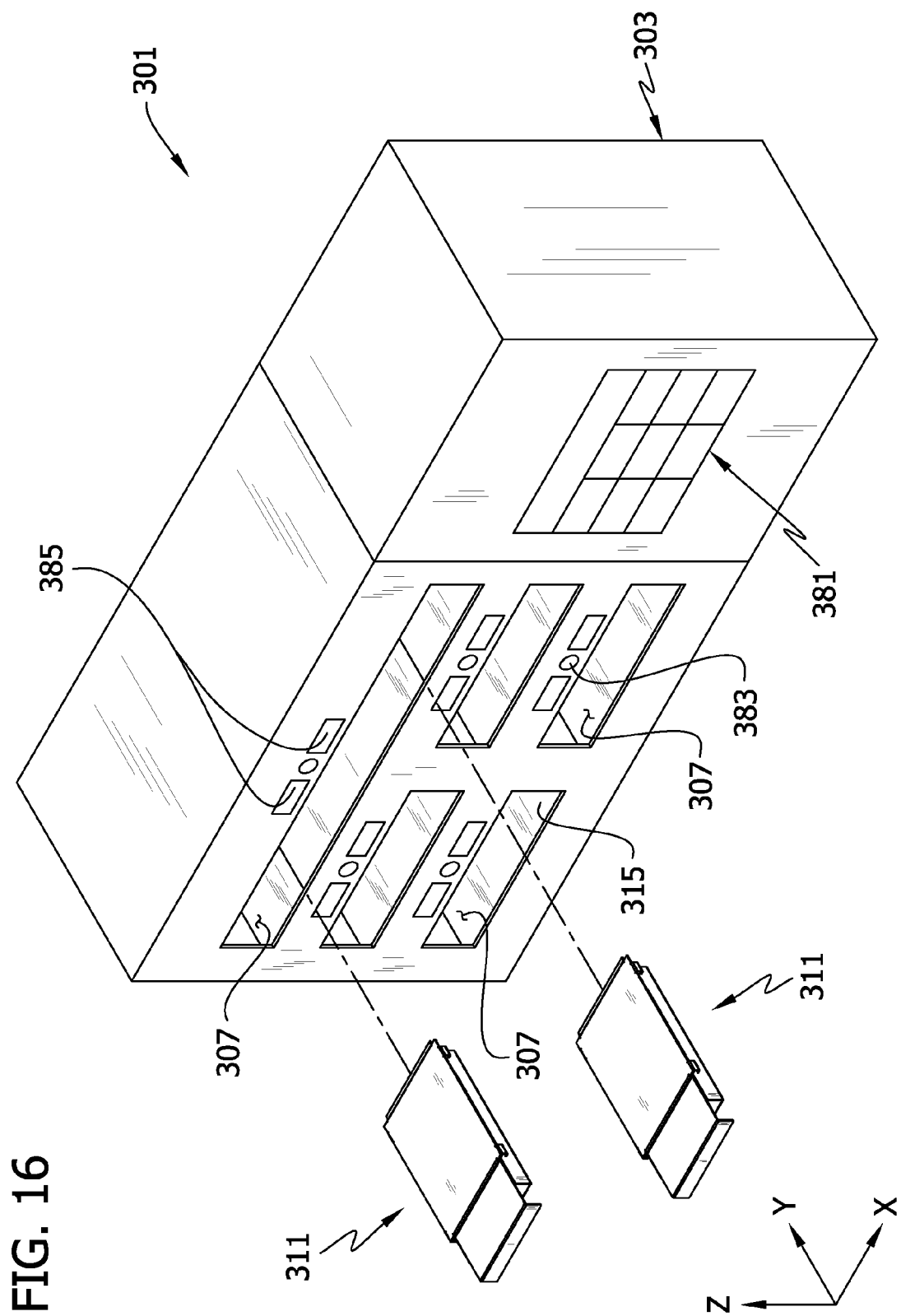
FIG. 16 is a perspective of another embodiment of rethermalizing apparatus of this invention having compartments of various sizes.

FIG. 16 illustrates another embodiment of rethermalizing apparatus 301 of the present invention. The apparatus 301 is similar to the apparatus described above, and corresponding parts are designated by the corresponding reference numbers, plus 300. In this embodiment, the cabinet 303 has compartments 307 which vary in size. Some of the compartments are sized to receive only one modular unit 311. Other compartments are sized to receive two or more modular units.

FIGS. 17-26B illustrate another embodiment of apparatus of the present invention, generally designated 401. The apparatus 401 is similar in many respects to the apparatus 1 described above, and corresponding parts are designated by the corresponding reference numbers, plus a prime designator ('). For example, apparatus 401 comprises a cabinet 3' having an operator interface 81' and one or more compartments 7', heating systems 15', input devices 83', and displays 85'. In this embodiment, the modular unit 11' includes a tray 91' but no cover. Instead, the upper heater plate 51' makes direct contact with the top outer surface of the package 135'. The upper heater plate 51' is moved from a lowered position (FIG. 19) to a raised position (FIG. 20) by an actuating device generally designated 405. In the illustrated embodiment, the actuating device 405 comprises a rod 415 rigidly attached at its back end to the heater plate 51' and having a handle 421 at its front end positioned adjacent the front of the cabinet 3' for convenient manipulation by a user of the apparatus 401. The heater plate 51' is maintained in a generally horizontal plane as it is raised and lowered by four mechanical links 425 each of which has a pivot (pin) connection 427 at one end with an upstanding bracket 429 on the frame 47' and a pivot (pin) connection 431 at its other end with an upstanding ear 435 on a respective flange 63' on the rim 59' of the heater plate. The heater plate 51' is spring-biased by one or more coil springs 437 attached at one end to respective brackets 429 and at the other end to respective links 425 adjacent the pin connections 431. The longitudinal axis of each spring is generally parallel to the longitudinal axis of a respective link, the arrangement being such that the each spring applies an upward force tending to move the heater plate toward its raised position when the pin connection 431 moves "over center" to a position above a horizontal line through the opposite pin connection 427, and a downward force tending to move the heater plate toward its lowered position (i.e., into contact with the upper outer surface of a package in the tray) when the pin connection 431 moves "over center" to a position below a horizontal line through the opposite pin connection 427. Alternatively, the heater plate can be spring-biased toward its raised position and biased only by gravity toward its lowered position.

Figure 25B:
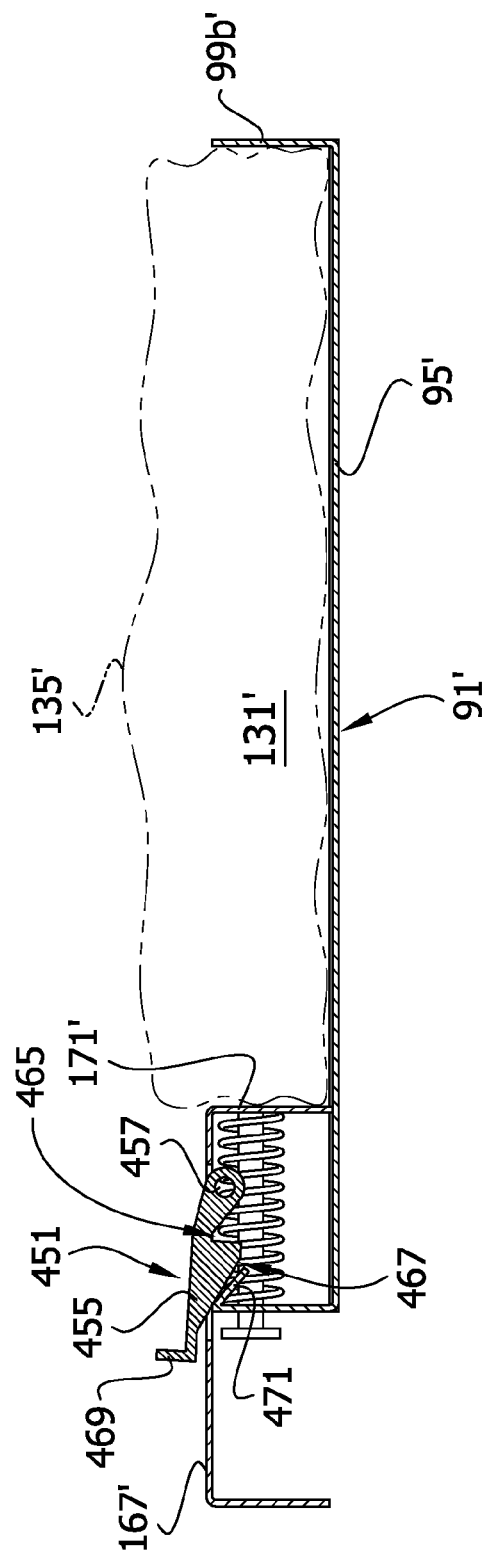
Figure 25C:
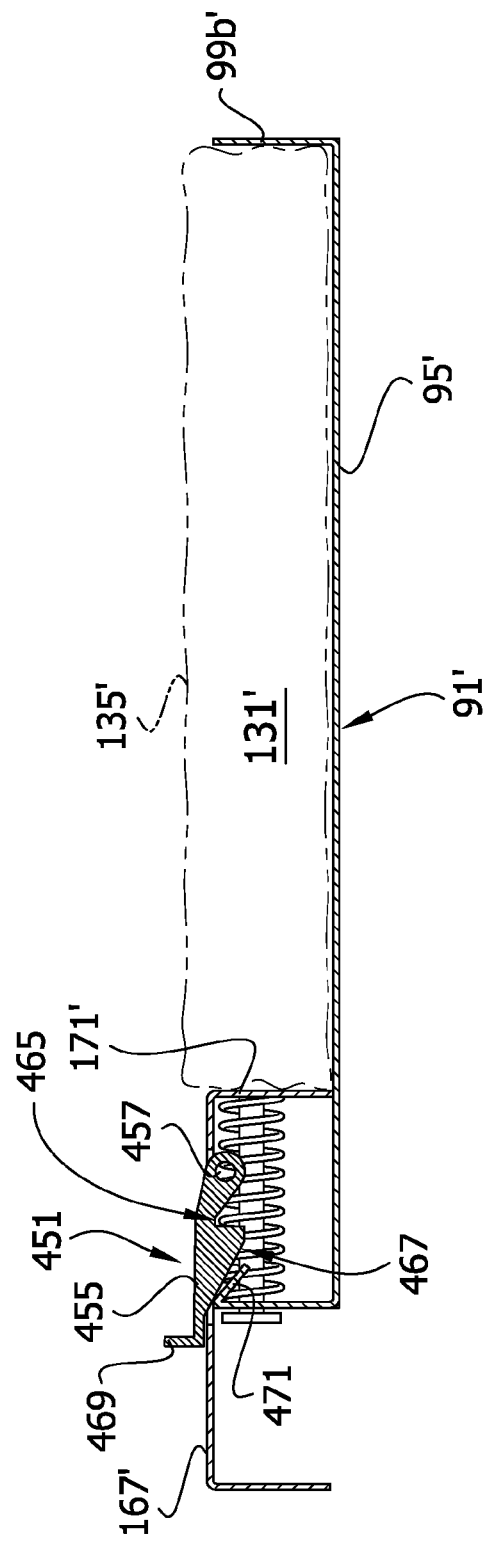
Figure 26B:
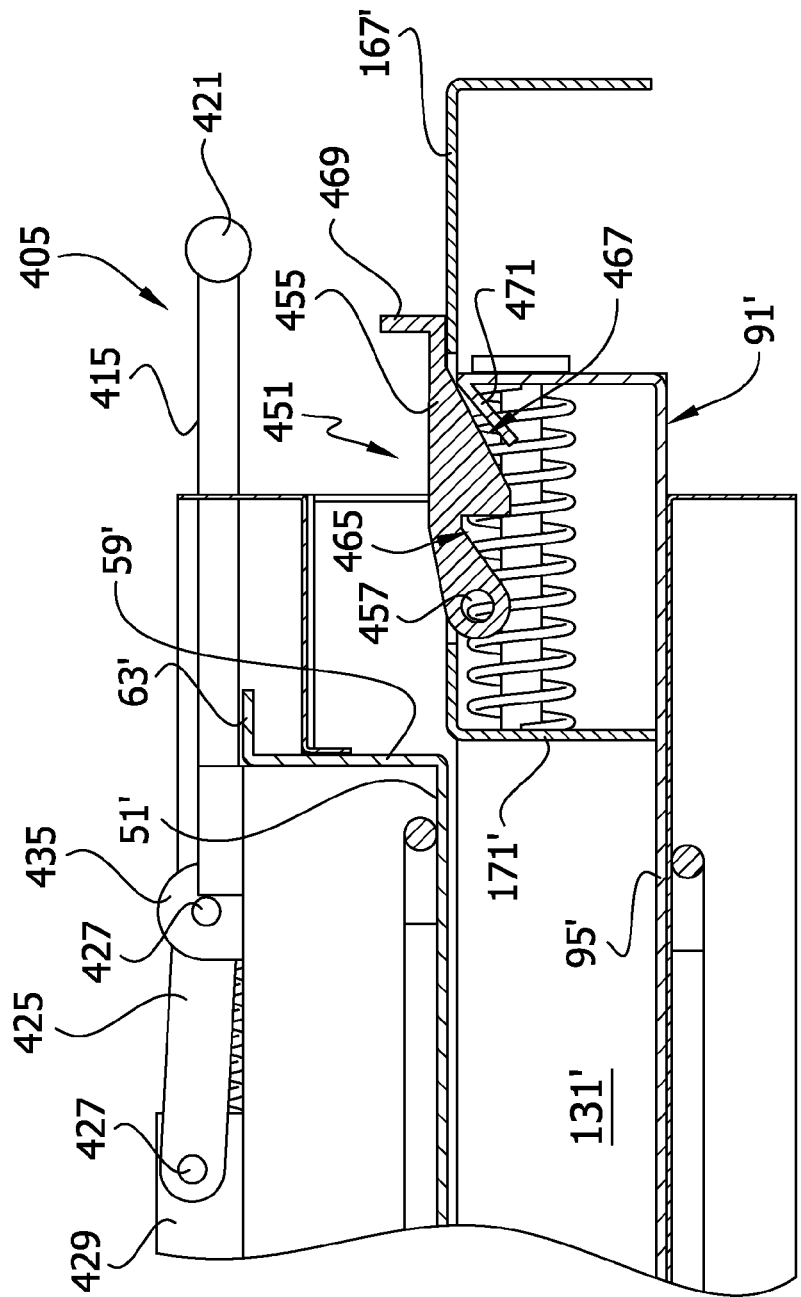

Referring to FIGS. 18, 24, and 25A-25C, the modular unit 11' also includes a latching device, generally designated 451, for holding the biasing member 165' of the spring mechanism 161' in a retracted position against the bias of the springs 175' (FIG. 25A). The latching device 451 comprises a latching arm 455. The back end of the latching arm (its right end as viewed in FIGS. 25A-25C, and 26B) has a pivot connection 457 with the biasing member on the underside of the top wall 167' for pivotal movement of the latching arm about an axis 461 (FIG. 24) extending generally in side-to-side direction with respect to the tray 91'. The latching arm 455 extends forward from the pivot connection 457 up through an opening 463 in the top wall of the biasing member 165'. The latching arm has a downward opening notch 465 immediately forward of the pivot connection 457, an angled lower edge 467 forward of the notch, and an upright tab 469 adjacent the front end of the arm. The latching arm 455 is configured such that when the biasing member 165' is pulled in a forward direction toward its retracted position, the angled edge 467 of the latching arm engages a cam member 471 on the front wall of the tray 91', causing the latching arm to move upward. As shown in FIG. 25A, when the biasing member 165' reaches its fully retracted position, the latching arm 455 drops under the bias of gravity to a position in which the front wall of the tray and the cam member 471 are received in the notch 465 of the latching arm, thereby holding the biasing member in its retracted position to facilitate one-handed manipulation of the modular unit 11' during loading and unloading of the tray 91'. To release the biasing member 165', the latching arm 455 is raised using the tab 469.

The apparatus 401 is used in much the same manner as apparatus 1. To initiate the process, the biasing member 165' of modular unit 11' is moved to its retracted position (FIG. 25A) where it remains latched in place to permit a package of food 135' to be loaded into the cavity 131' defined by the bottom wall 95' of the tray 91', the back wall 99b' of the tray, the two side walls 99c', 99d' of the tray, and the back wall 171' of the biasing member 165'. (In this embodiment, there is no tray cover to form the front wall of the cavity.) After the package 135' is placed in the cavity 131', the latching arm 455 is released and the biasing member 165' urges the package into conductive heat transfer contact with respective walls of the tray 91' and biasing member 165'. The upper heater plate 51' is then moved to its raised position using the actuating device 405. After the tray 91' is positioned in the compartment 7', the actuating device 405 is again used to lower the heater plate 51' into direct contact with the upper outer surface of the package of food 135' in the tray 91'. After rethermalization is complete, the upper heater plate 51' is raised using the actuating device 405, and the tray 91' is removed from the compartment 7'. The biasing member 165' is moved to its retracted position (FIG. 25A) where it is held by the latching arm 455. The package 135' is then removed from the tray 91' so that the above procedure can be repeated.

FIG. 27 illustrates another embodiment of an upper heater plate 505 and a modular unit 511. The upper heater plate 505 is similar to the upper heater plate 51 described above. Upper heater plate 505 has an upstanding peripheral rim 515 having a telescoping fit in a frame (not shown, but similar to the frame 47 described above). Flanges 519 extend laterally outward from the rim 515 at the sides of the heater plate 505 and overlie an upwardly facing surface of the frame (not shown). The arrangement is such that the heater plate 505 floats or can freely move up and down relative to the frame. Downward movement of heater plate 505 is limited by the contact of the flanges 519 with the upwardly facing frame surface. In this embodiment, the heater plate 505 is biased downward only by the force of gravity, but a suitable spring mechanism can be provided to add an additional downward bias. The front portion 523 of the upstanding peripheral rim 515 is tapered (slanted) to engage and facilitate loading of the modular unit 511 into a compartment of a cabinet, as described in more detail below.

The modular unit 511 comprises a rectangular tray 527, a spring mechanism 531, and a U-shaped handle 535. The rectangular tray 527 has a bottom wall 541, four upstanding side walls 543a-543d (i.e., front and back walls 543a, 543b extending widthwise of the compartment in the X-direction and two side walls 543c, 543d extending lengthwise of the compartment in the Y-direction), and an open top. The tray 527 does not have a cover. Thus, the upper heater plate 505 makes direct contact with a top outer surface of a package of food (not shown) inserted in the tray 527.

The front wall 543a of the tray 527 extends in the X-direction beyond the edges of the side walls 543c, 543d, and in the Y-direction beyond the open top and the bottom wall 541 a distance sufficient to overlap the front face of the cabinet around the opening of a compartment into which the modular unit 511 is loaded. The extended front wall 543a acts to locate the tray 527 with respect to the upper heater plate 505 and the lower heater plate (not shown) when the modular unit is inserted into the compartment. Additionally, the front wall 543a closes the front opening of the compartment to reduce the loss of heat from the compartment. The front wall 543a may take shapes different than the rectangular one shown and may have a seal (not shown) around its inside perimeter for contact with the front face of the cabinet. Other means may be implemented to thermally insulate the compartment from the outside atmosphere, such as one or more doors on the cabinet (not shown).

The back wall 543b of the tray 527 is constructed to cooperate with the upper heater plate 505 to facilitate insertion of the modular unit 511 into the compartment. The upper margin of the back wall 543b is inclined to form a ramp 545. The ramp 545 cooperates with the tapered front rim portion 523 of the upper heater plate 505 to raise the upper heater plate as the modular unit 511 is moved into the compartment. Alternatively, only one of the back wall 543b and the front rim portion 523 may be constructed to facilitate insertion of the modular unit 511. The back wall 543b of the tray 527 has a height in the Z-direction less than the height of a package of food, whether in a frozen, refrigerated (e.g., chilled or slacked) or rethermalized state. Thus, when the modular unit 511 contains a package of food and is inserted into the compartment, the upper heater plate 505 rests against the upper outside surface of the package and at no time descends below the height of the back wall 543b. This enables the modular unit 511 to be pulled from the compartment without the upper heater plate 505 obstructing the back wall 543b. Alternatively, downward movement of heater plate 505 may be limited by the contact of the flanges 519 with the upwardly facing frame surface (not shown) such that the heater plate cannot descend below the height of the back wall 543b.

The spring mechanism 531 comprises a push plate (biasing member) 547, two pins 549, two coil compression springs (hidden behind front wall 543a), and a spring compression lever 553. The push plate 547 acts similarly to the back wall 171 of the biasing member 165 described above. The push plate 547 is disposed inside the tray 527 in a position rearward of and generally parallel to the front wall 543a of the tray. The push plate 547 is urged in a rearward direction by the compression springs mounted on pins 549. The pins 549 are affixed at one end to the push plate 547 and slide in openings in the front wall 543a. The springs are positioned between the front wall 543a and the push plate 547 to urge the push plate rearward in the Y-direction. The pins 549 are affixed at their other end to the lever 553. The lever 553 is mounted on the U-shaped handle 535, such that the lever slides in the Y-direction along the length of the legs of the handle. The configurations of the handle 535 and the lever 553 enable convenient and perhaps one-handed manipulation by an operator. Movement of the push plate 547 is preferably limited in the Y-direction (rearward) to preserve a gap between the lever 553 and the front wall 543a. The gap facilitates engagement of the lever 553 by an operator for moving the push plate 547 as needed during the process of loading and unloading a package of food into the modular unit 511, as described in more detail below. Accordingly, stops (not shown), such as rings affixed to the pins 549 or legs of the handle 535, or ridges along the sidewalls 543c, 543d or the bottom wall 541, may be positioned to limit movement of the push plate 547 in the rearward direction.

In use, the lever 553 is engaged to retract the push plate 547. A package of food may then be placed in the cavity 561 defined by the bottom wall 541 of the tray 527, the back wall 543b of the tray, the two side walls 543c, 543d of the tray, and the push plate 547. After the package is placed in the cavity 561, the lever 553 is released to allow the push plate 547 to urge the package into conductive heat transfer contact with respective walls of the tray 527 and the push plate. The modular unit 511 is then inserted into the compartment. As the modular unit 511 engages the compartment, the ramp 545 on the modular unit cooperates with the tapered front rim portion 523 of the upper heater plate 505 to raise the upper heater plate. The upper heater plate 505 rests in direct contact with the package of food once the modular unit is fully inserted in the compartment. After rethermalization is complete, the modular unit 511 is removed from the compartment, the push plate 547 is retracted using the lever 553, and the package of food is removed from the cavity 561.

Figure 28:
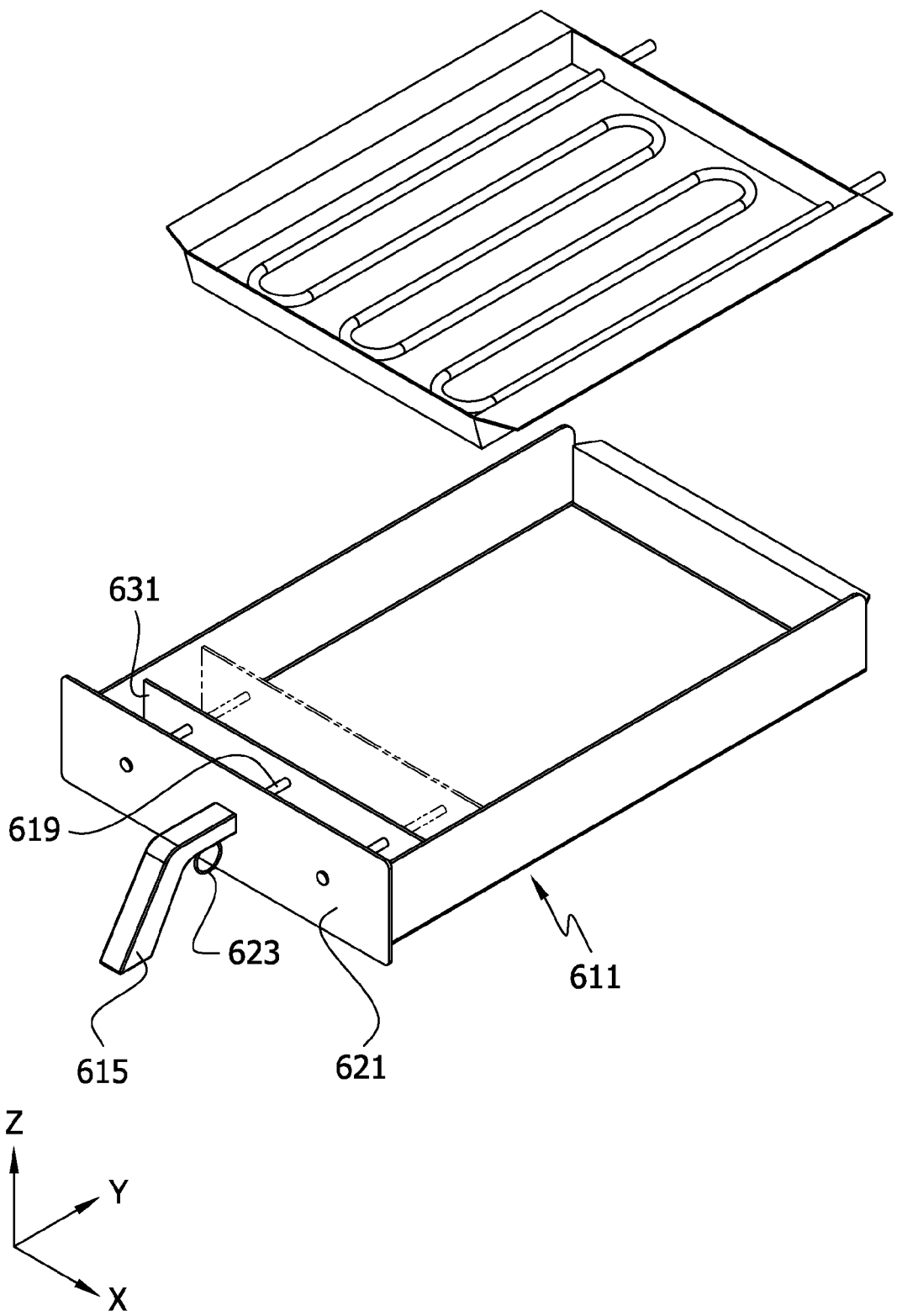
FIG. 28 is a perspective of another embodiment of an upper heater plate and a modular unit of the present invention having a pistol grip handle, the upper heater plate being shown removed from a compartment.

FIG. 28 illustrates another embodiment of a modular unit of the present invention, generally designated 611. The modular unit 611 is similar in many respects to the modular unit 511 described above. In this embodiment, the modular unit 611 has a pistol grip handle 615. This embodiment includes an additional pin 619, on which an additional coil compression spring may be mounted (hidden behind the front wall 621 of the tray 613). The pin 619 extends though an opening in the front wall 621 below the pistol grip handle 615. A ring 623 at the end of the pin 619 is constructed to act as a finger hole for an operator. Desirably, while holding the pistol grip 615, the operator can engage the ring 623 to actuate the pin 619 and thus the push plate 631 between its retracted and closed positions. In use, the modular unit 611 is operated in much the same way as the modular unit 511 described above, except the operator uses the pistol grip handle 615 and engages the ring 623 to actuate the push plate 631.

FIGS. 29-35 illustrate another embodiment of apparatus of the present invention generally designated 701. In general, the apparatus 701 comprises a cabinet 703 having one or more compartments 707 each of which is sized for receiving one or more packages of food 713 to be rethermalized. This embodiment does not have a modular unit such as modular unit 11 described above. A heating system 717 is provided in each compartment 707 for heating a package of food 713.

Figure 29:
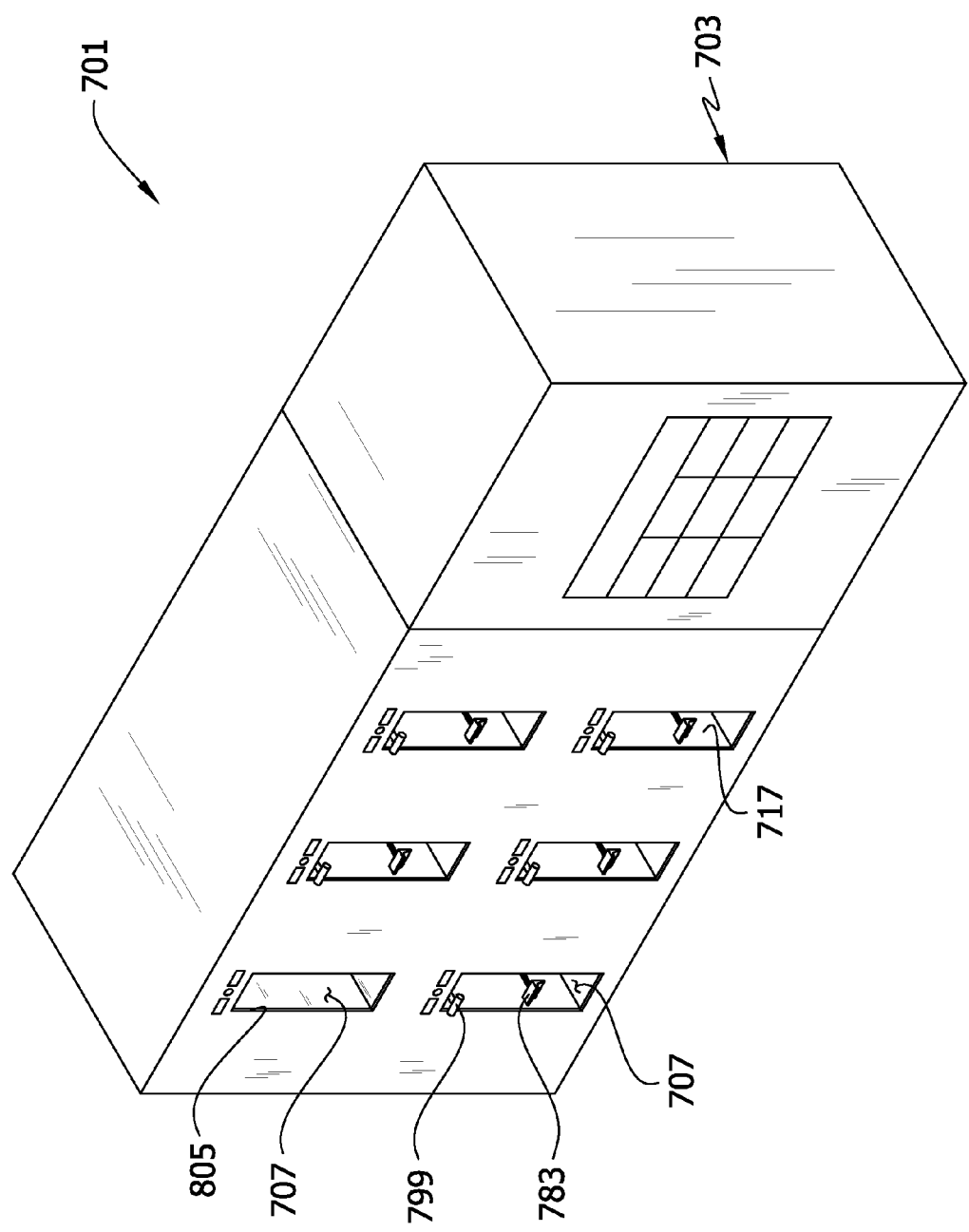
FIG. 29 is a perspective of another embodiment of rethermalizing apparatus of this invention not having a modular unit.
Figure 30:
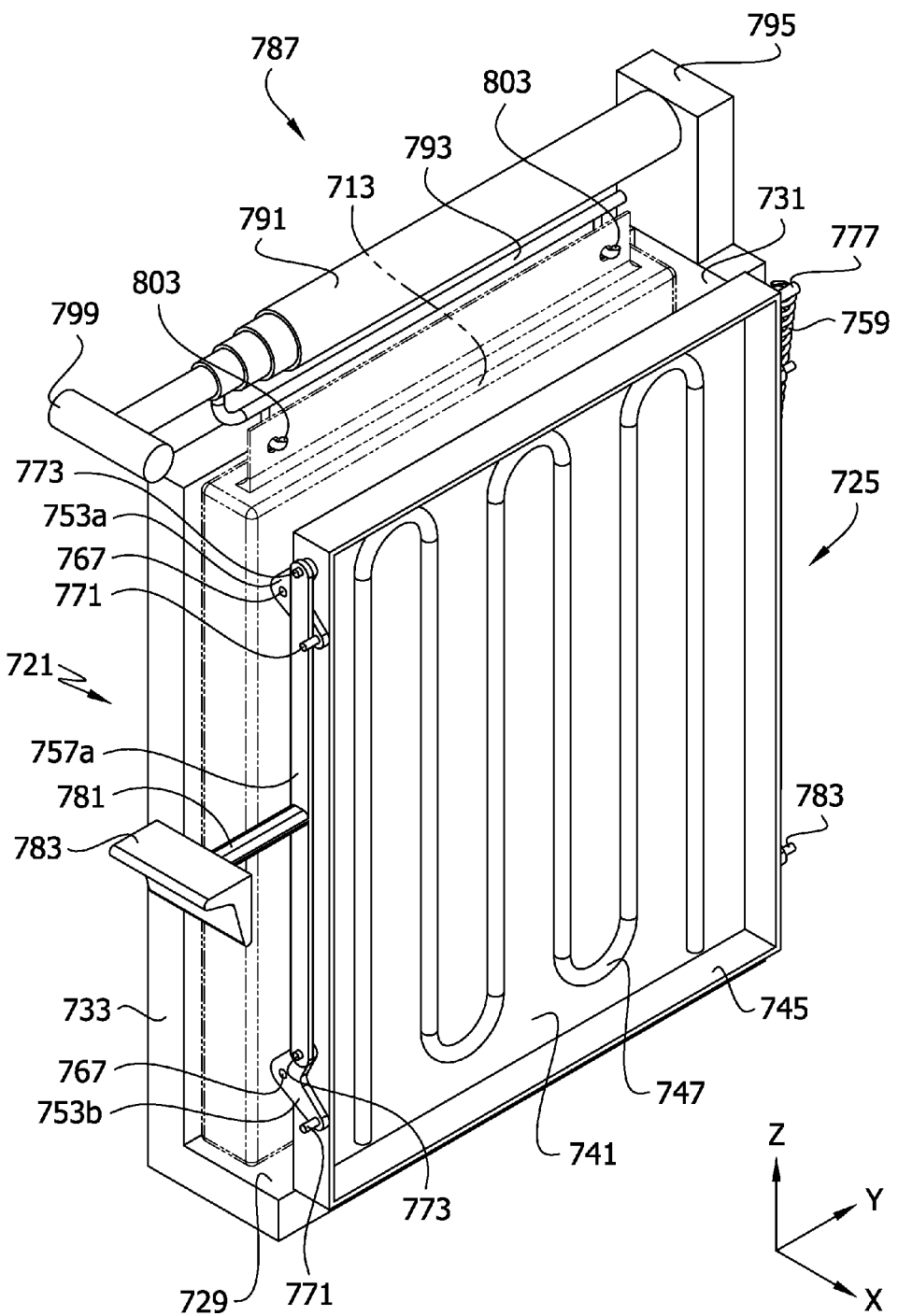
FIG. 30 is a front perspective of components from within a compartment of a cabinet of the apparatus of FIG. 29, the components being shown removed from the cabinet.

The cabinet 703 shown in FIG. 29 has several rows of compartments 707, and each compartment is sized such that only one package of food 713 can fit in the compartment. The heating system 717 in each compartment 707 comprises a first heating mechanism 721 adjacent the left side of the compartment and a second heating mechanism 725 adjacent the right side of the compartment. The first heating mechanism 721 comprises three thermally conductive walls, i.e., a generally vertical side wall 727 (e.g., heater plate), a generally horizontal bottom wall 729, and a generally vertical back wall 731. The walls have a peripheral flange 733 and are affixed to the structure of the cabinet 703. A heating element 735 comprising an electric coil is located on the back of the side wall 727 for conductive heating of the side wall. Heat from the heating element 735 is conducted from the side wall 727 to the bottom wall 729 and the back wall 731. Alternatively, additional heating elements may be located on the backs of the bottom wall 729 and the back wall 731. Thus, the first heating mechanism provides three heated walls 727, 729 and 731. The second heating mechanism 725 comprises a thermally conductive generally vertical side wall 741 (e.g., heater plate) having a peripheral flange 745. A heating element 747 comprising an electric coil is located on the back surface of the side wall 741 for conductively heating the side wall. The side wall 741 is movable side-to-side within the compartment 707 as described in more detail below.

The heating mechanisms 721, 725 may have different shapes or configurations without departing from the scope of the invention. For example, the first heating mechanism 721 may comprise a side wall and a bottom wall, and the second heating mechanism may comprise a side wall and a back wall. Additionally, both heating mechanisms 721, 725 may be movable, instead of only the second heating mechanism. Further, the bottom wall 729 and/or the back wall 731 may be movable independent of either side wall 727, 741.

An actuating mechanism, generally indicated 751, facilitates movement of the second heating mechanism and defines its path of movement within the compartment 707 between a loading or open position (FIG. 33) in which the side walls 727, 741 are spaced sufficiently far apart to permit loading of a package 713 into the cavity 752 at least partially defined by the side 727, 741 and bottom 729 walls, and a rethermalizing or closed position (FIG. 34) in which the side walls are spaced closer together for conductive heat transfer contact with an outside surface of the package. In one embodiment, the actuating mechanism 751 comprises four cranks 753a-753d, two bars 757a, 757b, and a spring 759.

The four cranks 753a-753d of the actuating mechanism 751 are located generally adjacent the four corners of the second heating mechanism 725, the two cranks 753c, 753d at the rear of the mechanism being referred to as upper and lower rear cranks and the two cranks 753a, 753b at the front of the mechanism being referred to as upper and lower front cranks. The upper and lower rear cranks 753c, 753d have pivot (pin) connections 761 with ears 763 on the peripheral flange 733 of the first heating mechanism 721 toward the rear of the compartment 707, and the upper and lower front cranks 753a, 753b have pivot (pin) connections 767 with a suitable structure in the cabinet 703. The upper front and rear cranks 753a, 753c pivot about a first axis extending in the Y-direction, and the lower front and rear cranks 753b, 753d pivot about a second axis extending in the Y-direction spaced below the first axis. One arm of each of the front cranks 753a, 753b has a pivot (pin) connection with a pin 771 on the flange 745 of the second heating mechanism 725, and the other arm of each of the front cranks has a pivot (pin) connection 773 with one end of a respective bar 757a which extends generally parallel to and outboard of the flange of the heating mechanism at the front of the mechanism. Similarly, one arm of each of the rear cranks 753c, 753d has a pivot (pin) connection with a pin 771 on the flange 745 of the second heating mechanism 725, and the other arm of each of the rear cranks has a pivot (pin) connection 773 with one end of a respective bar 757b which extends generally parallel to and outboard of the flange of the heating mechanism at the rear of the mechanism. The arrangement is such that rotation of the cranks 753a-753d in one direction (clockwise in FIG. 33) moves the second heating mechanism 725 to the left toward its rethermalizing position, and rotation of the cranks in the opposite direction (counterclockwise in FIG. 34) moves the second heating mechanism to the right toward its loading position. The range of movement of the second heating mechanism 725 between its two positions is limited by the engagement of the bars 757a, 757b with respective pins 771 on the second heating mechanism.

Figure 31:
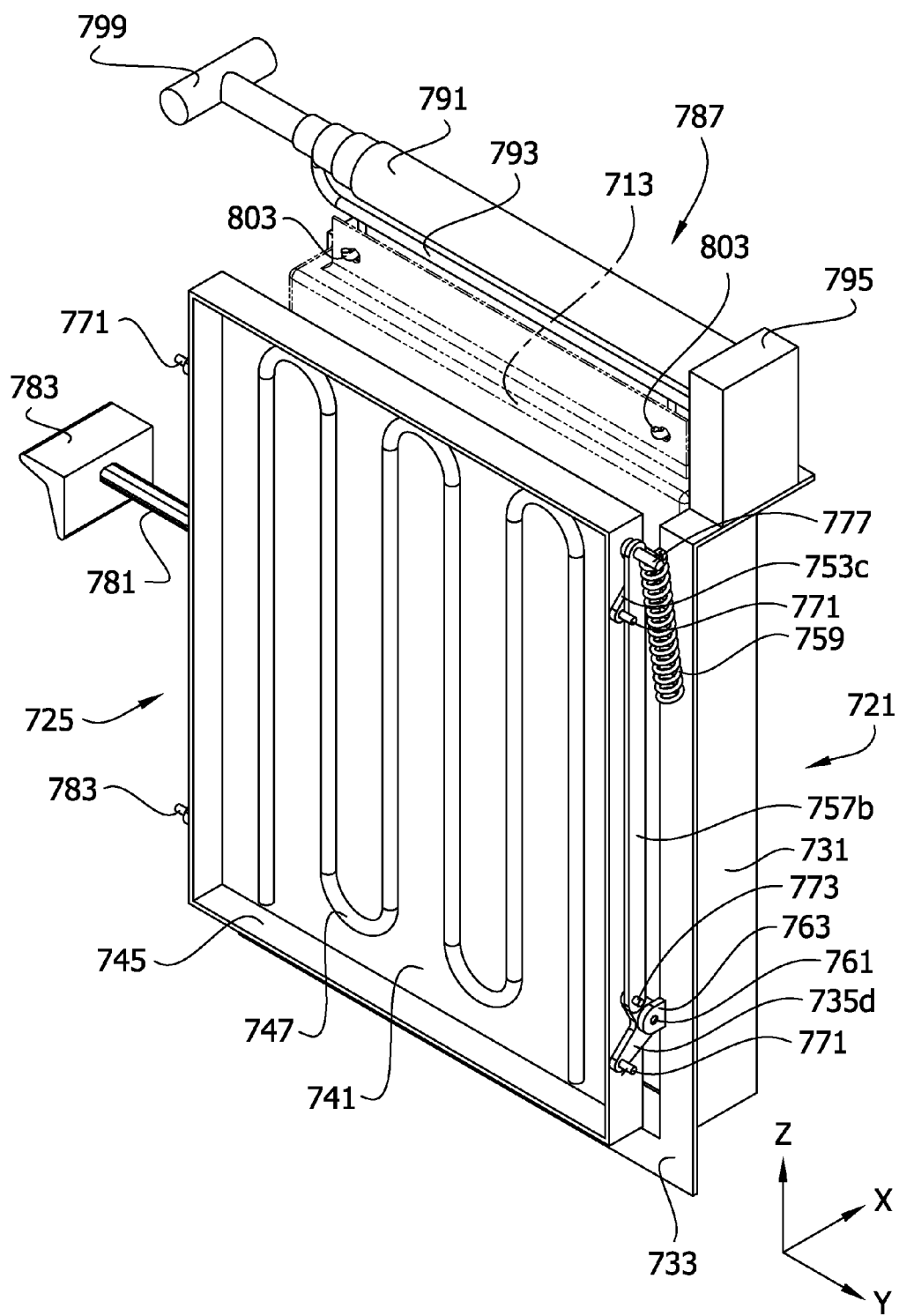
FIG. 31 is a back perspective of the components of FIG. 30.
Figure 32:
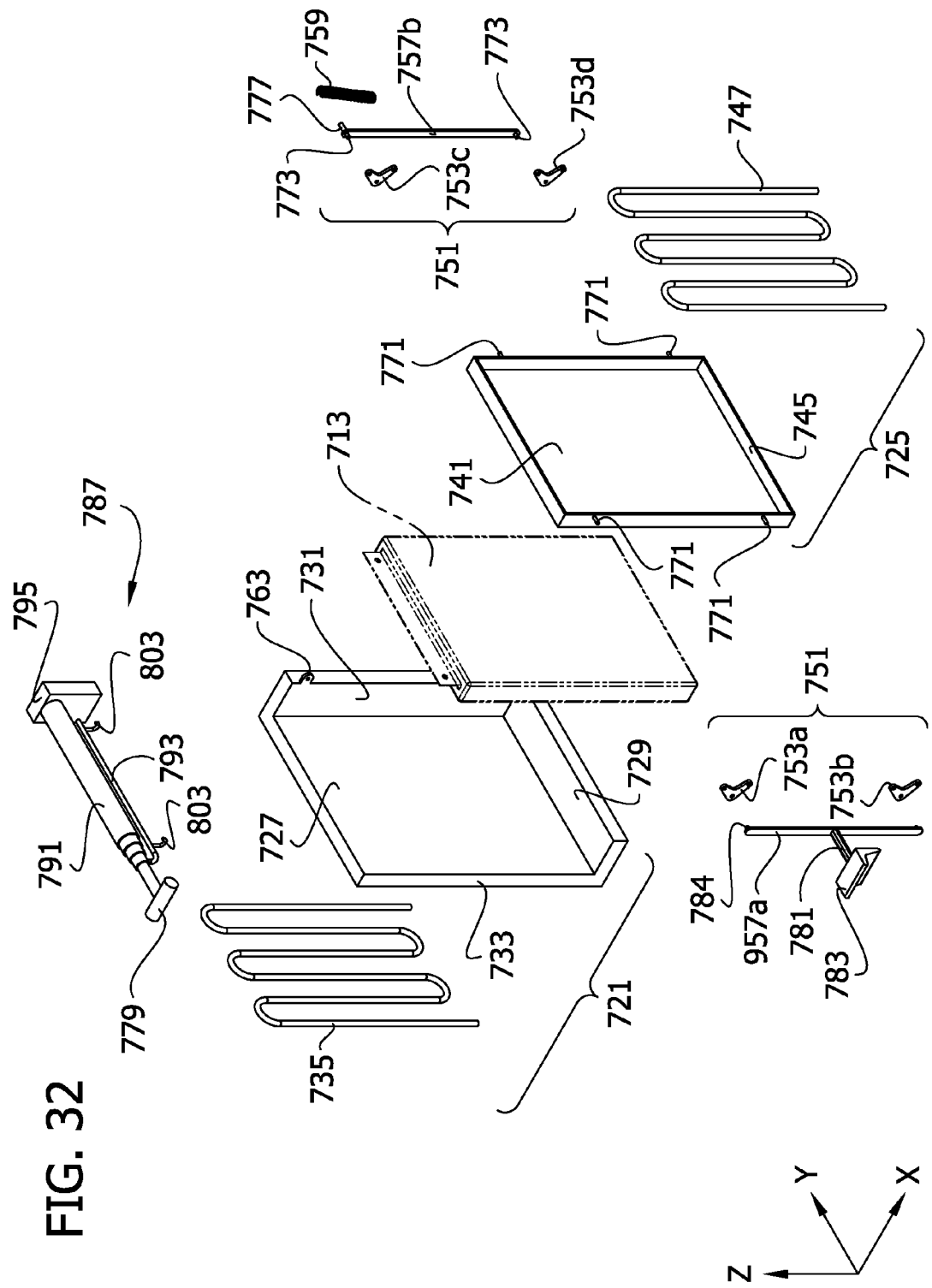
FIG. 32 is an exploded front perspective of the components of FIG. 30.
Figure 33:
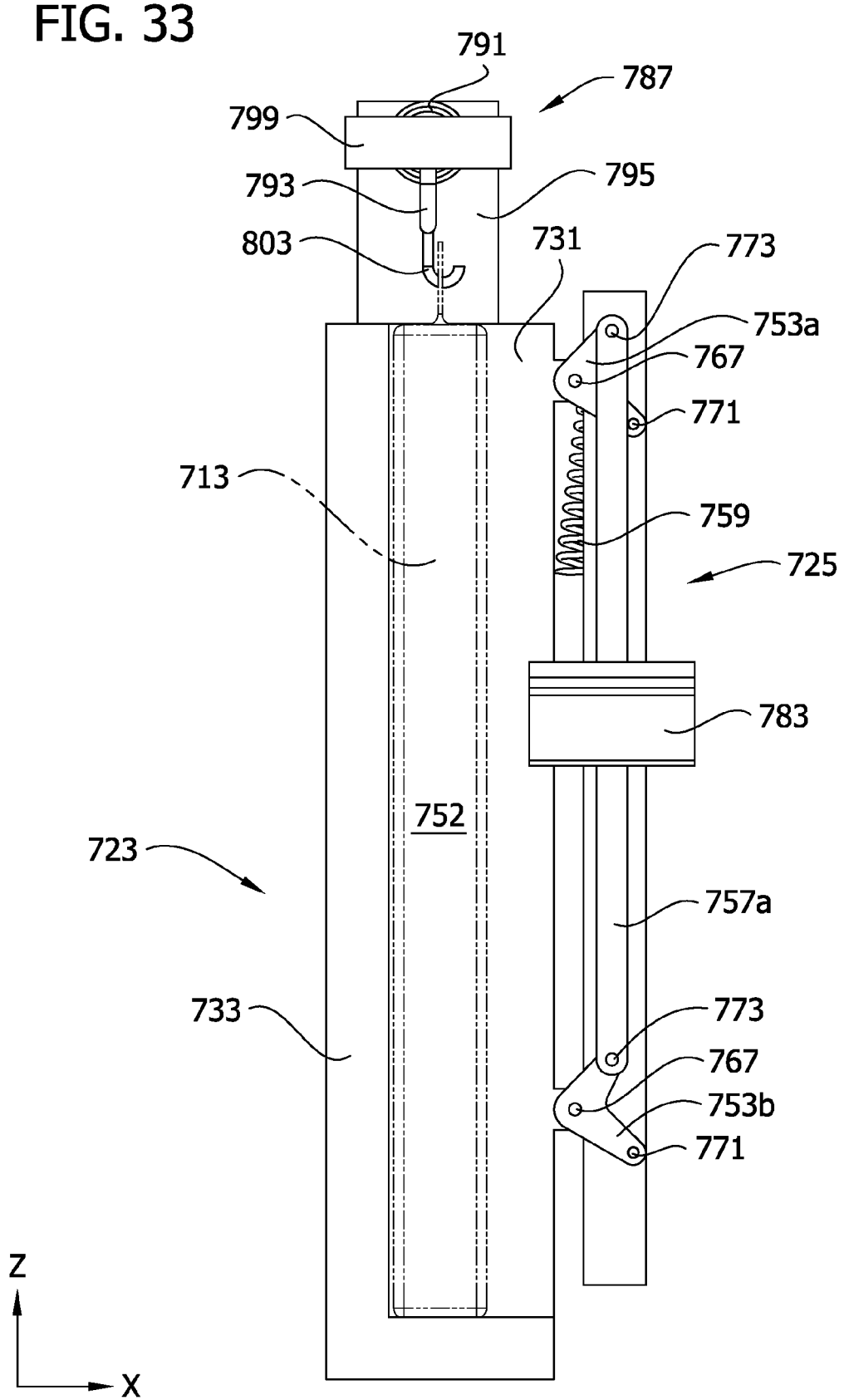
FIG. 33 is a front view of the components of FIG. 30, a movable heating mechanism being shown in an open or loading position.

The actuating mechanism 751 also comprises one or more biasing elements, shown as the tension coil spring 759 illustrated in FIG. 31. The spring 759 is attached at one end to a pin 777 extending from an upper end of the back bar 757b and at its other end to the peripheral flange 733 of the first heating mechanism 721. The spring 759 is arranged such that it applies a downward force tending to move the second heating mechanism 725 towards its loading position (FIG. 33) when the pin connection 773 moves "over center" to a position in which the longitudinal axis of the spring is right (X-direction) of the axis of rotation 761 of the crank 753c. The spring applies a downward force tending to move the heating mechanism towards its rethermalzing position (FIG. 34) when the pin connection 773 moves "over center" to a position in which the longitudinal axis of the spring is left of the axis of rotation 761 of the crank. Additional springs may be implemented in a similar fashion at locations adjacent the other cranks 753a, 753b and 753d. Alternatively, the heating mechanism 725 may not have an "over center" bias and be biased toward its closed position only.

Figure 34:
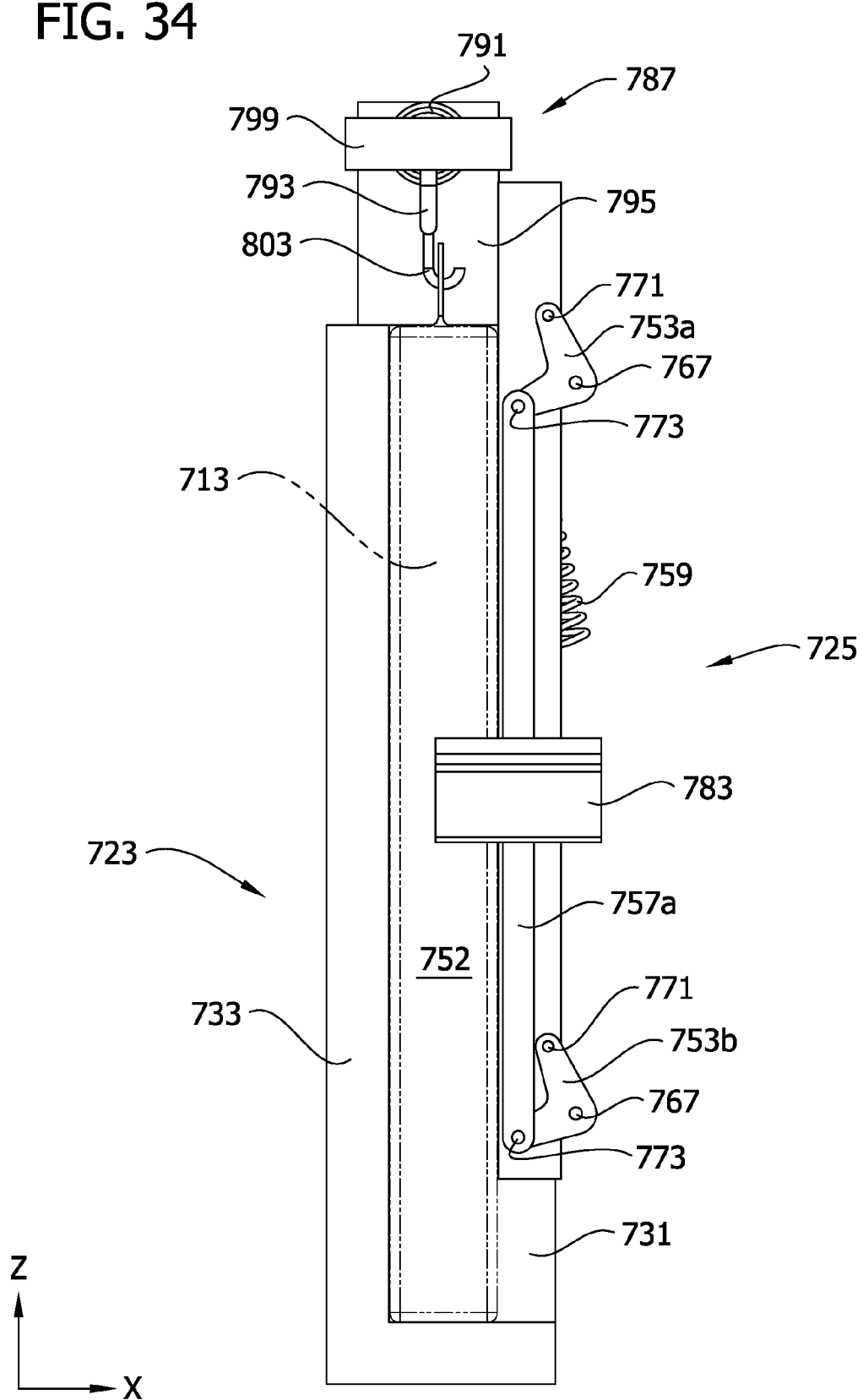
FIG. 34 is a view similar to FIG. 33 but showing the movable heating mechanism in a closed or rethermalizing position.

The actuating mechanism 751 further comprises an arm 781 and a handle 783 which may be used by an operator to move the first heating mechanism 725 along its defined path within the compartment 707. The arm 781 is rigidly affixed to the front face of the front bar 757a, and the handle 783 is affixed to the arm. Movement of the handle 783 generally from right to left in the X-direction (as viewed in FIG. 33) causes the bars 757a, 757b to move generally from right to left and the cranks 753a-753d to rotate in a counter-clockwise direction around their respective axes. As a result, the heating mechanism 725 moves generally from right to left toward the second heating mechanism 721 and a closed (rethermalizing) position (FIG. 34).

The actuating mechanism 751 as described above may have other forms without departing from the scope of the present invention. For example, the cranks 753a-753d may vary in number or shape. In addition, more or fewer springs 759 may be used, or biasing of one or more of the heating mechanisms 721, 725 may be accomplished in a different manner. Many constructions may be implemented to effectuate a movement of one or both of the heating mechanisms 721, 725 between open and closed positions.

Apparatus 701 also comprises a support mechanism generally indicated 787 for supporting a package of food 713 within the compartment 707, and more specifically within the cavity 752 for rethermalization. In the illustrated embodiment, the support mechanism 787 generally comprises an extensible and retractable arm 791 and a hanger 793 on the arm for supporting a package 713 in the cavity 752 between the first and second heating mechanisms 723, 725. The arm 791 is attached to a bracket 795 affixed to the flange 733 above the back wall 731 of the first heating mechanism 721 and extends as a cantilever generally horizontally from the bracket above the cavity 752. In the illustrated embodiment, the arm 791 comprises a plurality of telescoping sections so that the arm may be extended and retracted as needed during the package loading and unloading process to be described. The telescoping arm 791 has a grip 799 at its front end to facilitate movement of the arm by an operator between the retracted and extended positions shown in solid and phantom lines, respectively, in FIG. 35. The hanger 793 is affixed to an outer section of the telescoping arm 791 and extends below the arm. The hanger includes a number of hooks 803 on which a package of food 713 may be hung. Desirably, the hooks 803 are located at an elevation such that the bottom of a suspended package 713 is in conductive heat transfer contact with the bottom wall 729 of the first heating mechanism 721 when the package is initially loaded into the cavity.

Figure 35:
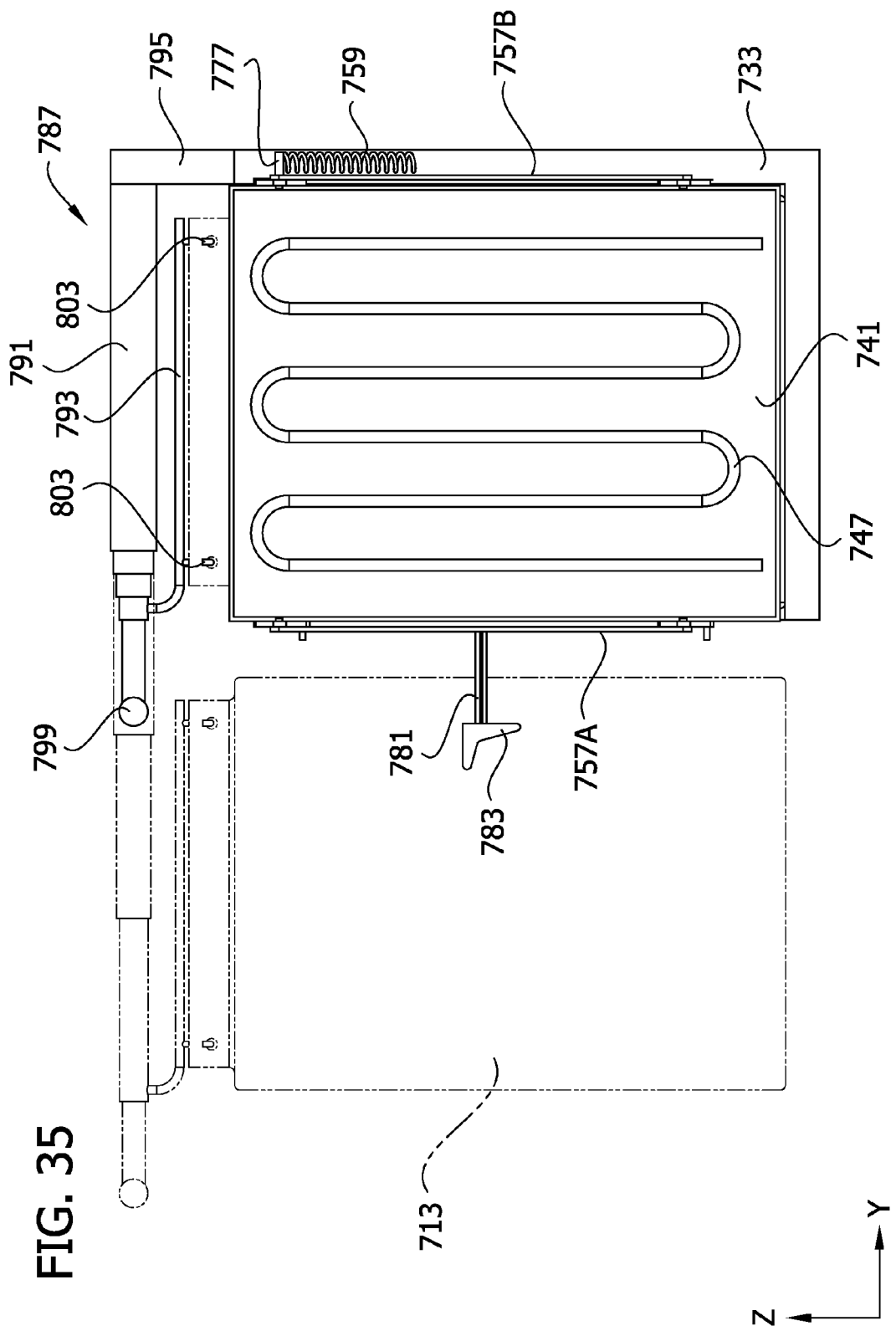
FIG. 35 is a right side elevation of the components of FIG. 30 showing an extensible and retractable arm in an extended position in phantom lines and in a retracted position in solid lines.

To begin a rethermalizing operation, the telescoping arm 791 is moved from the retracted position shown in solid lines in FIG. 35 to its extended position shown in phantom lines. A package of food 713 is hung on the hooks 803, and the telescoping arm 791 is returned to its retracted position within the compartment 707. As the arm 791 is moved toward its retracted position, the package of food 713 moves into the compartment 707 in the cabinet 703 through a vertical opening or slot 805 and then into the cavity 752 defined by the side wall 727, the bottom wall 729 and the back wall 731 of the first heating mechanism 721, and the side wall 741 of the second heating mechanism 725.

After the food package 713 is loaded into the cavity 752, the actuating mechanism 751 is used to move the second heating mechanism 725 from its open (loading) position (FIG. 33) to its closed (rethermalizing) position (FIG. 34). When the actuating mechanism 751 is in its open position, the spring 759 of the mechanism applies a downward force urging the heating mechanism 725 to the right (X-direction) to a position in which the bars 757a, 757b rest against the bottom pins 771. To move the heating mechanism 725 toward its closed position, the handle 783 is moved generally right to left (as viewed in FIGS. 33 and 34), which causes the bars 757a, 757b to move generally right to left and the cranks 753a-753d to rotate in a counter-clockwise direction. After the pin connection 773 moves "over center," the downward force of the spring 759 urges the heating mechanism 725 towards its closed position. Additionally, after the pin connection 773 moves to a position left of a vertical line (Z-direction) through the axis of rotation 761 of the crank 753c, gravity tends to move the heating mechanism 725 towards its closed position. The defined path of movement of the heating mechanism 725 is limited by contact of the top pins 771 against the bars 757a, 757b after the cranks 753a-753d have rotated approximately 180 degrees from their initial positions. Desirably, when the bars 757a, 757b are in contact with the top pins 771 in the closed position, the width of the cavity 752 in the X-direction, i.e., the distance between the side wall 727 of the first heating mechanism 721 and the side wall 741 of the second heating mechanism 725, is less than the width of the package of food 713. As a result, the bias of the second heating mechanism 725 continues to act against the package of food as it changes shape throughout rethermalization.

After rethermalization is complete, the handle 783 is moved generally left to right (as viewed in FIGS. 33 and 34), thus moving the bars 757a, 757b generally left to right and rotating the cranks 753a-753d in a clockwise direction. After the pin connection 773 moves "over center," the downward force of the spring 759 tends to move the heating mechanism 725 to its open position. The heating mechanism 725 comes to rest in its open position (FIG. 33) against the bottom pins 771. The telescoping arm 791 is then extended using the grip 799 to move the package of food 713 out of the compartment 707. The package of food 713 is then removed from the hooks 803. A new package 713 may then be suspended from the hooks 803 and the procedure repeated.

Figure 36:
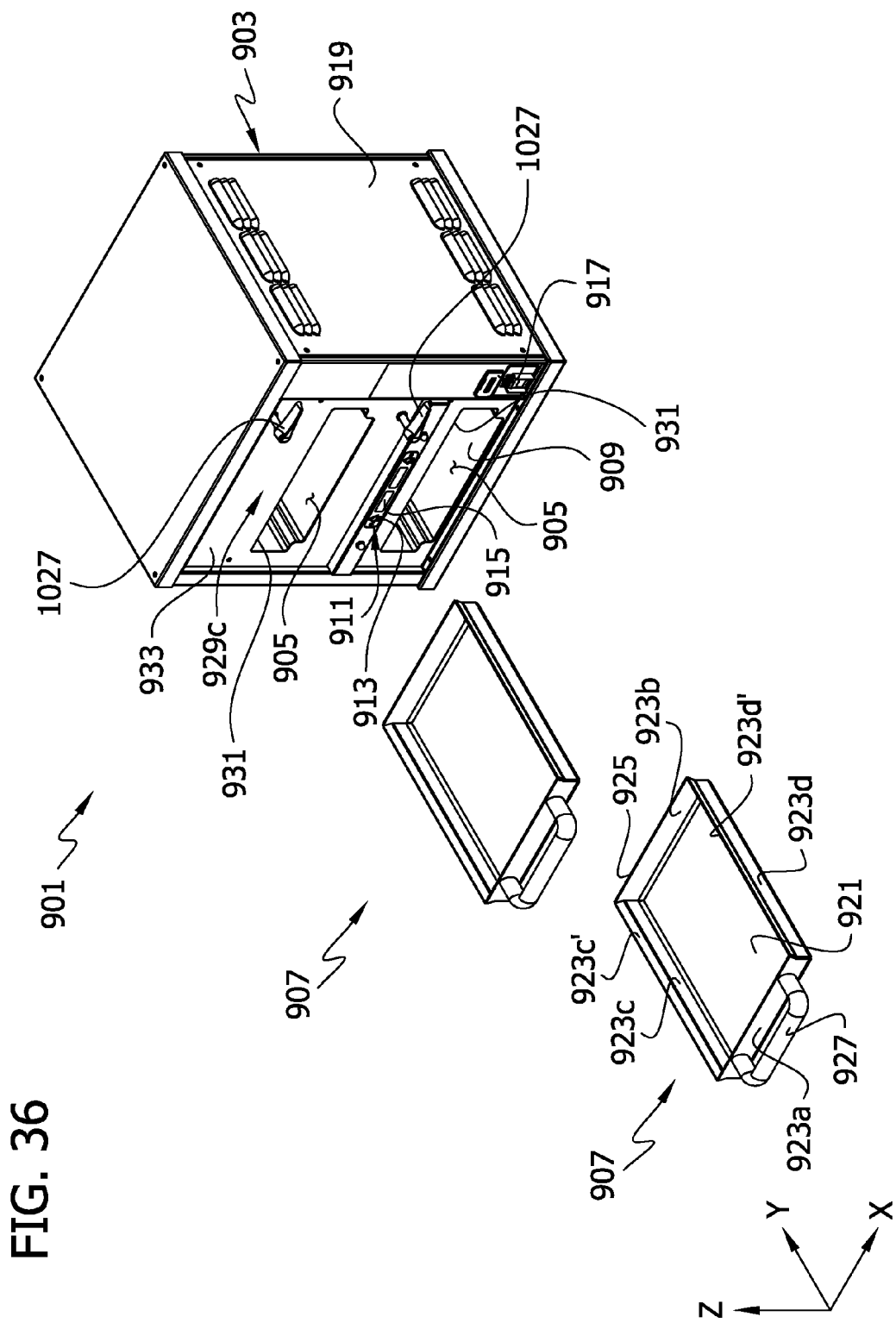
FIG. 36 is a front perspective of another embodiment of rethermalizing apparatus of this invention, modular units being removed from a cabinet.

FIGS. 36-52 illustrate another embodiment of apparatus of the present invention, generally designated 901. The apparatus 901 is similar in many respects to other embodiments described above. As shown in FIG. 36, the apparatus 901 generally comprises a cabinet 903 having one or more compartments 905 each of which is sized for receiving one or more modular units 907 containing food to be rethermalized. A heating system 909 is provided in each compartment 905 for heating a respective modular unit or units 907 in the compartment.

The apparatus 901 includes a control system (not shown) as described in previous embodiments for controlling operation of the heating system 909. The control system includes an operator interface 911 including one or more input devices 913 associated with one or more compartments 905 for controlling temperature and/or time parameters of individual compartments. An optional display 915 may be provided on the cabinet for displaying information relating to each compartment. A USB port 917 is provided on the front, lower right side of the cabinet for transferring information to the control system. The control system can be programmed to operate the heating systems 909 of the cabinet 903 in various ways, as described above, such as operating a heating system of one compartment 905 independently from the heating systems of other compartments. In the embodiment shown in FIG. 36, the control system is housed in a cavity (not shown) on the right side of the cabinet 903 and is accessible by removing a right panel 919 on the cabinet.

Figure 49:
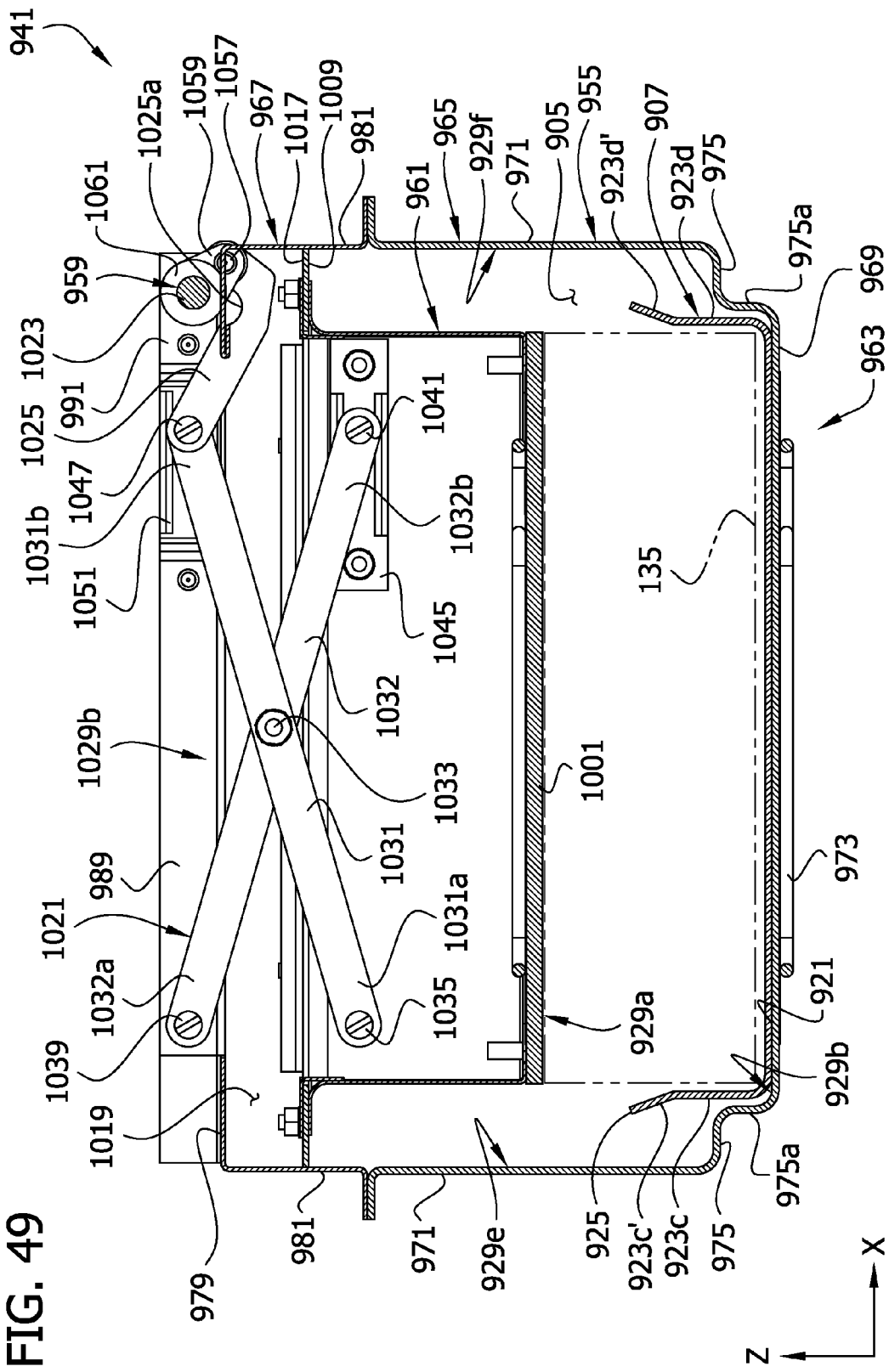
FIG. 49 is a view similar to FIG. 48, a package of food contained in the modular unit being inserted in a compartment of the heating module, the heating mechanism being in conductive heat transfer contact with the package of food.

In this embodiment, the modular unit 907 comprises a receptacle in the form of a generally rectangular tray (also designated 907), which is preferably made of a thermally conductive material, such as aluminum. Alternatively, the modular unit 907 may be made of a plastic. The modular unit 907 does not include a cover as in other embodiments. The rectangular tray 907 has a bottom wall 921, four upstanding side walls 923a-923d (i.e., front and back walls 923a, 923b and two side walls 923c, 923d), a peripheral rim 925, and a U-shaped handle 927. Alternatively, the tray 907 may have no side walls 923a-923d. Desirably, however, the modular unit 907 is dimensioned such that respective walls 921 and 923a-923d are in conductive heat transfer contact with faces of the outside surface of the package 135 placed in the unit. Accordingly, the tray 907 has an X-dimension which is substantially the same as the food package 135 in its frozen or refrigerated state such that the two side walls 923c, 923d of the tray maintain conductive heat transfer contact with respective side faces of the food package. Similarly, the front wall 923a and the back wall 923b of the tray define a Y-dimension which is substantially the same as the food package 135 in its frozen or refrigerated state such that the front and back walls 923a, 923b maintain conductive heat transfer contact with respective side faces of the food package. For reasons which will become apparent, as best shown in FIGS. 36 and 49, an upper portion 923c', 923d' of respective side walls 923c, 923d is slanted outward widthwise of the tray 907 to provide the tray with a "wide mouth" opening. Although not shown, upper portions of the front and back walls 923a, 923b may be similarly slanted.

Alternatively, any of the modular units described in previous embodiments could be used. For example, modular units 11 or 11' including a cover and/or a movable side wall could be used.

Figure 17:
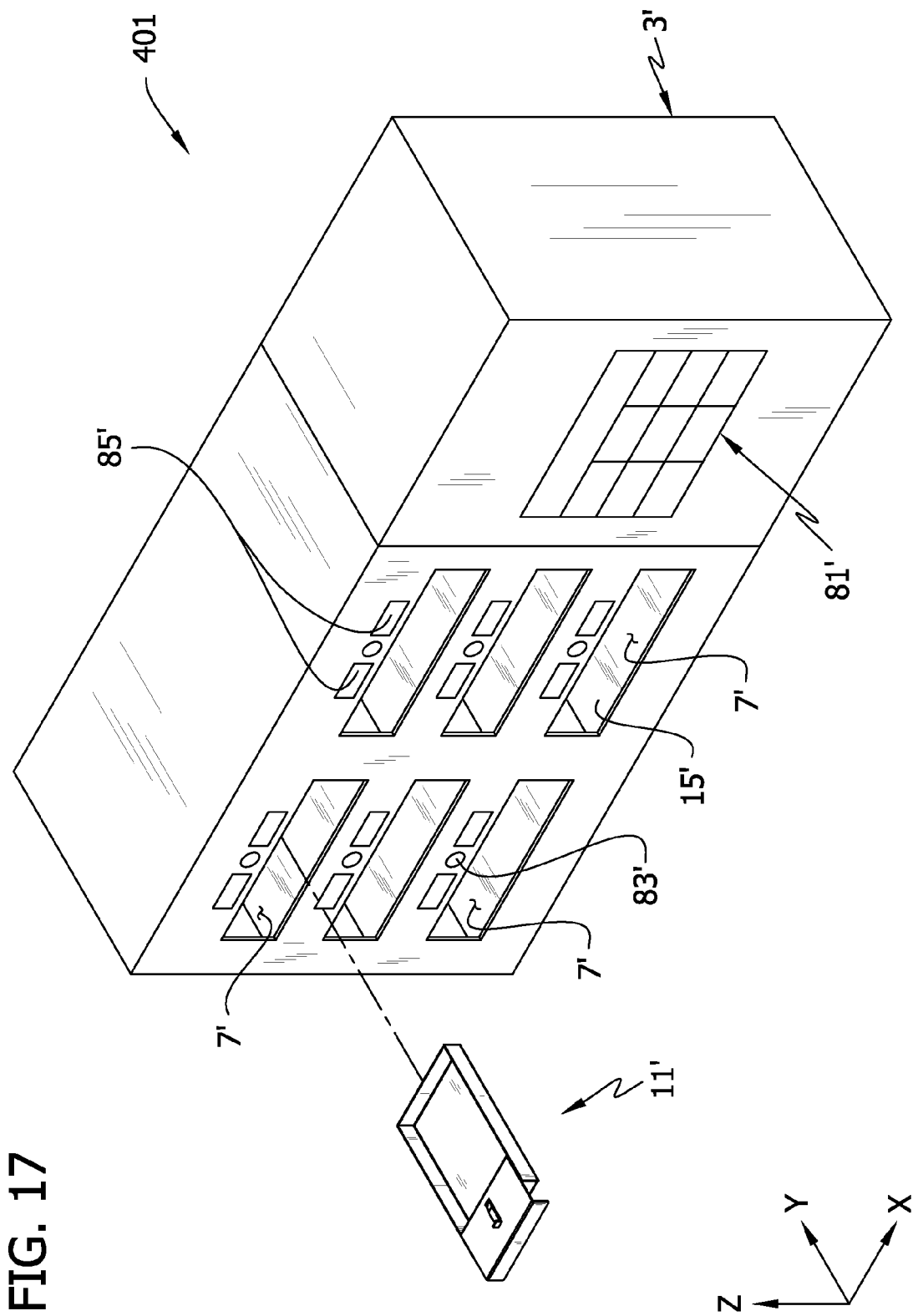
FIG. 17 is a perspective of another embodiment of rethermalizing apparatus of this invention.
Figure 18:
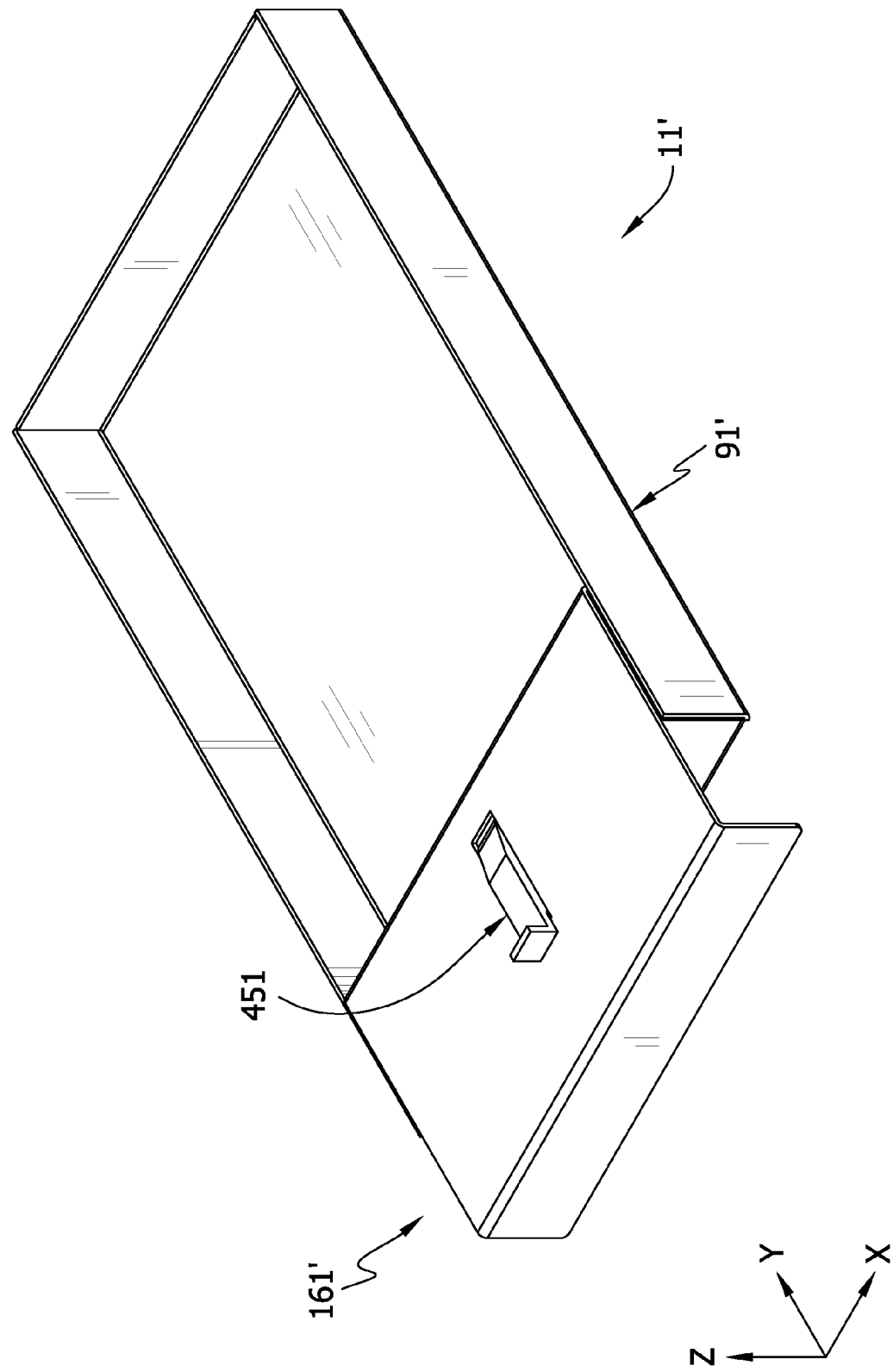
FIG. 18 is a perspective of a modular unit of the apparatus of FIG. 17 in which the modular unit does not have a cover.
Figure 19:
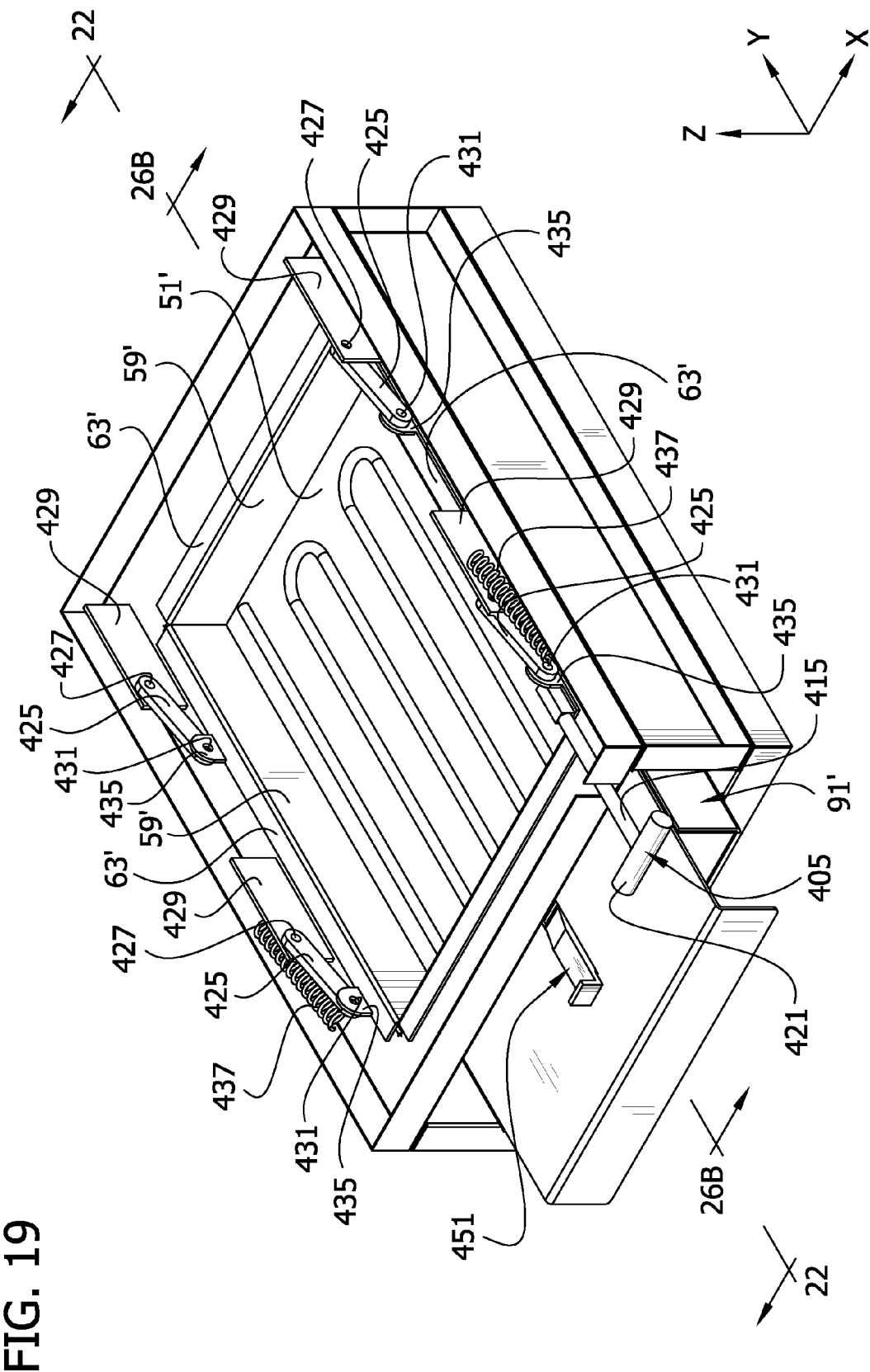
FIG. 19 is a perspective view of the modular unit of FIG. 18 received in a compartment of a cabinet of the apparatus of FIG. 17 showing an upper heater plate in a lowered position.
Figure 20:
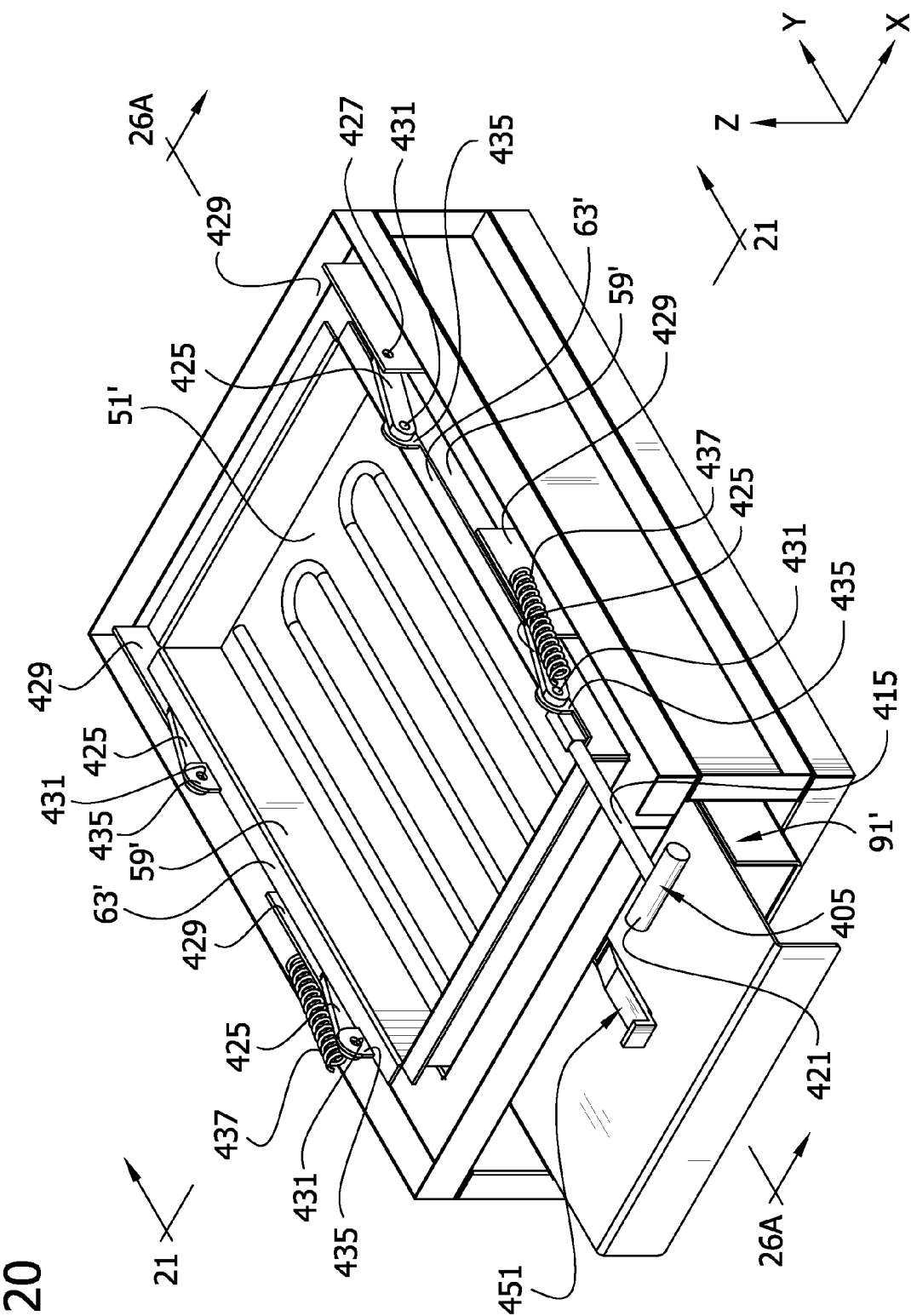
FIG. 20 is a view similar to FIG. 19 but showing the upper heater plate in a raised position.
Figure 21:
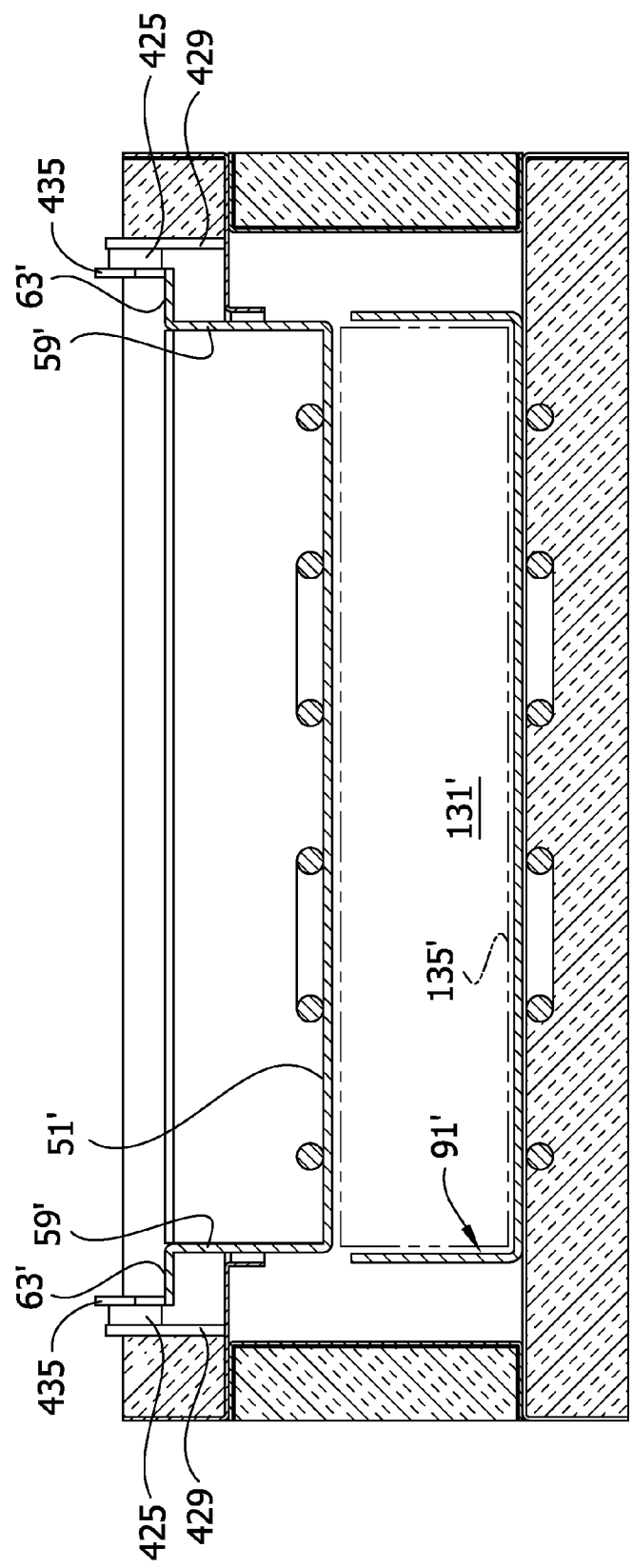
FIG. 21 is an enlarged section taken widthwise of the compartment along line 21-21 in FIG. 20 showing a modular unit received in a compartment of a cabinet of the apparatus of FIG. 17.
Figure 22:
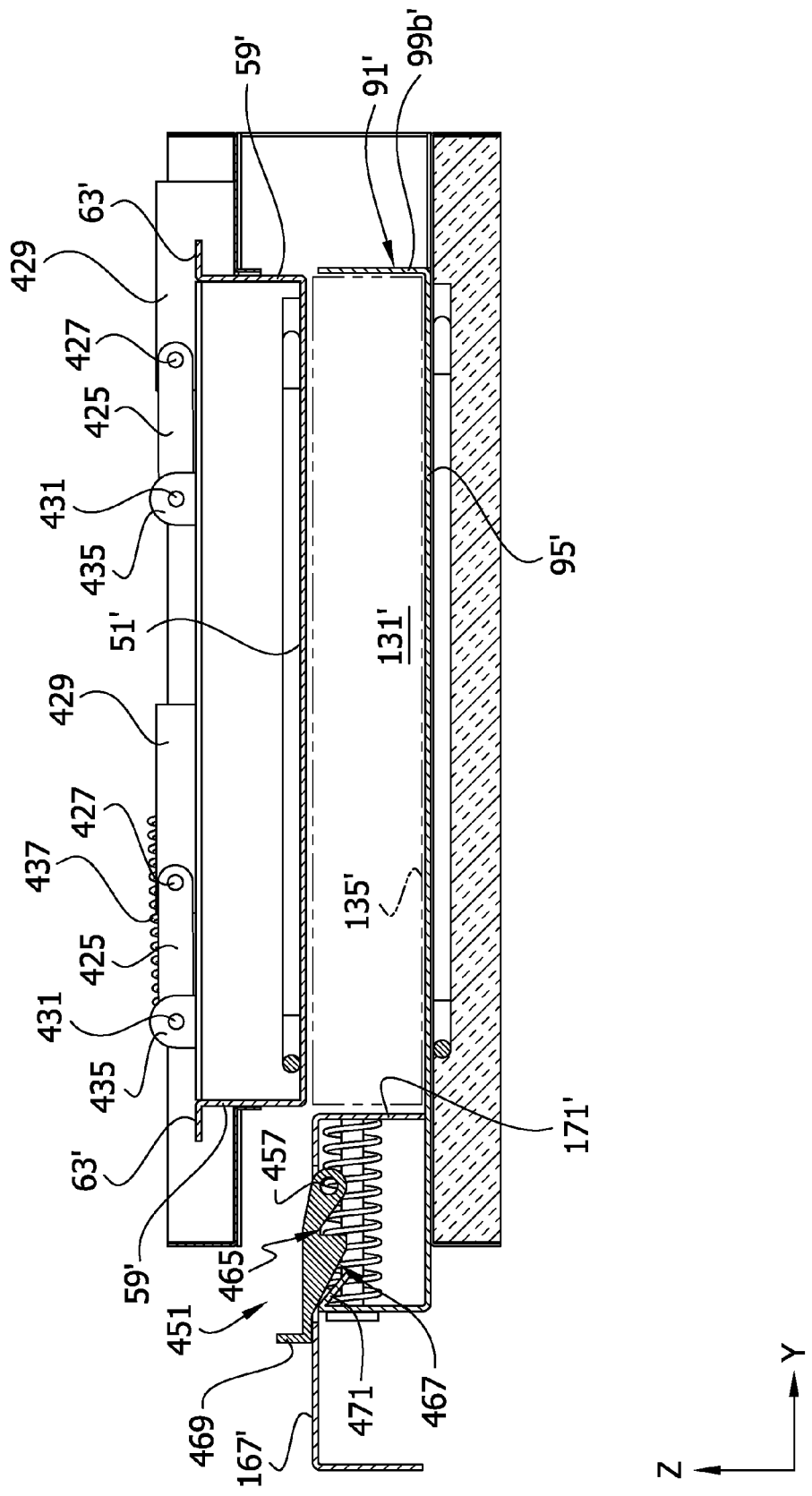
FIG. 22 is a view similar to FIG. 21 but taken lengthwise of the compartment along line 22-22 in FIG. 19.
Figure 23:
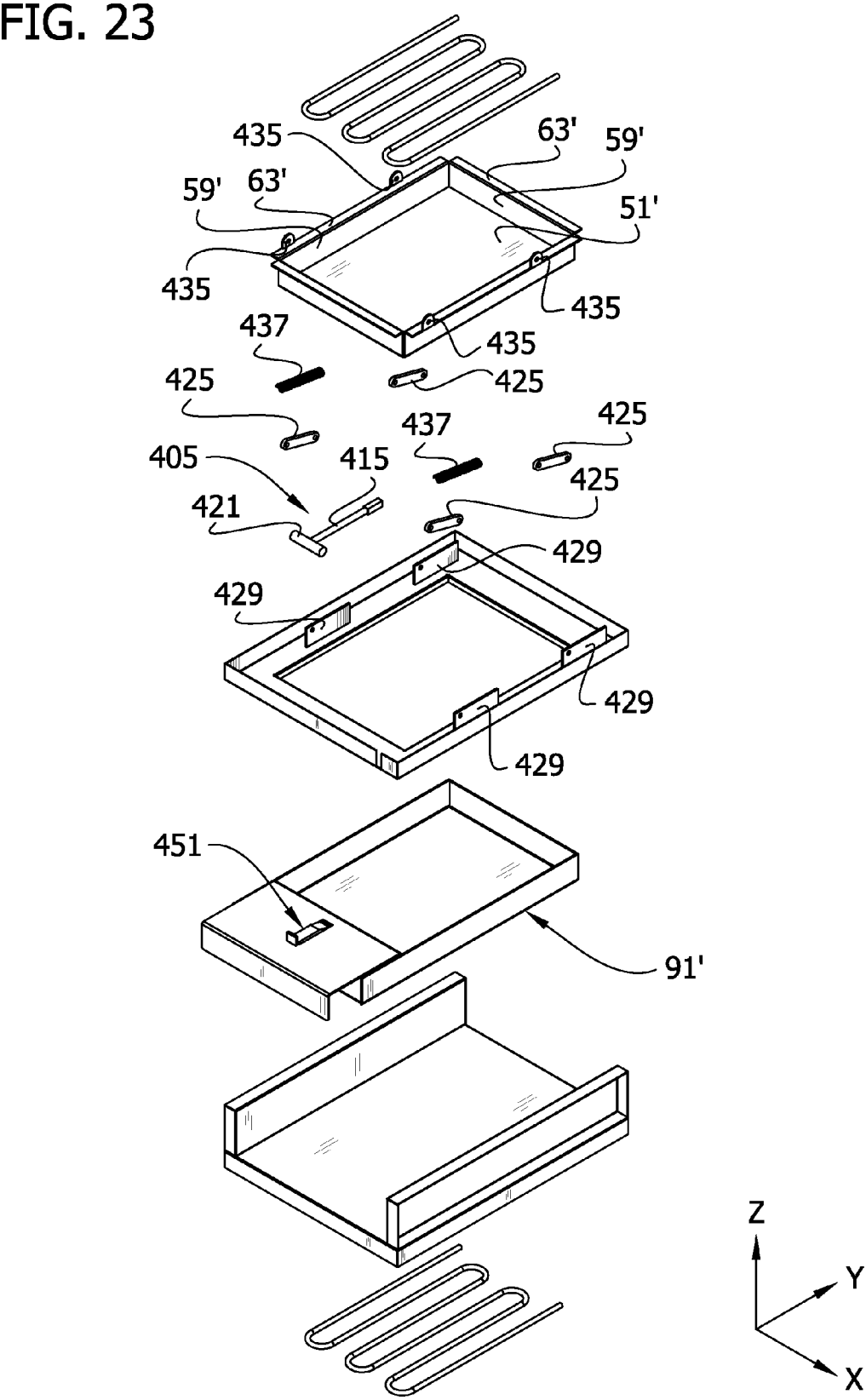
FIG. 23 is an exploded perspective of components of a heating system and the modular unit of FIGS. 21 and 22.

Although two compartments 905 are shown, cabinets 903 having one compartment or more than two compartments such as shown in FIGS. 16 and 17 are possible. Each compartment 905 is bounded by an upper surface 929a; a bottom surface 929b; front and back surfaces 929c, 929d; and opposite side surfaces 929e, 929f. The compartments 905 are accessible through openings 931 in a front panel 933 of the cabinet 903 and through openings (not shown) in a back panel 935 of the cabinet. The openings in the back panel 935 are similar in shape and size as the openings 931 in the front panel 933 and, as shown in FIG. 37, optional plates 937 may be slid into retainers 939 to cover the openings. The plates 937 may be removed periodically to facilitate cleaning of the compartments 905 or be removed permanently in situations where "pass through" access to the compartments is desired.

Figure 39:
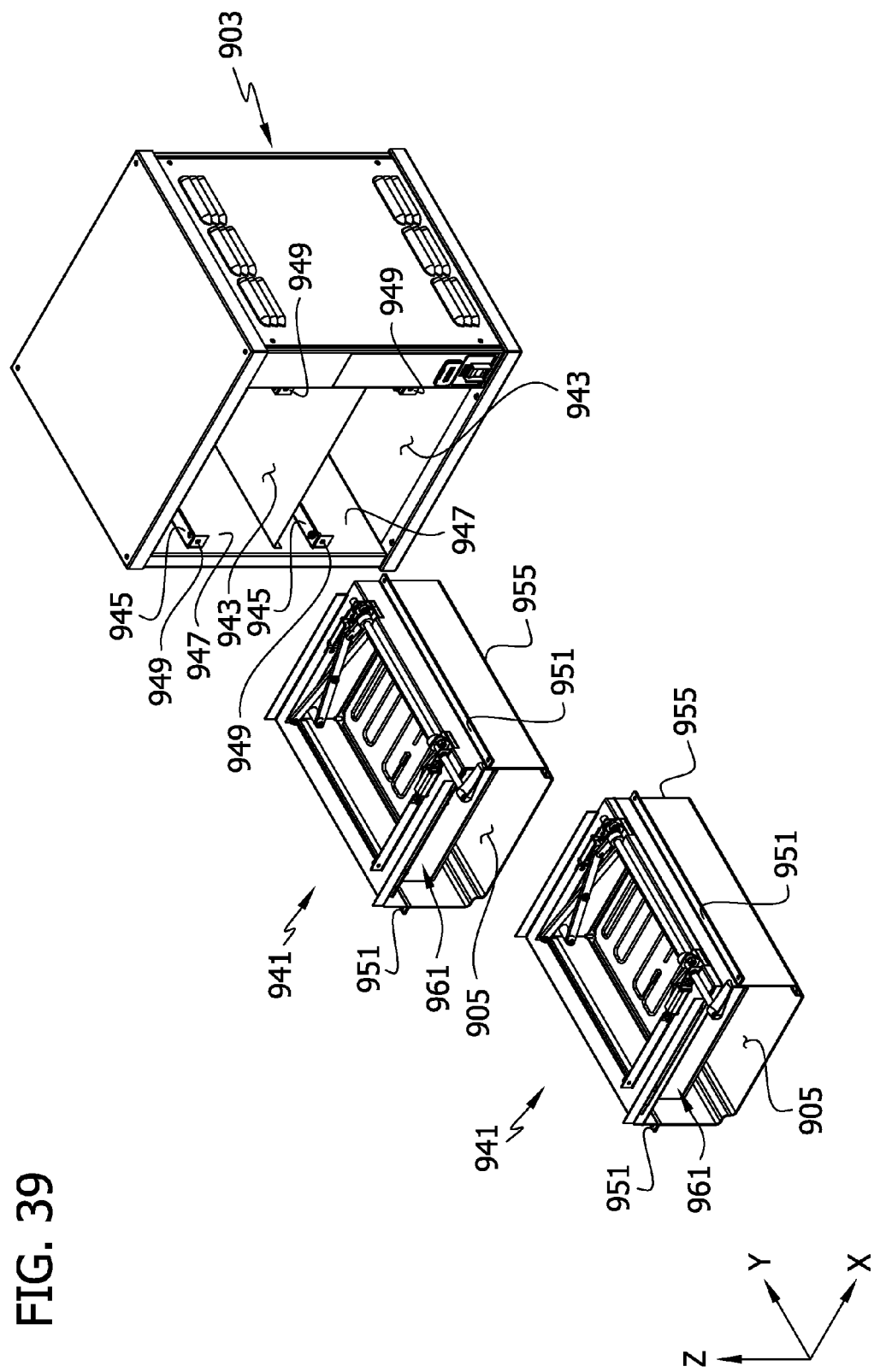
FIG. 39 is a front perspective of the cabinet, two heating modules being removed from respective cavities of the cabinet.

As shown in FIG. 38, the front panel 933 may be removable from the cabinet 903 (e.g., by removing bolts) to expose heating modules 941 mounted within the cabinet. In addition, the back panel 935 may be removable. As shown in FIG. 39, the cabinet has two cavities 943, each being sized for receiving only one heating module 941. The heating modules 941 are "modular" in the sense that they are constructed to have similar components. Heating modules 941 may be removed from the front or back of the cabinet 903 for maintenance procedures (e.g., cleaning) or to replace defective parts.

Figure 40:
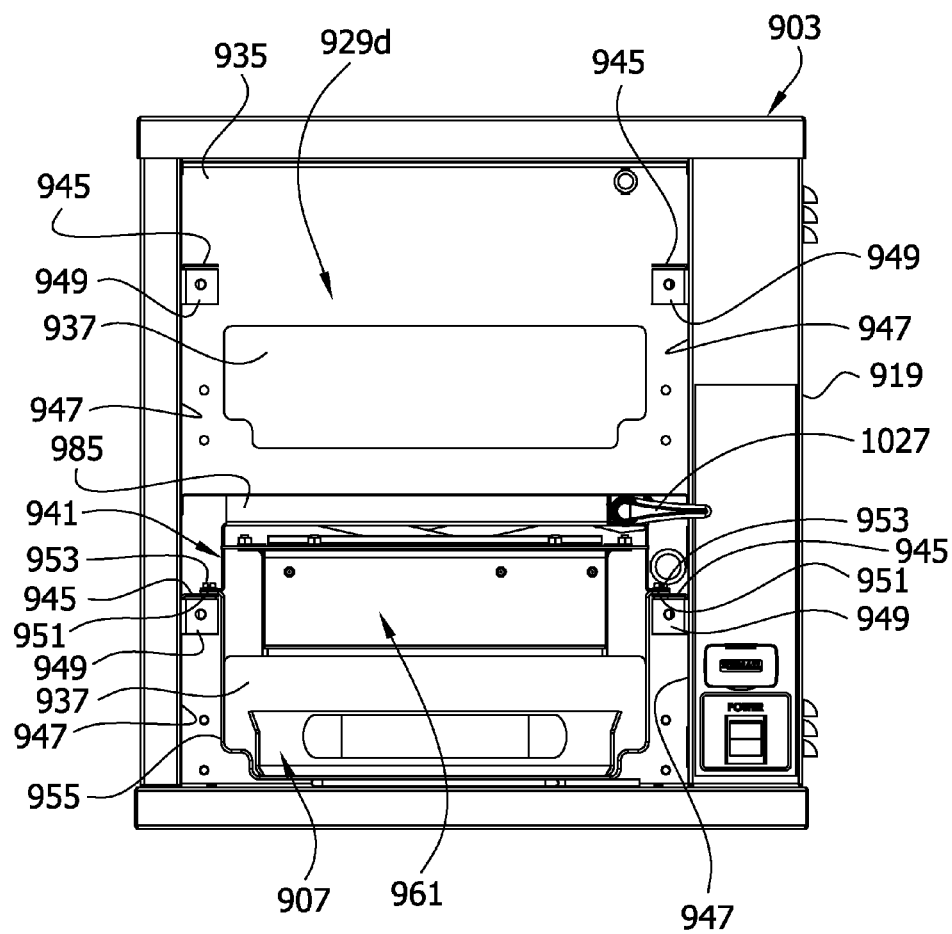
FIG. 40 is a front elevation of the cabinet, the top heating module being removed.

As shown in FIGS. 38-40, the heating modules 941 are supported in respective cavities 943 on rails 945 that extend along the length of side walls 947 of the cabinet 903. Brackets 949 are provided at the ends of the rails 945 for mounting the front and back panels 933, 935. Shoulders 951 are provided on sides of the heating modules 941 and extend along a length of the modules. The heating modules 941 may be inserted into the cavities 943 by resting ends of the shoulders 951 on the rails 945 and sliding the modules into the cavities. Bolts 953 or other fasteners are used to hold the heating modules 941 in place once properly positioned within a cavity 943. Certain components of the heating modules 941, e.g., heating components, may need to be electrically connected to the cabinet 903. The front and/or back panels 933,935 may then be replaced on the cabinet 903.

An example of a heating module 941 is shown in detail in FIGS. 41-50. The heating module 941 generally comprises a frame 955, a heating system 957, and an actuating device 959. The heating system 957 includes a movable upper heating mechanism 961 and a lower heating mechanism 963. The actuating device 959 is operable to move the upper heating mechanism 961 between a raised position (e.g., FIGS. 41, 43, 44, 46, and 47) and a lowered position (e.g, FIGS. 45, 46, and 48) to bring the heating mechanism 961 into conductive heat transfer contact with the package of food 135.

The frame 955 comprises lower and upper frame members 965, 967. The lower frame member 967 is formed as a channel having a bottom wall 969 and two side walls 971 extending up from the bottom wall. A heating element 973 (e.g., electric resistance coil) is provided below the bottom wall 969 of the lower frame member 965, which together comprise the lower heating mechanism 963. The lower frame member 965 is desirably made of a thermally conductive material, such as aluminum, and conductively heats the bottom wall 921 of the tray 907. By way of example, the bottom wall 969 of the lower frame member 965 may be a 3/16 in. thick plate of aluminum. Further, the heating element 973 may comprise an electric coil sandwiched between an upper layer of foil and a lower layer of foil, the latter of which is adhered to the lower surface of the wall 969 for increasing the conduction of heat to the plate.

Where the side walls 971 meet the bottom wall 969, the lower frame member 965 has steps 975 that extend along a length of the lower frame member. The steps 975 serve to guide the tray 907 as it is inserted into the compartment 905 to center the tray widthwise of the compartment for reasons which will become apparent. The steps 975 are sized such that the sides 923c, 923d of the tray 907 are relatively close to generally vertical side surfaces 975a of the steps. The side surfaces 975a of the steps 975 may touch the side walls 923c, 923d of the tray 907 such that the side walls of the tray may be conductively heated by the heating element 973 through the side surfaces of the steps. Flanges 977 are provided at upper ends of the side walls 971 for connecting the lower frame member to the upper frame member 967.

The upper frame member 967 is of inverted-channel shape and comprises a top wall 979 and two side walls 981 extending down from the top wall. Two flanges 983 extend along lower ends of respective side walls 981 for connecting the upper frame member 967 to the flanges 977 of the lower frame member 965. Lips 985 extend up from front and back edges of the top wall 979 for abutting against the front and back panels 933, 935 of the cabinet 903, respectively. An opening 987 in the top wall 979 provides clearance for the actuating device 959, as will become apparent. Upstanding flanges 989 and upstanding ears 991 along front and back edges of the opening 987 are provided for mounting components of the actuating device 959, as described in further detail below.

The upper heating mechanism 961 comprises a housing 993 disposed between the lower and upper frame members 965, 967. The housing 993 includes a rectangular frame 995 having four upstanding side walls (front wall 995a, back wall 995b, and side walls 995c, 995d) and an open top 997 and bottom 999. A plate 1001, which is desirably made of a thermally conductive material, such as aluminum, is mounted to the bottom of the frame 995, such as by bolts 1003 at corners of the frame. The plate 1001 closes the open bottom 999 of the frame 995 and forms a bottom wall, also designated 1001, of the housing 993. The bottom wall 1001 and side walls 995a-995d of the housing 993 define an interior space 1005. A heating element 1007 (e.g., electric coil) is housed in the interior space 1005 above the plate 1001. By way of example but not limitation, the heating element 1007 may comprises an electric coil sandwiched between an upper layer of foil and a lower layer of foil, the latter of which is adhered to the upper surface of the plate 1001 for increasing the conduction of heat to the plate. The plate 1001 itself may be a 3/16 in. thick aluminum plate.

As is now apparent, the compartments 905 in the cabinet 903 are bounded by the frame 955, the upper heating mechanism 961, and the front and back panels 933, 935 of the cabinet 903. More specifically, the bottom surface 929b of the compartment 905 comprises the bottom wall 969 of the lower frame member 965, and the opposite side surfaces 929e, 929f of the compartment comprise respective side walls 971, 981 of the upper and lower frame members 965, 967. The front and back surfaces 929c, 929d of the compartment 905 comprise the front and back panels 933, 935 of the cabinet 903, respectively. The upper heating mechanism 961 defines an upper boundary of the compartment. In particular, the upper surface 929a of the compartment 905 comprises the bottom wall 1001 of the upper heating mechanism 961. The housing 993 is movable within the frame 955 between a raised position (e.g., FIGS. 43, 47) and a lowered position (e.g., FIGS. 45, 48) to bring the heating mechanism 961 into conductive heat transfer contact with the top face of the package 135.

In some instances, as where the package 135 contains air or other gas that may expand during heating, it may be desirable to vent (e.g., puncture) the package before it is heated to a temperature which might otherwise cause it to rupture due to a build-up in pressure. In one embodiment, the tray 907 may have one or more puncture members (not shown) extending up from the tray, e.g., from one or more of the side walls 923c, 923d of the tray. Prior to placing the package in the tray, the package may be punctured using one or more of the puncture members. Other means may be used for puncturing the package to vent it. To minimize leakage from the package through the vent hole(s), it is preferable to puncture the top surface of the package.

When the package 135 is vented, vapor and/or other gases tend to escape the package and expand within the compartment 905. It is desirable to contain such vapor and/or other gases emitting from a package of food 135 (e.g., steak) within the compartment 905 to facilitate cleaning of the cabinet 903 and to protect against potential contamination (e.g., altered smell and/or taste) of a package of food (e.g., chicken) in another compartment. To assist in containing such vapor and/or other gases within the compartment 905, a gasket 1009 is mounted on the heating mechanism 961. The gasket 1009 comprises a rectangular piece of flexible air-impermeable material such as rubber having a rectangular opening approximately the same size and shape as the perimeter of the rectangular frame 995 of the housing 993. The gasket 1009 is held in place, for example, by multiple clamps 1011 that sandwich the gasket against an upward facing surface of a peripheral flange 1013 extending outward from the upper end of the frame 955 of the housing 993. In the illustrated embodiment, four clamps 1011 are used, one for each side of the housing 993. The clamps 1011 are secured to the housing 993 by bolts 1015 or other fasteners.

The gasket 1009 extends outward from all four side walls 995a-995d of the housing 993. The gasket 1009 is sized and shaped such that outer edges or margins 1017 of the gasket are in sealing contact with the front, back, and side surfaces 929c-929f of the compartment. "Sealing contact" as used herein means engagement of the gasket 1009 with respective surfaces 929c-929f of the compartment that prevents most vapor and/or other gases from passing between the gasket and respective side walls or surfaces. The gasket 1009 may be longer (X-direction and/or Y-direction) than the space between the heating mechanism 961 and respective compartment surfaces 929c-929f such that the gasket deforms (e.g., bends) when in contact with the surfaces. The gasket 1009 is movable with the heating mechanism 961 and "wipes" against the front, back and side surfaces 929c-929f of the compartment when the heating mechanism 961 is moved between its raised and lowered positions.

The gasket 1009 isolates a space 1019 above the gasket from the compartment 905 below the gasket. Thus, the gasket 1009 prevents most vapor and/or other gases from passing from the compartment 905 to the space 1019 above the heating mechanism 961. As a result, the gasket 1009 prevents most vapor and/or other gases from contacting components such as the actuating device 959 and the heating element 1007. Cleaning of the cabinet 903 is thus facilitated because residue or other waste generally forms within the compartment 905, where it may be reached by a user, not in the space 1019 above the gasket 1009.

Other suitable gaskets 1009 may be used to isolate the space 1019 above the gasket 1009 from the compartment 905. For example, gaskets comprising more than one piece of material or comprising different sizes or shapes may be used, such as a bellows gasket or a diaphragm gasket.

Figure 45:
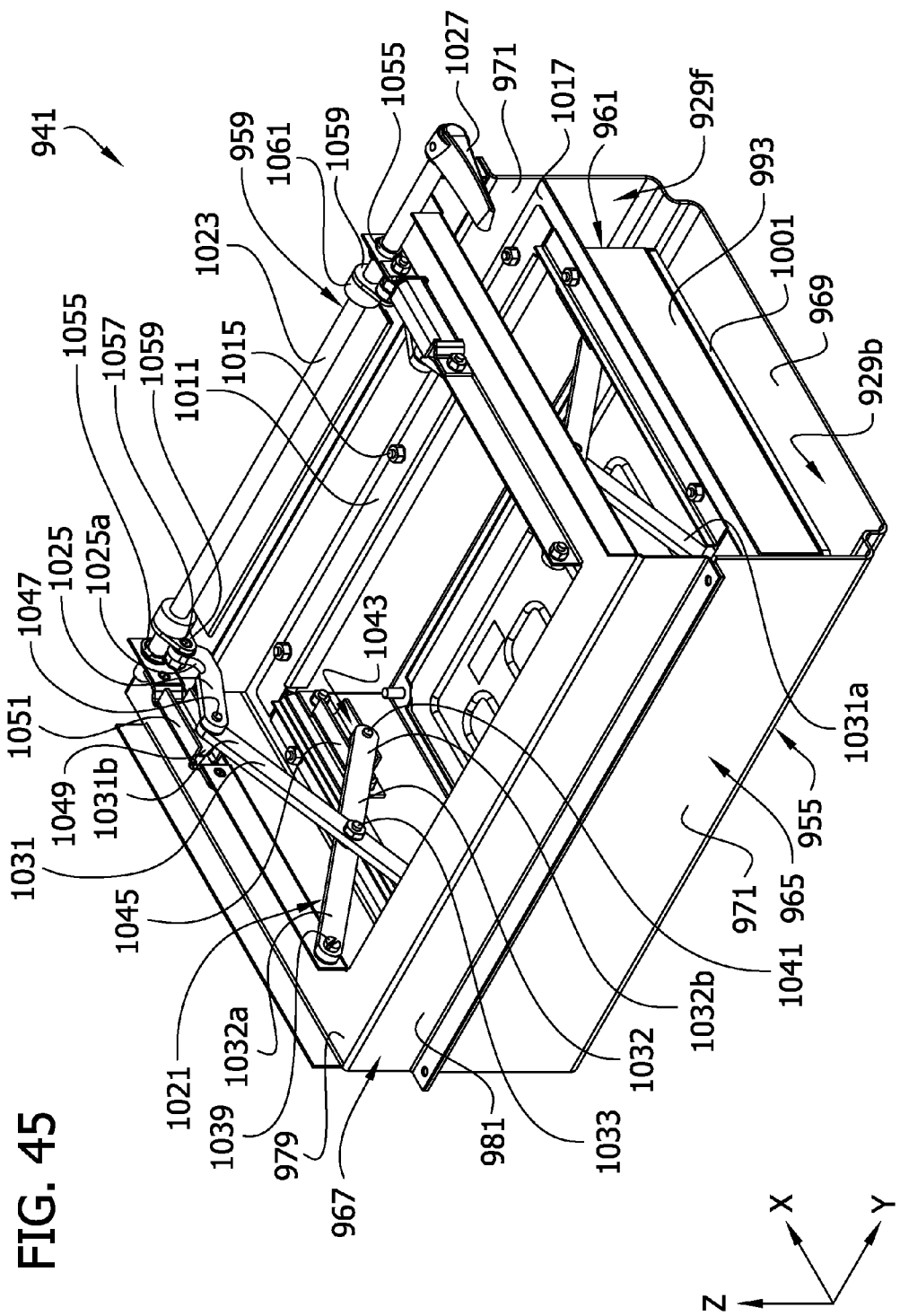
FIG. 45 is a left, front perspective of the heating module, the modular unit not being shown, the heating mechanism being shown in a lowered position.
Figure 46:
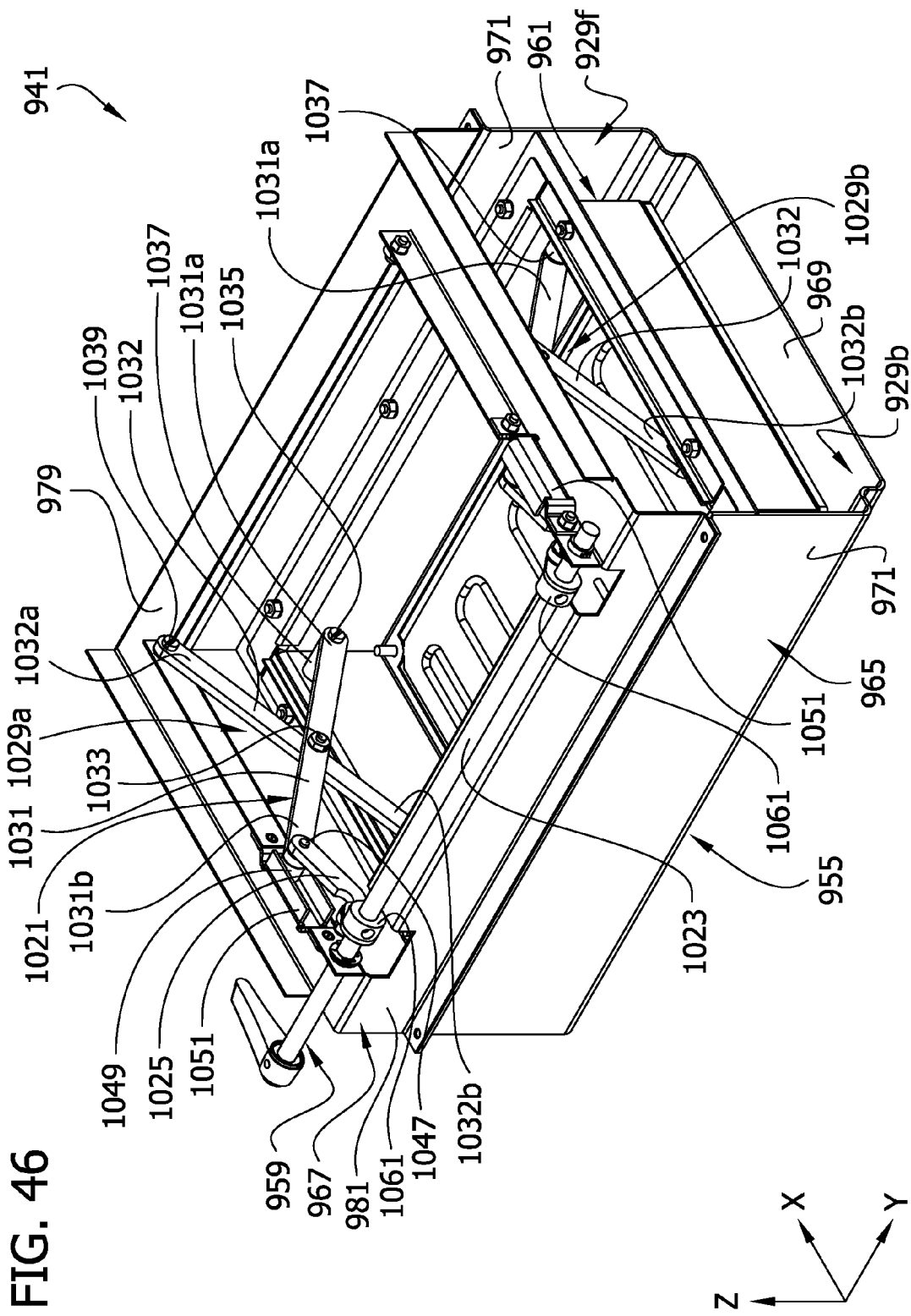
FIG. 46 is back, right perspective of the heating module, the modular unit not being shown, the heating mechanism being shown in a lowered position.
Figure 47:
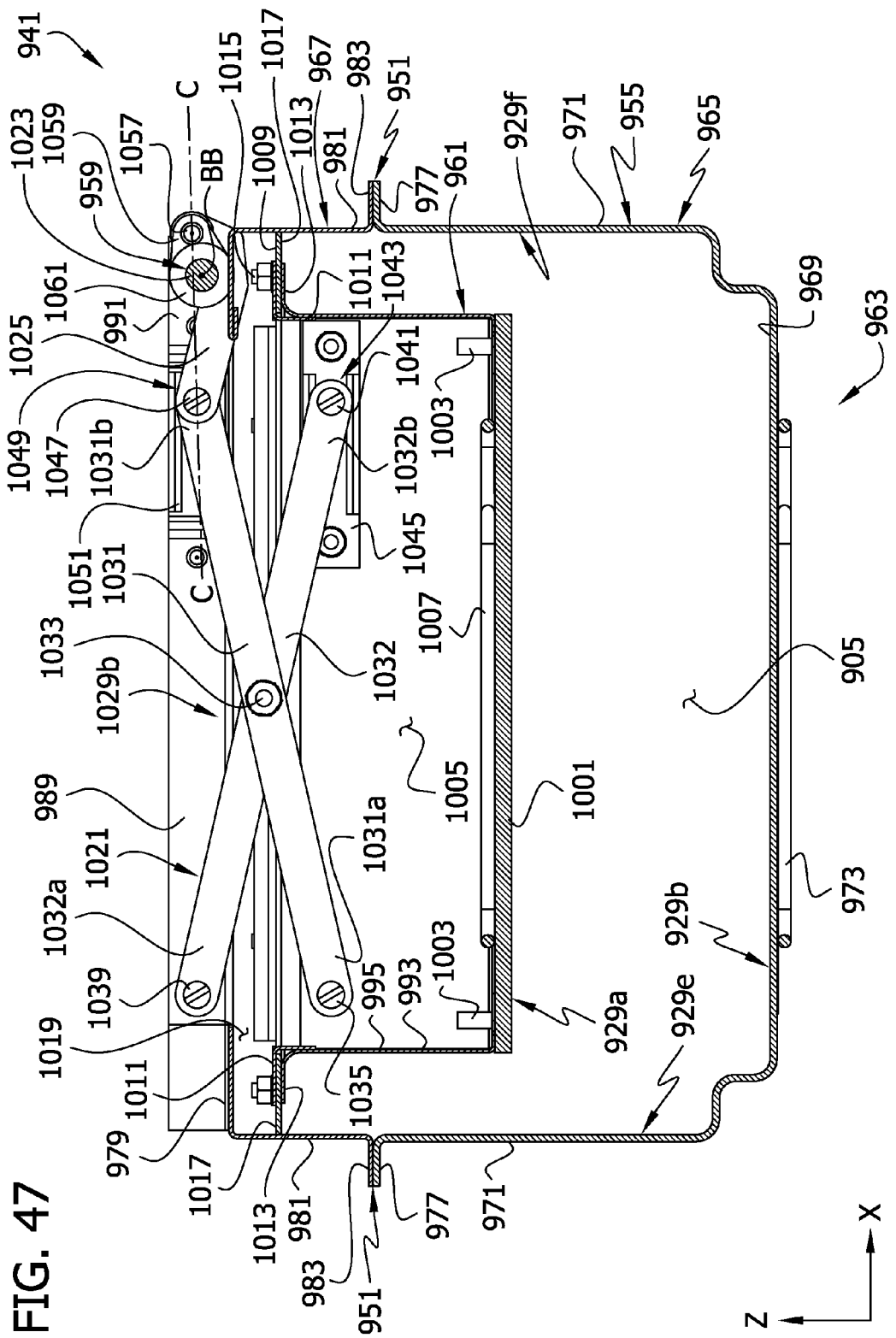
FIG. 47 is an enlarged section taken widthwise of the heating module along line 47-47 in FIG. 43, the heating mechanism being in a raised position.
Figure 48:
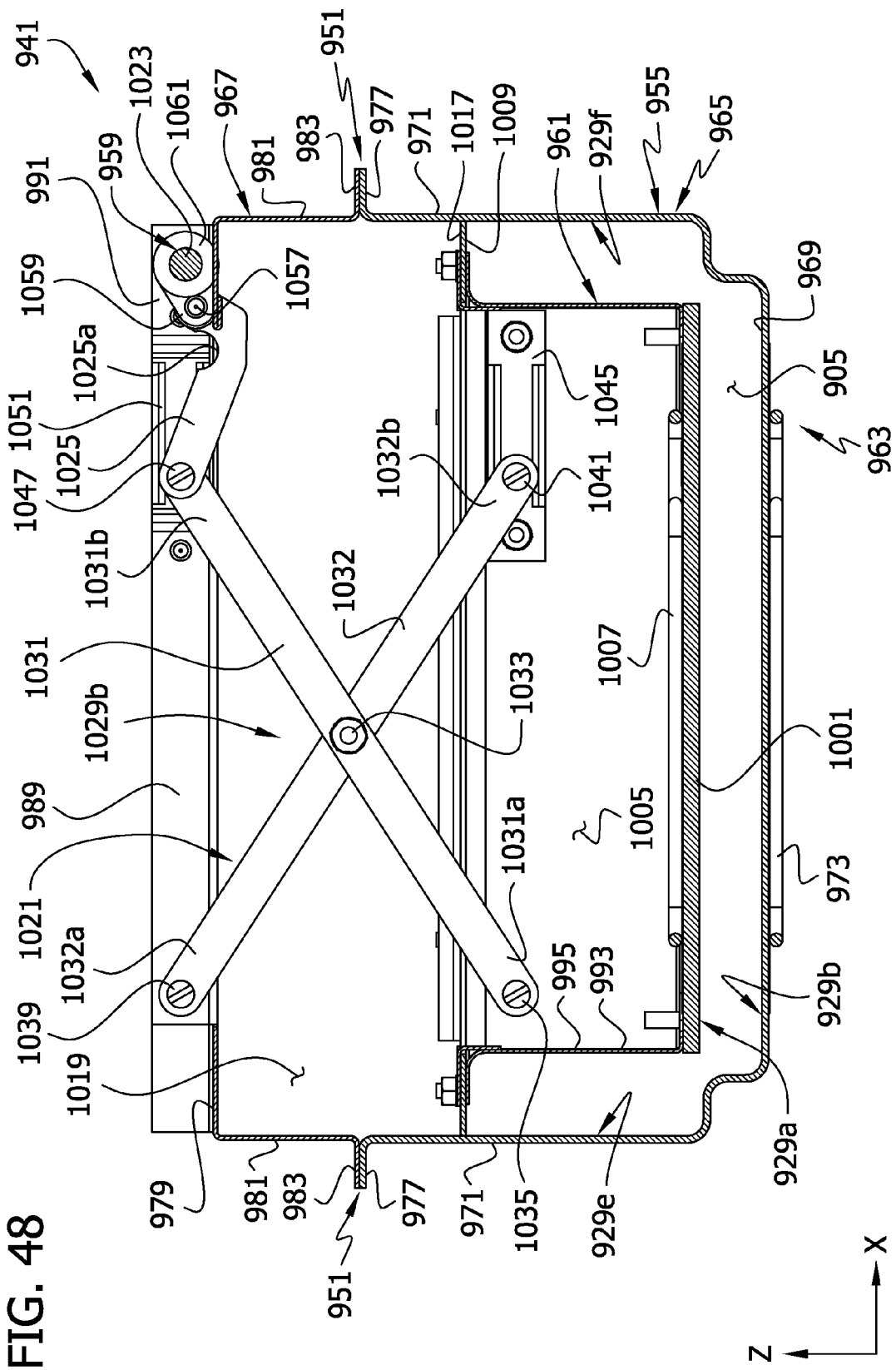
FIG. 48 is a view similar to FIG. 47, the heating mechanism being in a lowered position.

The actuating device 959 is operable to move the upper heating mechanism 961 between the raised position (e.g., FIGS. 43, 47) and the lowered position (e.g., FIGS. 45, 48). In the raised or open position, the heating mechanism 961 is spaced a sufficient distance from the bottom surface 929b of the compartment 905 to permit loading of the tray 907 containing a package 135 into the compartment 905. Additionally, this spacing provides access into the compartment 905 (e.g., by the hand of a user) to clean the compartment. In the illustrated embodiment, the bottom wall 1001 of the housing 993 is raised approximately 3 inches from the bottom surface 929b of the compartment 905. However, other spacing may be used, such as 4, 5, or 6 or more inches. In the lowered or rethermalizing position, the upper heating mechanism 961 and bottom surface 929b of the compartment are spaced closer together for conductive heat transfer contact with the package of food 135 in the tray 907. In the illustrated embodiment, the upper heating mechanism 961 has a vertical range of movement (Z-direction) of approximately 2.5 inches. Thus, the bottom wall 1001 of the heating mechanism 961 is movable to within approximately 0.5 inches of the bottom surface 929b of the compartment 905. Other suitable ranges of movement of the heating mechanism 961 may be used, such as 3.5, 4.5, or 5.5 or more inches. These ranges of movement depend in part on the desired spacing between the bottom wall 1001 of the heating mechanism 961 and the bottom surface of the compartment 905 when the heating mechanism is in its raised position.

In the illustrated embodiment, the actuating device 959 generally comprises a scissors mechanism 1021 that is extensible and contractible to raise and lower the upper heating mechanism 961. A shaft 1023 extending lengthwise of the heating module 941 is connected to the scissors mechanism 1021 by two mechanical links 1025. The shaft 1023 is rotatable by actuating a lever 1027 on a front end of the shaft to expand and contract the scissors mechanism 1021. Part of the scissors mechanism 1021 is housed in the interior space 1005 defined by the side walls 995a-995d and bottom plate 1001 of the housing 993. The actuating device 959 generally comprises front and back portions 959a, 959b, the front portion being generally a mirror image of the back portion about the plane A-A shown in FIG. 42.

The scissors mechanism 1021 comprises first and second sets of longitudinal bars 1029a, 1029b. As viewed in FIG. 41, the first set 1029a is disposed adjacent the front of the heating module 961, the second set 1029b is disposed adjacent the rear of the heating module, and each set 1029a, 1029b comprises first and second longitudinal bars 1031, 1032. The first bar 1031 of each set 1029a, 1029b is disposed inboard of the second bar 1032. In general, one end of each bar 1031, 1032 is pivotally connected to the frame 955, and an opposite end of each bar is pivotally connected to the upper heating mechanism 961. The first and second bars 1031, 1032 of each set 1029a, 1029b are connected together approximately midway along a length of the bars by a pivot (pin) connection 1033. Pivoting of the bars 1031, 1032 about these pivot (pin) connections 1033 tends to move the upper heating mechanism 961 vertically (Z-direction) away from or towards the upper frame member 967. The scissors mechanism 1021 maintains the heating mechanism 961 in a generally horizontal plane as it is raised and lowered.

Figure 41:
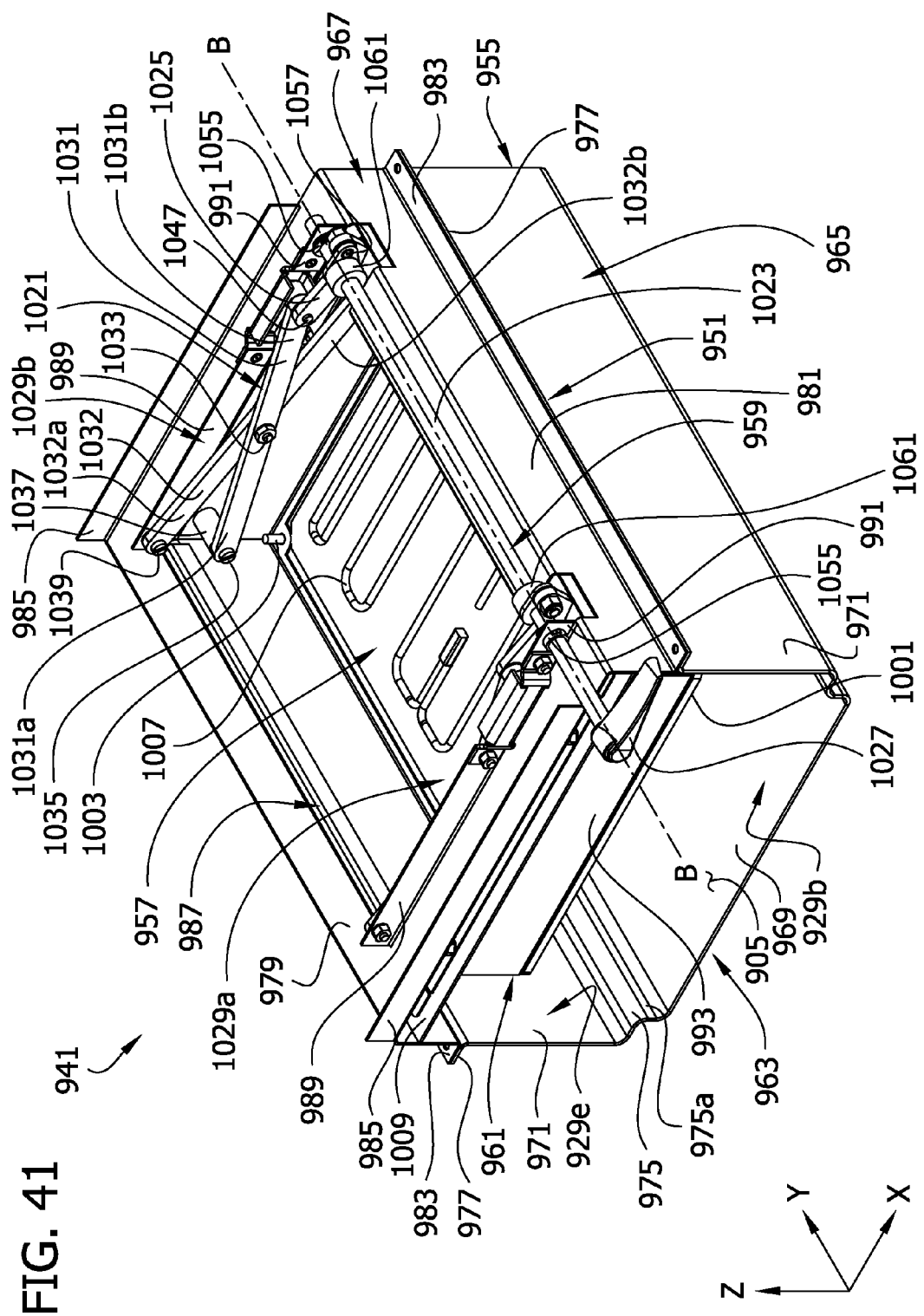
FIG. 41 is a right, front perspective of a heating module of FIG. 39.
Figure 42:
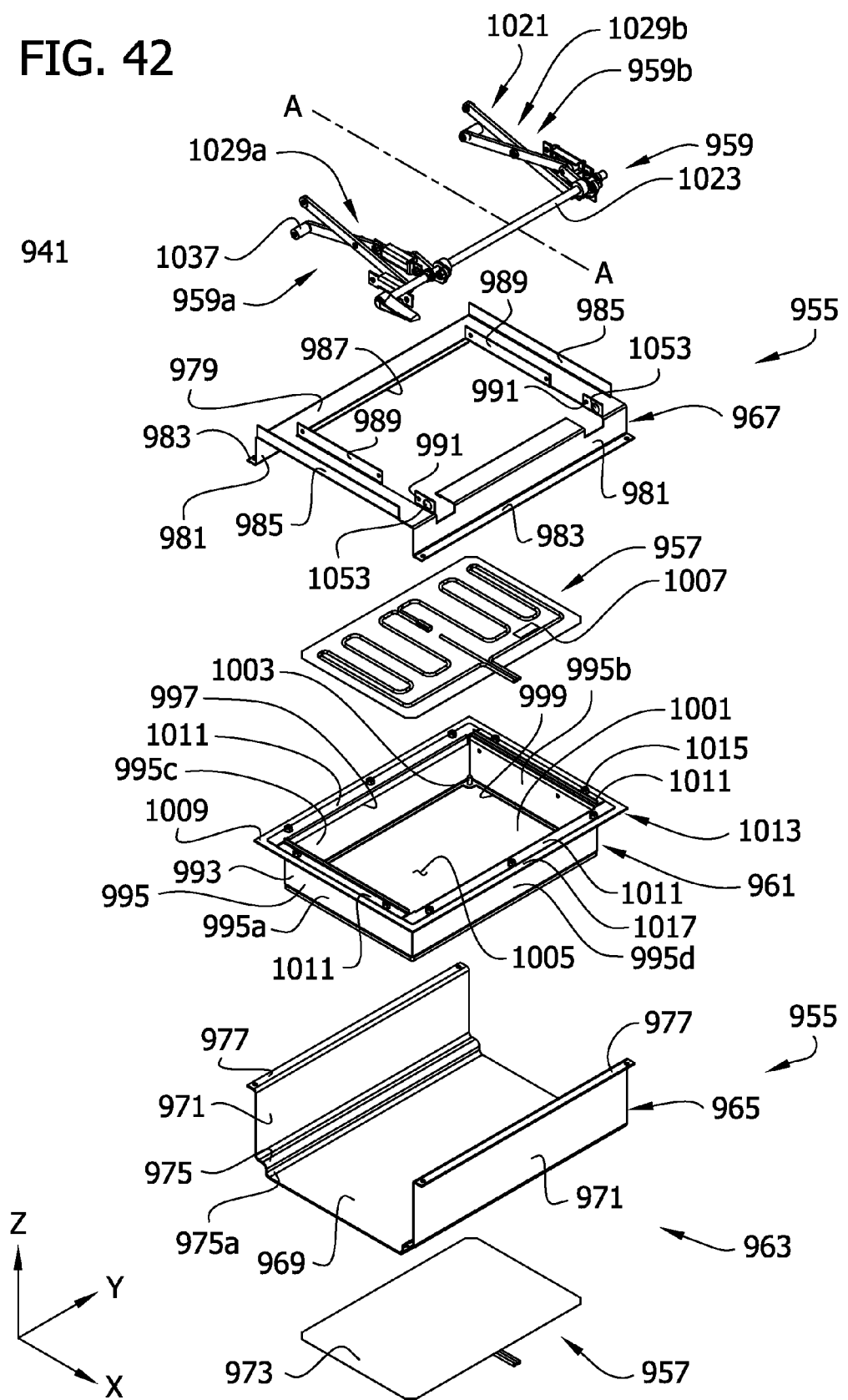
FIG. 42 is a separated view of the heating module.
Figure 43:
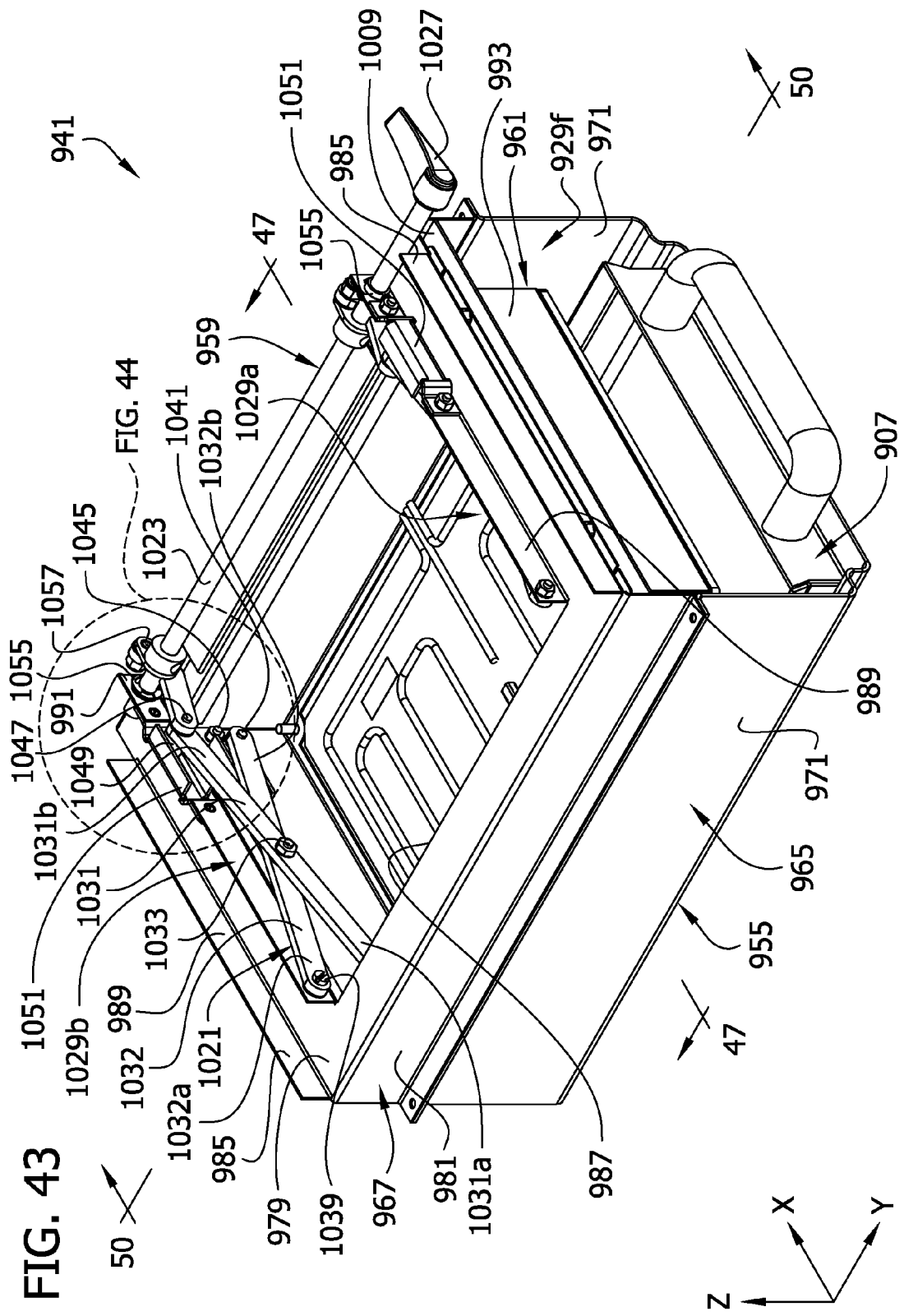
FIG. 43 is a left, front perspective of the heating module, the modular unit of FIG. 36 being inserted in the heating module, a heating mechanism being shown in a raised position.
Figure 44:
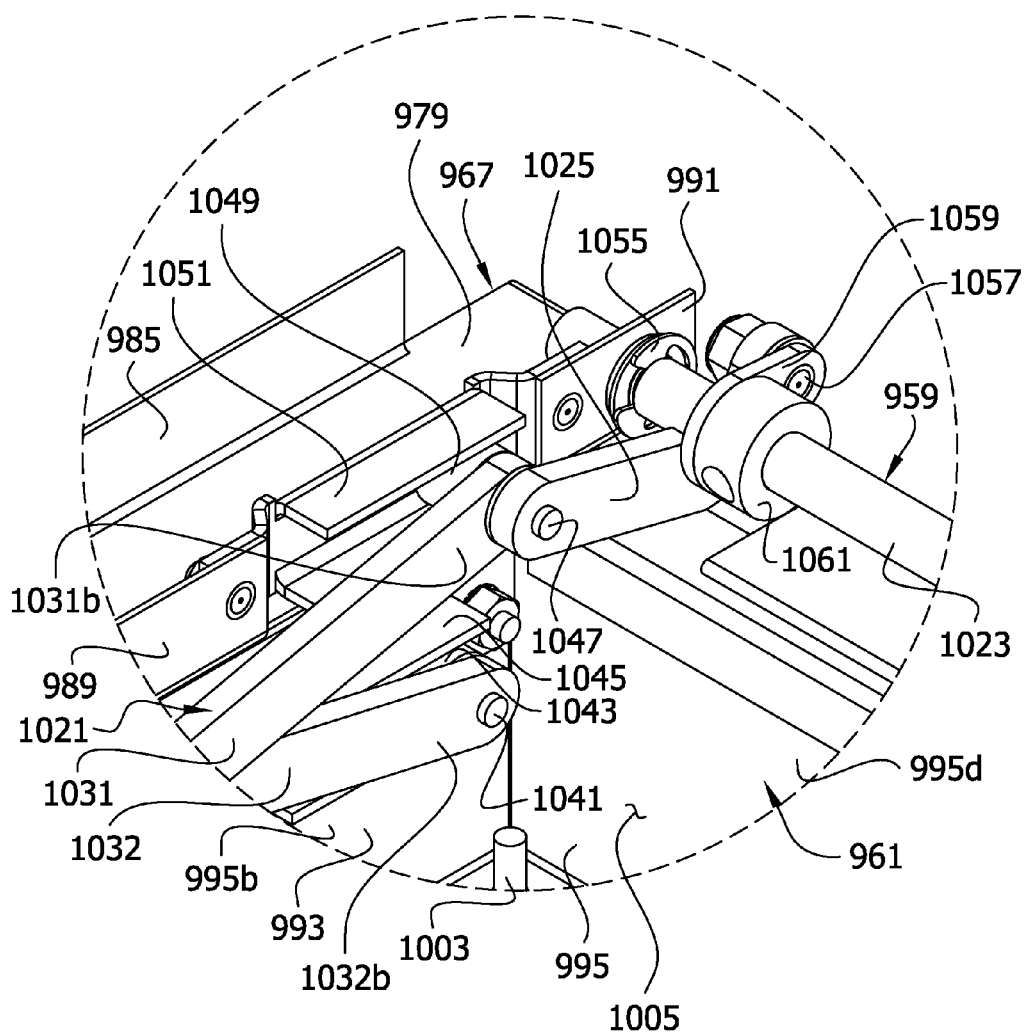
FIG. 44 is zoomed view of the area indicated in FIG. 43.

As viewed, for example, in FIGS. 41, 43, and 45, left ends 1031a of the first bars 1031 have pivot (pin) connections 1035 with inside surfaces of respective front and back walls 995a, 995b of the housing 993. Spacers 1037 are provided to distance the left ends 1031a of the first bars 1031 from the walls 995a, 995b of the housing 993 for proper alignment of the scissors mechanism 1021. Left ends 1032a of the second bars 1032 have pivot (pin) connections 1039 with inside surfaces of the upstanding flanges 989 on the upper frame member 967.

Right ends 1032b of the second bars 1032 have pivot (pin) connections 1041 with rollers 1043 disposed within guides 1045 mounted on the inside surfaces of the front and back walls 995a, 995b of the housing 993. Right ends 1031b of the first bars 1031 have pivot (pin) connections 1047 with rollers 1049 disposed within guides 1051 mounted on the upper frame member 967 between respective upstanding flanges 989 and ears 991. The guides 1045, 1051 comprise channels having an internal height (Z-direction) approximately the same as the diameter of the rollers 1043, 1049. The guides 1045, 1051 allow for movement of the rollers 1043, 1049 widthwise of the heating module 941 and thus movement of the pivot (pin) connections 1041, 1047 to the left and right in the X-direction.

The configuration of the scissors mechanism 1021 having pivot (pin) connections 1035, 1039 at left ends 1031a, 1032a of the first and second bars 1031, 1032 and pivot (pin) connections 1047, 1041 movable in the X-direction at right ends 1031b, 1032b of the first and second bars 1031, 1032 allows the scissors mechanism to expand and contract to move the upper heating mechanism 961 vertically (Z-direction) within the frame 955. Desirably, the pivot (pin) connections 1033, 1035, 1039, 1041, 1047 and rollers 1043, 1049 within the guides 1045, 1051 experience minimal friction to allow the upper heating mechanism to move from the raised position to the lowered position by the force of gravity only. As shown in FIG. 47, when the scissors mechanism 1021 is in its contracted position (when the heating mechanism 961 is in its raised position), the left ends 1031a, 1032a of the first and second bars 1031, 1032 and the right ends 1031b, 1032b of the first and second bars of respective sets 1029a, 1029b are relatively near each other. As the upper heating mechanism 961 moves from the raised position (FIG. 47) to the lowered position (FIG. 48), the left ends 1031a, 1032a of the first and second bars 1031, 1032 and the right ends 1031b, 1032b of the first and second bars of respective sets 1029a, 1029b move vertically (Z-direction) away from each other. In addition, the right ends 1031b, 1032b of the first and second bars 1031, 1032 move inward widthwise (X-direction) of the heating module 941 as the rollers 1043, 1049 move within the guides 1045, 1051. The scissors mechanism 1021 is shown in its fully expanded position in FIGS. 45, 46, and 48.

The shaft 1023 is connected to the scissors mechanism 1021 by the two mechanical links 1025 and is rotatable about a longitudinal axis B-B (FIG. 41) to expand and the contract the scissors mechanism to move the upper heating mechanism 961 between the raised and lowered positions. The shaft 1023 is mounted on the upper frame member 967 through apertures (FIG. 42) in the upstanding ears 991. Bushings 1055 on the shaft 1023 prevent the shaft from sliding within the apertures 1053 to maintain the shaft in the same position lengthwise (Y-direction) of the heating module 941. The mechanical links 1025 have pivot (pin) connections 1057 with cranks 1059 on the shaft 1023 inboard of the ears 991. The cranks 1059 are fixed outboard of collars 1061 on the shaft 1023 and rotate with the shaft about the longitudinal axis B-B of the shaft. The mechanical links 1025 are disposed inboard of the first bars 1031 and share the same pivot (pin) connections 1047 with the right ends 1031b of the first bars 1031 as the rollers 1049.

As viewed, for example, in FIGS. 41 and 43-45, rotation of the shaft 1023 in a clockwise direction expands the scissors mechanism 1021 to move the upper heating mechanism 961 to its lowered position (e.g., FIG. 45). Rotation of the shaft 1023 in a counter-clockwise direction contracts the scissors mechanism 1021 to raise the upper heating mechanism 961 to its raised position. The vertical range of movement of the upper heating mechanism 961 is limited in its raised position by the engagement of a semi-circular recesses 1025a formed in the mechanical links 1025 with the shaft 1023 and in its lowered position by the left-most rotational position of the pivot (pin) connections 1057 of the mechanical links 1025 with the cranks 1059 on the shaft 1023. The lever 1027 is mounted on a front end of the shaft 1023 and is accessible outside of the cabinet 903, as shown in FIG. 36, to facilitate rotation of the shaft by a user.

The mechanical links 1025 are configured to provide the actuating device 959 with an "over center" bias to hold the upper heating mechanism 961 in the raised position. As shown in FIG. 47, the mechanical links 1025 have an axis C-C between the pivot (pin) connections 1047, 1057 on the mechanical links. When the axis C-C is generally above (Z-direction) the longitudinal axis B-B of the shaft 1023, the force of gravity on the heating mechanism 961 tends to rotate the shaft in the counter-clockwise direction to hold the heating mechanism in the raised position. When pivot (pin) connection 1057 on the mechanical links 1025 with the cranks 1059 move "over center," i.e., when the axis C-C is generally level with or below (Z-direction) the longitudinal axis B-B of the shaft 1023, the force of gravity on the upper heating mechanism 961 tends to rotate the shaft in the clockwise direction, allowing the heating mechanism to gravitate toward its lowered position.

Desirably, the arrangement is such that minimal friction resists the movement of the heating mechanism 961 to its lowered position such that it freely moves to its lowered position (without manual actuation of the lever) after overcoming the "over center" bias. Thus, to move the upper heating mechanism 961 from the raised position (e.g., FIG. 43) to its lowered position (e.g., FIG. 45), a user need only rotate the shaft 1023 (e.g., by use of the lever 1027) in the clockwise direction between approximately 2 and 20 degrees, by way of example but not limitation. In the illustrated embodiment, the upper heating mechanism 961 is biased toward its lowered position by gravity only, but biasing elements (e.g., springs) may be used. Alternatively, the heating mechanism 961 may not have an "over center" bias and be biased toward its closed position only.

The actuating device 959 as described above may have other forms without departing from the scope of the present invention. Many constructions besides the illustrated actuating device 959 may be implemented to effectuate a movement of the upper heating mechanism 961 between the raised and lowered positions. For example, only one mechanical link 1025 may be used, and the mechanical links may vary in number or shape. As a further example, different components (e.g., up-down or push-pull) may be used in place of the rotatable shaft 1023 and mechanical links 1025 to expand and contract the scissors mechanism 1021.

Figure 49A:
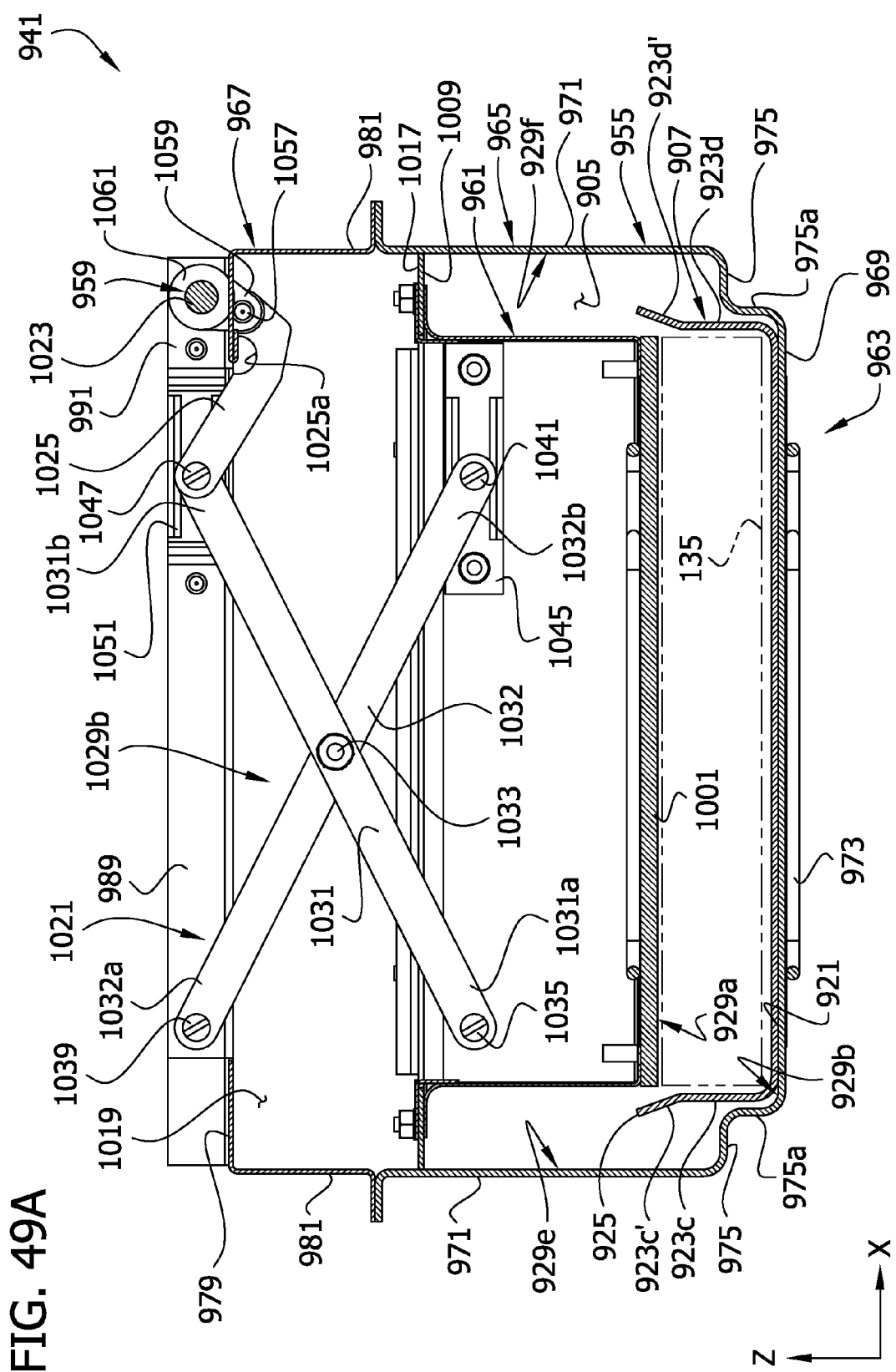
FIG. 49A is a view similar to FIG. 49 but showing the heating mechanism below a rim of a tray.
Figure 50:
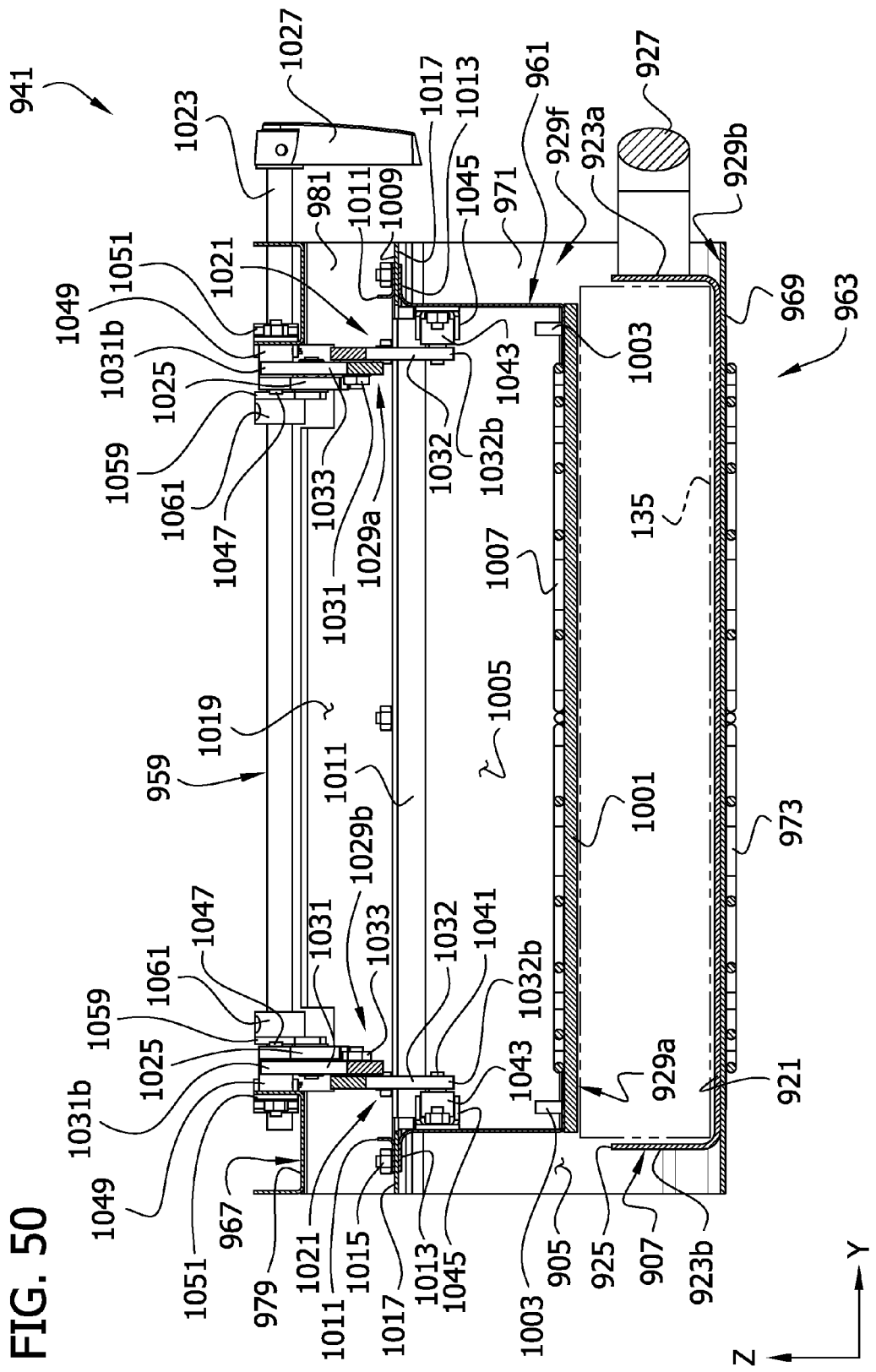
FIG. 50 is an enlarged section taken lengthwise of the heating module along line 50-50 in FIG. 43, the package of food contained in the modular unit being inserted in the compartment, the heating mechanism being in conductive heat transfer contact with the package of food.

The upper heating mechanism 961 is therefore movable downward into conductive heat transfer contact with the package of food 135 and maintains conductive heat transfer contact with the package during rethermalization as the package changes shape (e.g., decreases in height) during rethermalization (see FIG. 49). The tray 907 desirably has a length (Y-direction) and a width (X-direction) such that the tray is sized to receive the heating mechanism 961 as it moves downward. As a result, the heating mechanism can move to a position below the rim 925 of the tray, as shown in FIG. 49A, for example, to contact a package 135 in the tray in a situation where the upper surface of the package is located below the rim of the tray. The tray 907 is provided with the "wide mouth," as described above and best viewed in FIGS. 49 and 49A, to capture the heating mechanism 961 if the tray is slightly out of vertical center (Z-direction) with respect to the heating mechanism. Thus, if the side walls 923a-923d of the tray 907 are taller than the height of the package of food 135 in its frozen or refrigerated state, or if the height of the package decreases to less than the height of the side walls of the tray during rethermalization, the rim 925 of the tray will not obstruct the heating mechanism 961 from moving below the rim of the tray and maintaining conductive heat transfer contact with the package of food inside the tray.

FIG. 49B illustrates an embodiment having an optional spring element 1060. As noted above, the upper heating mechanism 961 in some embodiments is biased by biasing elements (e.g., one or more spring elements 1060) toward its lowered position. The downward bias has the effect of increasing the downward force exerted on the package of food to be rethermalized. The application of this increased force may be especially advantageous in situations where the upper surface of the package 135 is irregular (e.g., due to the nature of the contents of the package and/or the frozen state of the contents). The additional force tends to smooth out any such irregularities during the rethermalization process, thus maximizing the area of conductive heat transfer contact between the upper heating mechanism 961 and the package 135. As shown in FIG. 49B, opposite ends 1060a and 1060b of the spring element 1060 may be connected to the pin connections 1039 and 1047. Alternatively, the spring element ends 1060a and 1060b may be connected to the ends 1032a and 1031b of the spring mechanism bars 1032 and 1031. Tension in the spring element 1060 biases the ends 1032a and 1031b toward each other, thus biasing the scissors mechanism 1021 toward its extended position and the upper heating mechanism 961 toward its lowered position (FIG. 48). Other types and numbers of spring elements may be used, and the spring elements may be provided in locations other than illustrated in FIG. 49A. For example, one or more compression spring elements may be provided above the upper heating mechanism 961 to exert a downward force on the upper heating mechanism.

Features described above and additional features facilitate cleaning of the apparatus 901. For example, the distance provided between the upper heating mechanism 961 and the bottom surface 929b of the compartment 905 provides access (e.g., by a hand of a user) from the front or back of the cabinet 903 for cleaning the compartment 905. Further, the gasket 1009 isolates the space 1019 above the gasket from vapor and/or other gases generated within the compartment 905. Many non-heating surfaces are preferably made of stainless steel for ease of cleaning. Surfaces such as the internal surfaces of the compartment 929a-929f may be impregnated or coated with Teflon®. In addition, the heating modules 941 are removable from the cabinet 903, as described above, for maintenance procedures (e.g., cleaning) and replacement of defective parts.

Figure 51:
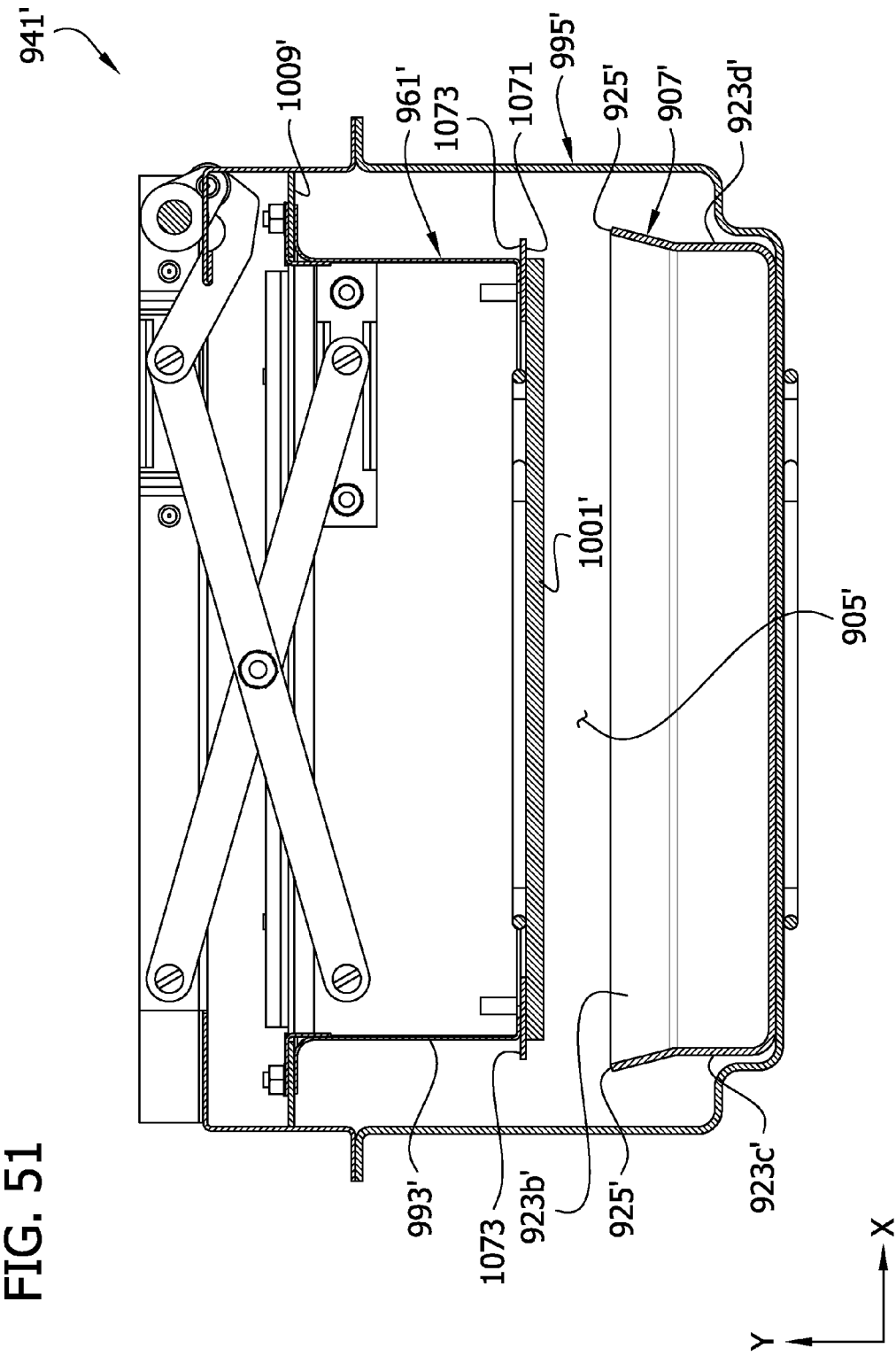
FIG. 51 is an enlarged section taken widthwise of another embodiment of a heating module, a heating mechanism being shown partially raised, a modular unit being inserted in a compartment of the heating module.
Figure 52:
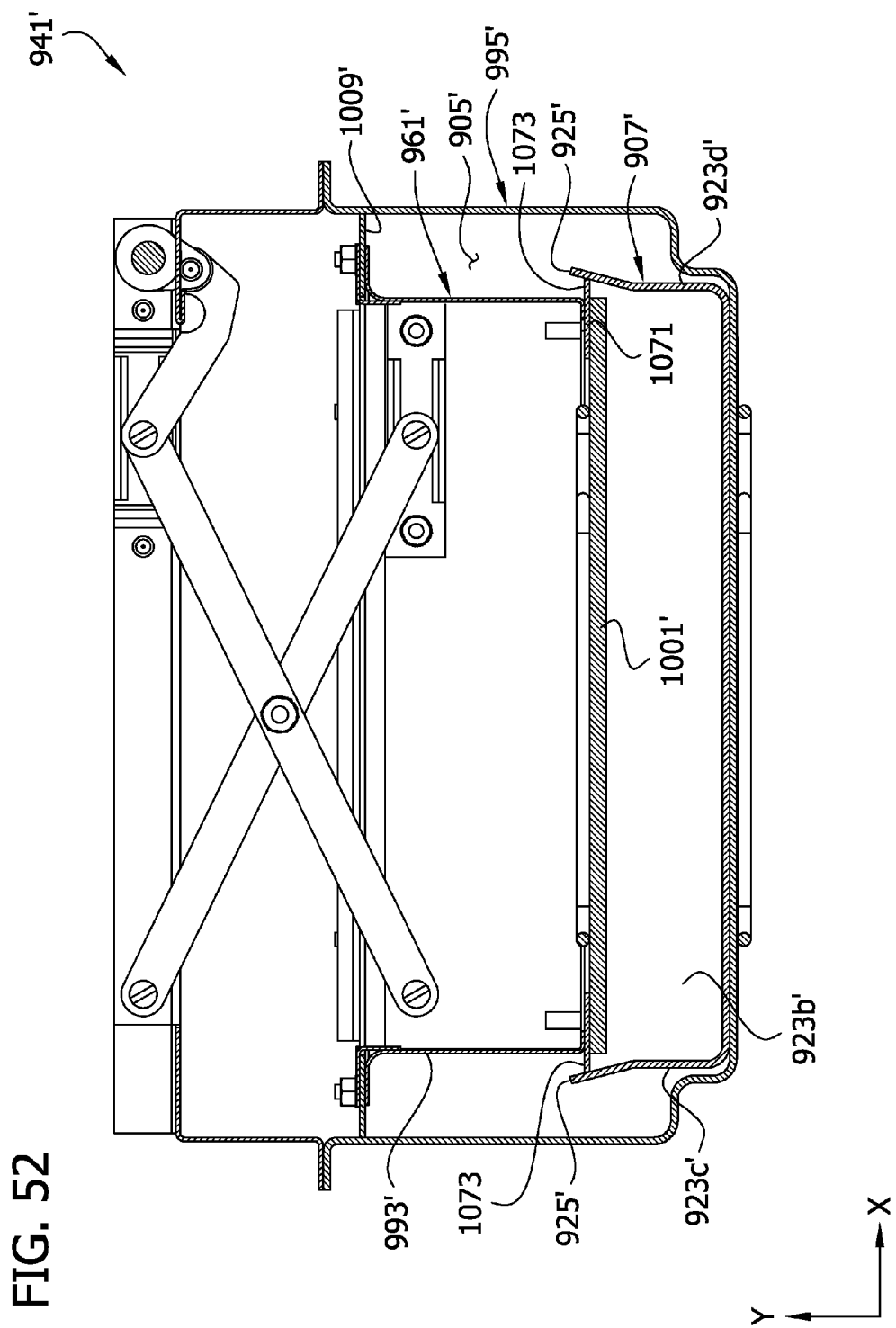
FIG. 52 is a view similar to FIG. 51, the heating mechanism being shown lowered such that a gasket on the heating mechanism sealingly contacts the modular unit.

FIGS. 51 and 52 illustrate another embodiment of a heating module 941' for use with apparatus 901. The heating module 941' is similar in most respects to the heating module 941, and corresponding parts are designated by the corresponding reference numbers, plus a prime designator ('). The heating module 941' has another gasket 1071 on the heating mechanism 961' that may be used in conjunction with or in place of the gasket 1009'. The gasket 1071 comprises a piece of flexible air-impermeable material such as rubber and is sandwiched between the frame 995' and the bottom plate 1001' of the housing 993'. The gasket 1071 extends outward from the sides of the housing 993' and is sized and shaped for outer edges or margins 1073 of the gasket to sealingly contact the rim 925' and/or the walls (e.g., front wall (not shown), back wall 923b', and side walls 923c', 923d') of the tray 907'. "Sealingly contact" as used herein means the gasket 1071 engages the rim 925' and/or walls (e.g., front wall (not shown), back wall 923b', and side walls 923c', 923d') of the tray 907' to block most of the vapor and/or other gases generated during rethermalization from passing between the gasket and the rim and/or side walls of the tray while the gasket is in contact with the rim and/or side walls of the tray. The gasket 1071 may be sized such that it deforms when it contacts the tray 907'. In addition, as shown in FIG. 52, the gasket may "wipe" against the side walls (e.g., front wall (not shown), back wall 923b', and side walls 923c', 923d') of the tray 907' when moved below the rim 925' of the tray. This optional gasket 1071 further facilitates cleaning of the compartment 905'.

The apparatus 901 is used in a similar fashion as embodiments described above. A tray 907 containing a package of food 135 is placed in the compartment 905. The upper heating mechanism 961 is then moved from its raised position (e.g., FIG. 47) toward its lowered position (e.g., FIG. 48) by rotating the shaft 1023 in the clockwise direction to expand the scissors mechanism 1021. This brings the heating mechanism 961 into conductive heat transfer contact with the package of food 135, as shown in FIG. 49 or 49A (depending on the height of the package). After rethermalization is complete, the upper heating mechanism 961 is raised by rotating the shaft 1023 in the counter-clockwise direction to contract the scissors mechanism 1021. The tray 907 is then removed from the compartment 905, and the package 135 is then removed from the tray so that the above procedure can be repeated.

The various embodiments described above may have additional features. By way of example, the surface of the upper heating plate (e.g., plate 1001) contacting the upper surface of the package to be rethermalized may be coated so that it is less likely to stick to the packaging material, which may be a flexible sheet of synthetic resin material (e.g., a polymer film). One example of a suitable coating is a fluoropolymer coating sold under the trademark Excalibur® by Russel Products, Inc. Further, the upper surface of the wall (plate) 969 in contact with the bottom of the tray may be coated for wear, abrasion and corrosion resistance, as by hard anodizing. The heating elements 973, 1007 may be of any suitable type, such as Calrod heaters, rope heaters, silicone rubber mat heaters, etched-foil heaters, and cast-in heaters. The upper heating plate 1001 can also be heated by an infra-red energy source, which would have the advantage of eliminating electric wiring to the upper heating mechanism.

FIGS. 54-57 illustrate systems and methods of controlling the heating mechanisms of the various embodiments described above (and other embodiments) to rethermalize a package of refrigerated (e.g., chilled or slacked) or frozen food by heating it to a particular rethermalized temperature, and then, if desired, to hold the rethermalized package of food at a desired holding temperature for a duration of holding time. The rethermalizing time may range from a long period of time to, more desirably, a short period of time, such as fifty, forty, thirty, twenty or less minutes. The holding time may range from a very short period of time to a very long period of time, such as four, six, eight or more hours. In this regard, it has been found that oxidation and contamination of the food is either entirely prevented or at least substantially inhibited if it is kept in its original sealed packaging after it has been rethermalized. As a result, the food can be held at a selected holding temperature for substantially longer periods of time (compared to conventional holding techniques) without significant loss of food quality. Further, holding times are substantially extended even if the package is punctured for venting, since the puncture hole or holes are typically relatively small.

Figure 54:
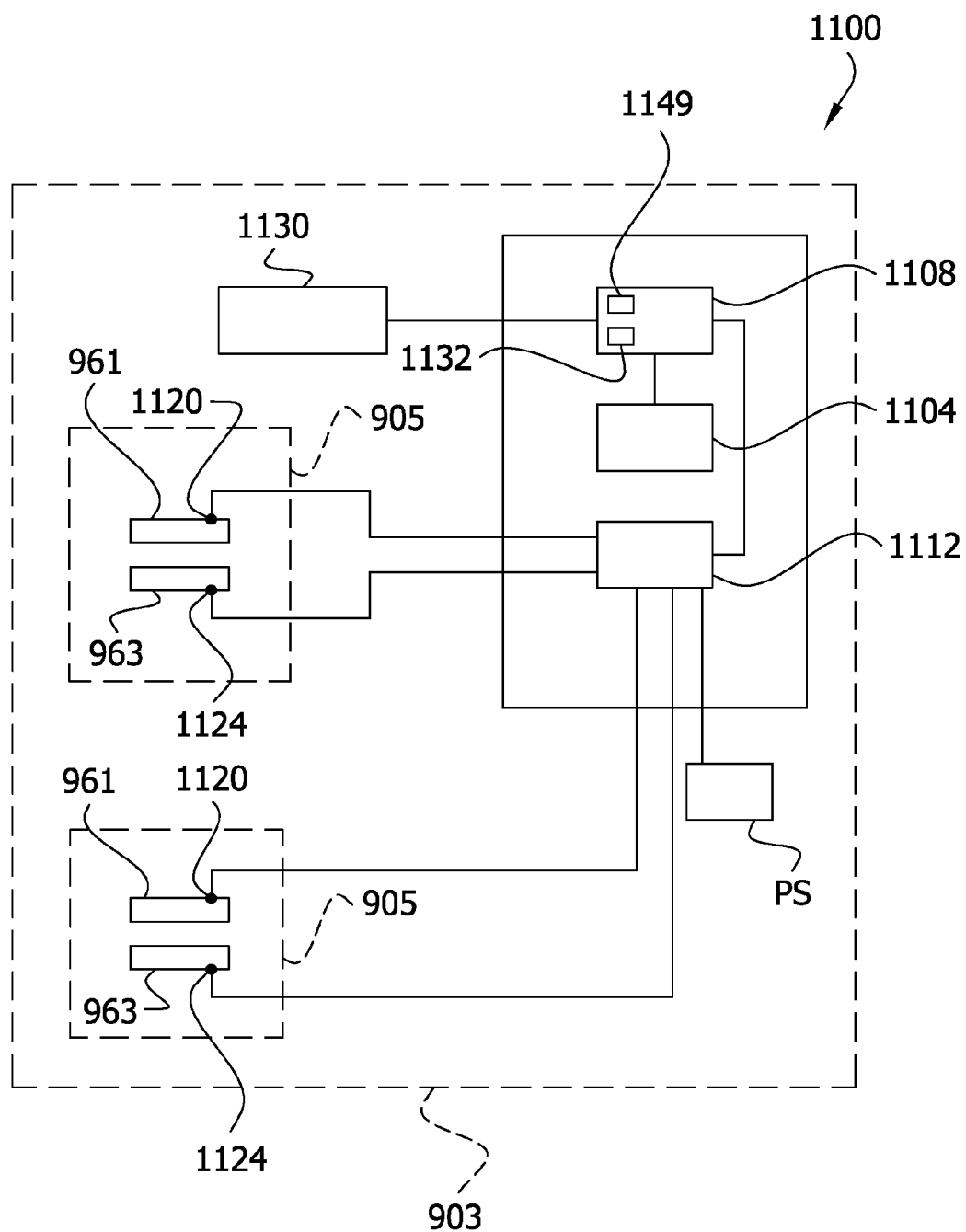
FIG. 54 is a schematic of an exemplary control system for use in various apparatus of the present invention.

FIG. 54 illustrates an exemplary control system 1100 for use in the apparatus described above, such as the apparatus 901 comprising cabinet 903, one or more compartments 905 in the cabinet, and first and second heating mechanisms 961, 963 in each compartment for heating a package of food in the compartment. The control system 1100 also includes a tangible computer-readable storage medium 1104 having instructions for operating the heating mechanisms 961, 963, and a controller 1108 (e.g., processor or programmable logic control) connected to the medium for executing the instructions. The operation of the first and second heating mechanisms 961, 963 in the compartments 905 is controlled by a suitable electrical device 1112, such as a series of solid state relays, one for each set of first and second heating mechanisms, connected to the controller 1108 and to a power supply PS. Desirably, the heating mechanisms 961, 963 are capable of being operated independent of one another. In the illustrated embodiment, the control system 1100 also includes sensors 1120, 1124 (e.g., RTD sensors) for sensing the temperatures of the first and second heating mechanisms 961, 963, respectively. By way of example, in an embodiment where the first heating mechanism 961 comprises an upper metal plate (e.g., a 3/16 in.-thick aluminum plate) heated by a heating element comprising an electric resistance coil sandwiched between upper and lower layers of foil, the latter of which is adhered to the upper surface of the metal plate, the sensing element 1120 may be disposed on the lower foil layer. Similarly, in an embodiment where the second heating mechanism 963 comprises a lower metal plate (e.g., a 3/16 in.-thick aluminum plate) heated by a heating element comprising an electric resistance coil sandwiched between lower and upper layers of foil, the latter of which is adhered to the lower surface of the metal plate, the sensing element 1124 may be disposed on the upper foil layer. The controller 1108 controls the operation of the heating mechanisms 961, 963 in response to signals from the sensors 1120, 1124. The control system 1100 also includes an electrical device 1130 connected to the controller 1108 for displaying information relevant to the operation of the compartments 905.

Figure 53:
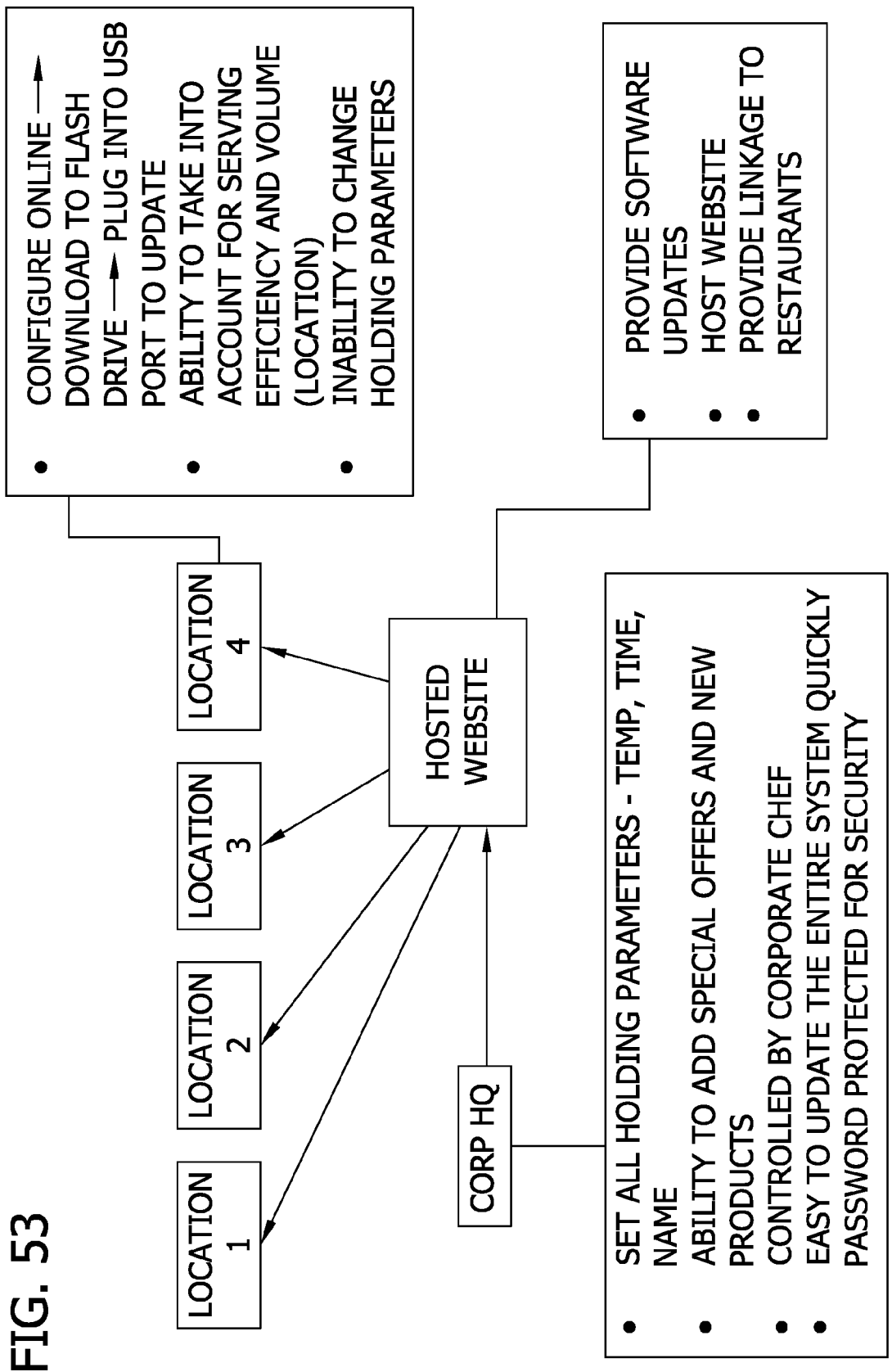
FIG. 53 is a schematic diagram showing a web based programming system for controlling various operation parameters of apparatus of the present invention from remote locations.

A USB port 1132 is provided for uploading and downloading information to and from the computer-readable storage medium 1104. Uploaded information may include, for example, different "retherm" programs for different foods. Downloaded information may include, for example, performance data. The USB port 1132 may be used in conjunction with a web-based programming system such as the system illustrated in FIG. 53. For example, a corporate headquarters may post retherm programs or other software or information to a hosted website so that branch locations (e.g., Locations 1-4 in FIG. 53) can download the programs, software, or other information to a flash drive and then upload the information via the USB port 1132 to the storage medium 1106 of the control system 1100.

In one embodiment, the instructions to be loaded into the computer-readable storage medium 1104 for operating the first and second heating mechanisms 961, 963 during a rethermalization ("retherm") cycle are developed empirically, i.e., by conducting tests to determine an appropriate sequence of time-and-temperature events for operating the heating mechanisms to achieve the desire result. The instructions will vary depending on various factors, such as the type of packaged food (e.g., beef, chicken, fish), the packaging material (e.g., thermoplastic synthetic resin material, thermoset synthetic resin material, metal foil material), package size, number of food packages to be placed in a compartment during a retherm cycle, desired duration of retherm time, desired duration of holding time, etc. For optimum results, a separate program or "recipe" of instructions for each type of food package to be rethermalized may be loaded into the computer-readable storage medium 1104.

Figure 55:
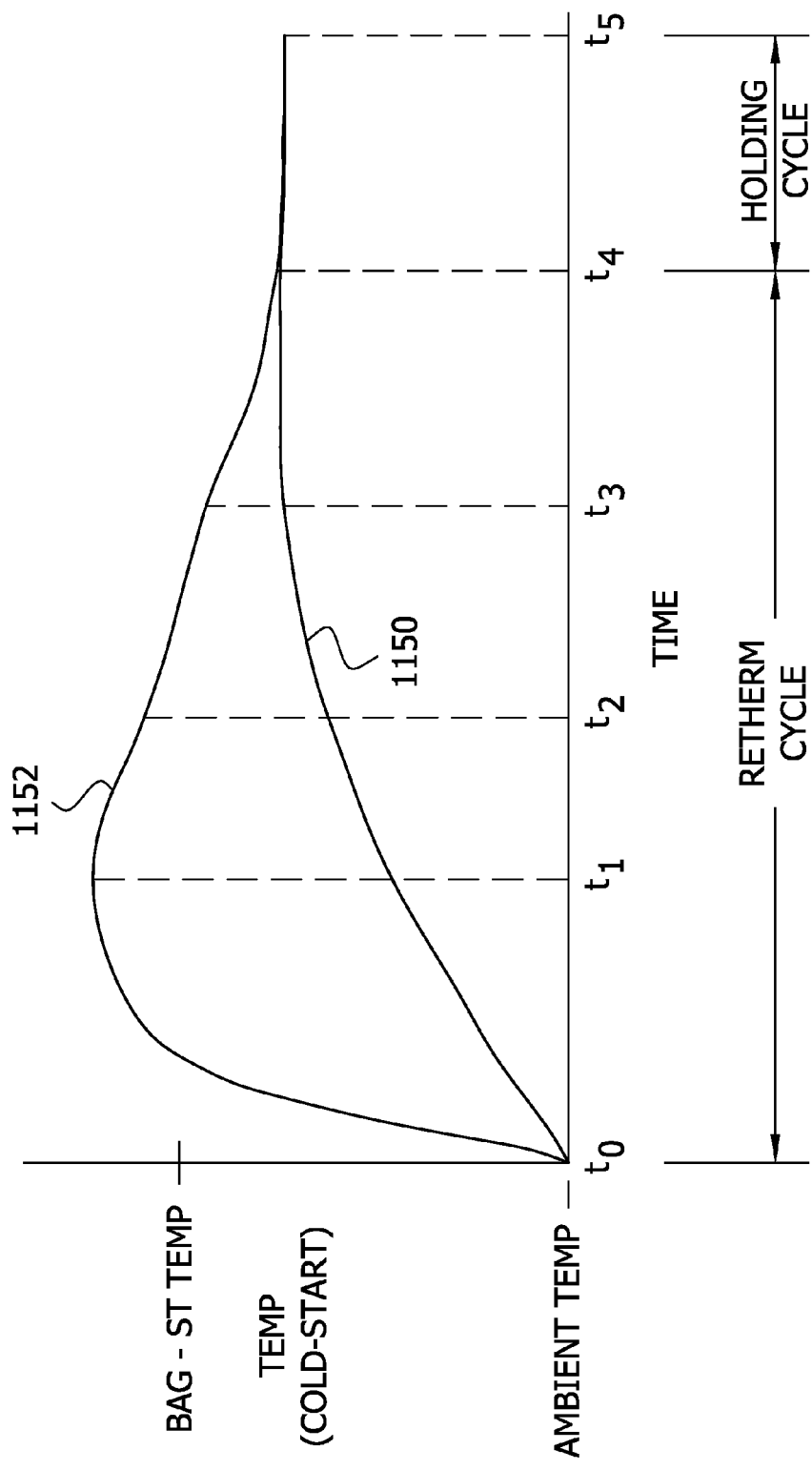
FIG. 55 is a "cold-start" time-temperature graph illustrating a "retherm" cycle during which a package of food in a compartment is rethermalized and a "holding" cycle during which the food is held at a selected temperature for a duration of a holding time.

FIG. 55 is a time-temperature graph illustrating a "retherm" cycle during which a package of food in a compartment 905 is rethermalized and a "holding" cycle during which the food is held at a selected temperature for a duration of holding time. The graph shows a first curve 1150 plotting the temperature of the food contained in the package 135 and a second curve 1152 plotting the temperature of the first and second heating mechanisms 961, 963. (In this example, the two heating mechanisms are heated to the same temperatures. In other examples, they may be heated to different temperatures.) During the retherm cycle, the controller 1108 operates the first and second heating mechanisms 961, 963 (via the electrical device 1112) in accordance with a program or recipe selected for the food package or packages in the compartment 905. In the example of FIG. 55, the controller 1108 executes the program to operate the heating mechanisms 961, 963 at a first temperature set point (e.g., 220 degrees F.) during a first interval from time t0 to time t1; at a second temperature set point (e.g., 215 degrees F.) which is less than the first set point during a second interval from time t1 to time t2; at a third temperature set point (e.g., 205 degrees F.) which is less than the second set point during a third interval from time t2 to time t3; and at fourth temperature set point (e.g., 175 degrees F.) which is less than the third set point during a fourth interval from time t3 to time t4. The operation is such that the temperature of the heating mechanisms and the food reach a desired rethermalized temperature (e.g., 175 degrees F.) by time t4. Thereafter, if desired, the controller 1108 may continue to operate the upper and lower heating mechanisms 961, 963 (e.g., at Z % power) to maintain the food at the desired holding temperature (e.g., 175 degrees F.) for a duration of holding time (e.g., from time t4 to time t5) which, as discussed above, may be relatively short or much longer. The holding temperature is typically (but not necessarily) the same as the rethermalized temperature.

The exemplary rethermalizing and holding temperatures stated in the immediately preceding paragraph are for a retherm and hold process for a food comprising a meat (beef) contained in packaging material of a thermoplastic synthetic resin material having a softening temperature of about 210 degrees F. These temperatures will vary depending on such factors as the type of food and packaging material (e.g., thermoplastic material, thermoset material, metal foil).

The first and second heating mechanisms 961, 963 may be operated at the same or different temperature levels during the retherm and holding cycles, depending on such factors as the conductivity of the surfaces of being heated, which may vary depending on the types of coatings on the surfaces. Also, the magnitude of the set points, and/or the number of set point changes, and/or the length of the time intervals between set point changes, may vary from one program to another. The temperatures to which the heating mechanisms 961, 963 are heated may differ depending on one or more factors such as the type of food in the package 135, the desired rethermalized temperature, the desired holding temperature, the type of packaging material, and other factors. In general, during the retherm cycle, the heating mechanisms 961, 963 are heated to a temperature selected to rethermalize the food as quickly as possible without significantly decreasing the quality of the food (e.g., scorching or burning meat or separating components of cream-based food) and without adversely altering (e.g., melting) the packaging material.

If a thermoplastic synthetic resin material is used as the packaging material, the softening and melting temperatures of the packaging material are significant factors in selecting the highest temperature to which the heating mechanisms should be heated. As used herein, the softening temperature ST means the temperature at which a thermoplastic packaging material becomes tacky or sticky to the touch. This temperature ST ranges from 140 to 225 degrees F. for many types of thermoplastic films used to package food. The melting temperature is a temperature greater than the softening temperature at which the thermoplastic packaging material transitions from a crystalline or semi-crystalline phase to a solid amorphous phase. For certain types of food (e.g., meat products) packaged in thermoplastic film, it has been found that the heating mechanisms 961, 963 can be operated at temperatures above the softening temperature of the packaging material but below its melting temperature, at least during an initial interval of the rethermalizing cycle. Operating the heating mechanisms at these relatively high temperatures has the advantage of driving as much heat as possible into the food without degrading it, thus reducing the amount of time required to complete the retherm process. For other types of food which degrade at lower temperatures, it may not be possible to operate the heating mechanisms above the softening temperature of the packaging material during any interval of the retherm process.

Thermoset synthetic resin materials and metal foil typically have very high melting temperatures. Therefore, if these types of materials are used as the packaging material, the critical factor is determining the maximum temperature at which the heating mechanisms 961, 963 should be operated is the temperature at which the food experiences a significant decrease in quality. This maximum temperature can be determined empirically and stated as a percentage of rethermalized temperature or a percentage of the holding temperature (which may or may not be the rethermalized temperature at the end of a retherm cycle). For example, for some types of food (e.g., beef, chicken, or steak), the heating mechanisms 961, 963 may be heated during the first time interval to a maximum temperature that is 20% higher than the rethermalized temperature or the holding temperature without substantially affecting the quality of the food. Other types of food (e.g., cheese or sauces) may be able to withstand temperatures of, for example, only 10 to 15 percent higher than the rethermalized temperature or the holding temperature without separating or degrading. In other embodiments, the heating mechanisms 961, 963 may be heated during the first time interval to a maximum temperature that is 25, 30, 35, 40, 45 or even 50 percent higher than the rethermalized temperature or the holding temperature without substantially affecting the quality of the food.

In the embodiment illustrated by the graph of FIG. 55, the heating mechanisms 961, 963 are heated during a first interval (from t0 to t1 in the graph) to a maximum temperature that is above the softening temperature ST. This maximum temperature may exceed the softening temperature by a large amount (more than 15 degrees F. or more) or by a lesser amount, e.g., at least 5 to 10 degrees F. The temperature of the heating mechanisms then decreases during the second, third and fourth intervals (e.g., from t1 to t4 in the graph) to a temperature less than the softening temperature ST, the final temperature being the desired rethermalized temperature reached by time t4, which is also less than the softening temperature of the packaging material. Using higher temperatures during the first interval of time reduces the overall time required to reach the rethermalized temperature by time t4.

Figure 56:
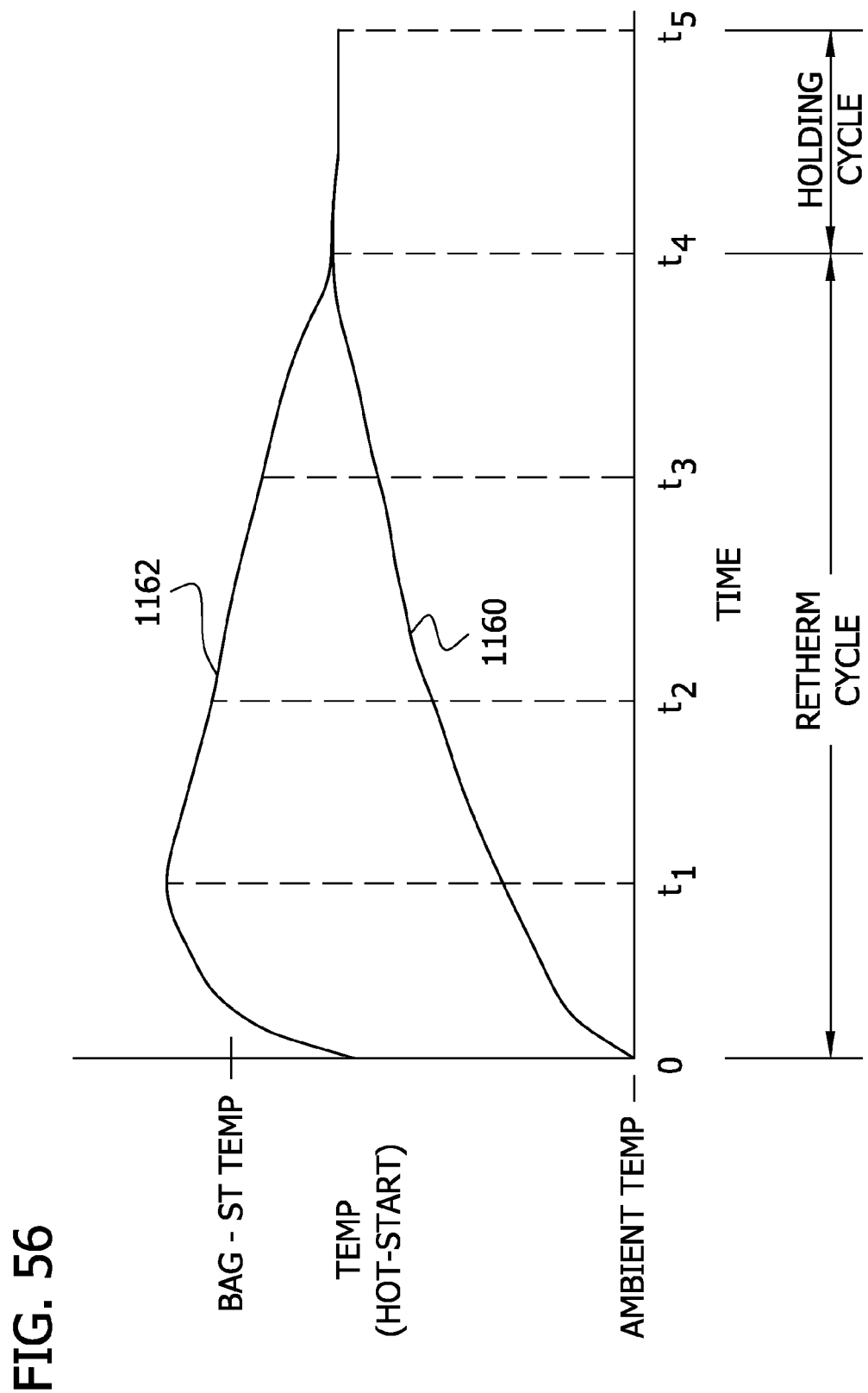
FIG. 56 is a time-temperature graph similar to FIG. 55 but illustrates a "hot-start" situation.
Figure 57:
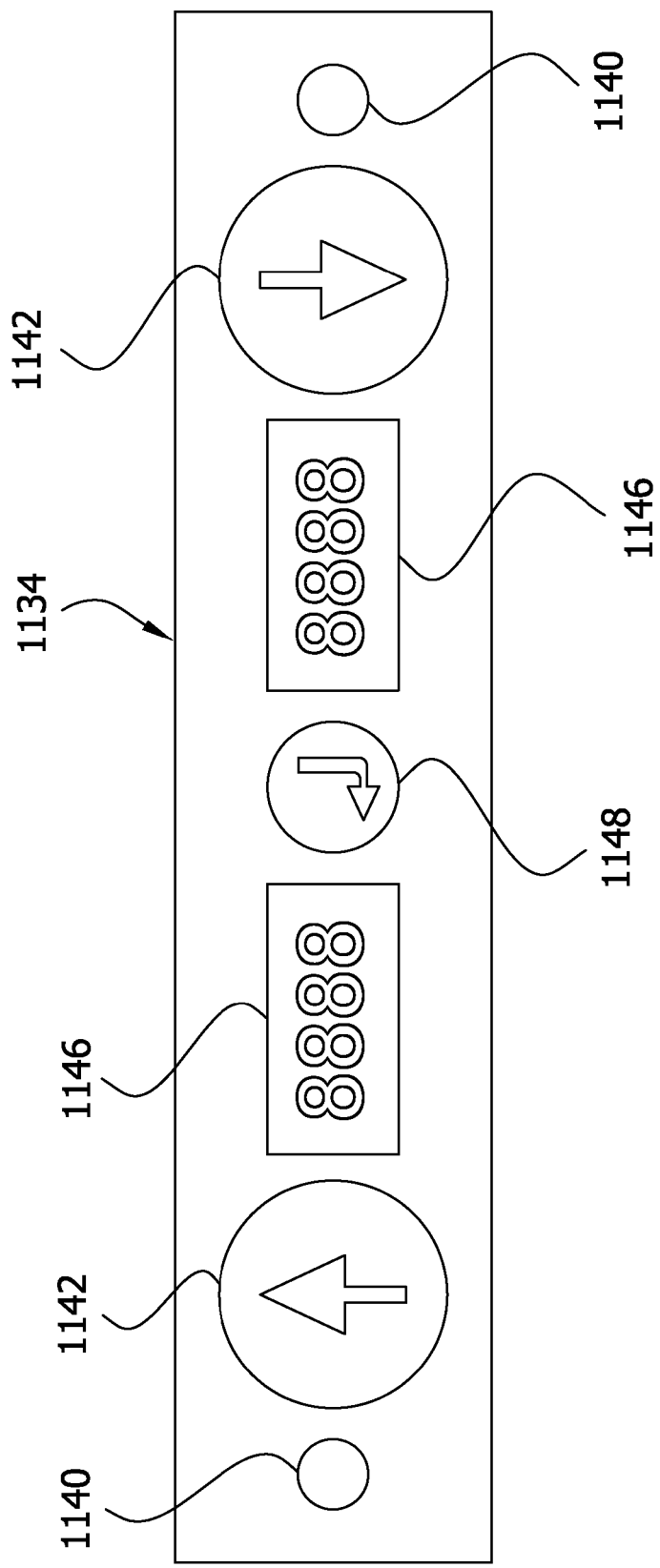
FIG. 57 is a schematic of a keyboard of an input/output device of the control system of FIG. 54.

FIG. 55 illustrates a "cold-start" situation where the heated members of the first and second heating mechanisms 961, 963 are substantially at ambient temperature at the start of the retherm cycle. FIG. 56 illustrates a "hot-start" situation where the first and second heating mechanisms 961, 963 are in a heated condition, such as when a retherm cycle is started shortly after the ending of a previous cycle. Empirically-derived food and heating mechanism temperature curves 1160, 1162 are similar to the curves in FIG. 55, except that the overall time for completing the retherm procedure is somewhat shorter given the fact that less time is required for the first and second heating mechanisms 961, 963 to reach their maximum (peak) temperature.

In one embodiment, the electrical device 1130 of the control system 1100 is an input/output device comprising a keyboard 1134 (FIG. 57) for inputting and displaying information relevant to the operation of the compartments 905. The keyboard 1134 is configured to control the operation of two compartments 905. However, in other embodiments, the keyboard may be configured to control any number of compartments 905, including a single compartment or three or more compartments. The keyboard 1134 includes status lights 1140 for indicating the operational status of respective compartments 905, compartment arrow keys 1142 for respective compartments, displays 1146 (e.g., four-character alphanumeric digital displays) for displaying information relevant to respective compartments, and an enter key 1148 for performing an enter function. The input/output device 1130 is also connected to a timer 1149 (FIG. 54) which may either be part of the controller 1108 or a separate device connected to the controller.

The electrical input/output device 1130 may have other configurations. For example, the input/output device 1130 may include a touchscreen.

An exemplary operation of the control system 1100 will now be described. When the power to the apparatus is turned on, the controller 1108 starts an initialization process during which the heating mechanisms 961, 963 remain de-energized, the keyboard display 1134 shows dashes, the controller 1108 checks for fault conditions, and the controller enters a "ready" mode. In the "ready" mode, the display 1146 associated with each compartment 905 displays certain information, including the "ready" status of the compartment, the number of food packages 135 (sometimes referred to as "bags") in the compartment, and the name of the retherm program selected for the compartment. The status light 1140 remains off.

To begin a retherm cycle, one or more trays (e.g., tray 907), each containing one or more packages of food 135 to be rethermalized, are loaded into respective compartments 905. The arrow key 1142 corresponding to each compartment 905 containing food to be rethermalized is pressed to start a retherm cycle. During rethermalization, the controller 1108 controls the input/output device 1130 to illuminate the status light 1140 to a color (e.g., red) indicating a "retherm" status, and operates the display to display certain information relevant to the status of each compartment, such as the name of the retherm program selected for the compartment, the number of food packages or "bags" 135 in the compartment 905, and a decreasing count of time remaining in the programmed duration of retherm time, as provided by the timing device 1149. Optionally, the controller 1108 may operate the input/output device 1130 or an independent device to emit an audible or visual signal communicating the termination of the retherm cycle for the food in a particular compartment 905. The signal (e.g., audible alarm) may be discontinued, for example, by pressing the arrow key 1142 for that compartment 905, which causes the controller 1108 to enter a "holding" mode. If the arrow key 1142 for a compartment 905 is pressed during the retherm cycle, the program for that compartment 905 is cancelled and the controller 1108 returns to the "ready" mode.

When a holding cycle is initiated, the status light 1140 for that compartment changes color (e.g., to green), and the display 1146 for that compartment displays certain information, such as the name of the retherm program selected for the compartment, the number of food packages or "bags" 135 in the compartment, and an increasing count of time so that an operator can determine how long the food in the compartment has been in a holding mode. Optionally, the controller 1108 may operate the input/output device 1130 or an independent device to emit an audible or visual signal that signals the end of a maximum duration of holding time for the food still in a compartment 905, so that any food remaining in the compartment may be removed for disposal (e.g., discarded). The arrow key 1142 for a compartment 905 may be pressed during the holding cycle to return the compartment to the "ready" mode.

The keyboard 1134 associated with each compartment 905 can also be used to select the appropriate retherm program to be used, and to select the number of packages 135 to be placed in a compartment for rethermalization (e.g., one bag, two bags, three bags, four bags, etc.) The selection process may be carried out by manipulating the different elements on the keyboard 134 (e.g., the arrow and enter keys), as will be understood by those skilled in the programming art. Further information regarding this process and the control system 1100 generally is contained in attached Appendix A incorporated as part of this specification.

In the illustrated embodiment, the input/output device 1130 is used both to input and to display information relevant to the operational status of each compartment 905, such as the mode of operation, the amount of time elapsed or remaining in a particular mode, and the end of a particular mode. Alternatively, a separate device having no input function can be provided for outputting (e.g., displaying) information relevant to the operational status of each compartment.

Having described the above embodiments of the invention in detail, it will be apparent that modifications and variations are possible without departing from the scope of the invention defined in the appended claims. For example, the heating mechanisms 41, 43 can take other forms. Further, one or both heater plates 51, 71 can be guided for movement by suitable guide mechanisms. Similarly, the modular units described above can take other forms.

In view of the above, it will be seen that the several objects of the invention are achieved and other advantageous results attained. For example, the apparatus 1 described above provides for the efficient transfer of heat to the food being rethermalized, without many of the problems associated with conventional rethermalization techniques, such as water bath and steam methods. Further, the thermal treatment for each item of packaged food can be tailored according to need or desire. Also, by rethermalizing the food while it is contained in unopened packaging, evaporation of water from the food and oxidation of the food is prevented for increasing the amount of holding time the food can be maintained in a state of high quality. Still further, the apparatus and methods of this invention can be used to rethermalize both frozen foods and "slacked" food, i.e., food which is chilled but not frozen. Thus there is no need to "slack" frozen food prior to beginning the retherm process. Nor is there any need to transfer the rethermalized food to a separate holding container prior to serving. The rethermed packaged food can simply be maintained in the modular unit until it is ready to be served.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

APPENDIX A

Control Specification Rethermalziation 1.0 General requirements
    1.1 UL (UL Standard 873) and CE (EN 60730-1 and -2-9) spacing requirements.
    1.2 RoHS / WEEE compliant.
    1.3 Control board(s) must be conformal coated or potted.
    1.4 Control board and components operating ambient temperature range 0 to 70 C, 100% RH continuous.
    1.5 Storage temperature range -10 to 70 C, 100% RH.
    1.6 All board connections must be clearly marked and polarized. Each connector will have a unique geometry to prevent incorrect connections.
    1.7 All board connections shall be clearly marked.
    1.8 Control and Status Display Keypads must pass testing.

2.0 Operator interface
    2.1 Keyboard / display module for operator interface.
    2.2 Example illustration below - left side would control unit above, right side would control unit below.
    2.3 Optional configuration would have a display that controls one unit and would not have a second down arrow key and LED light.
    2.4 Optional to have a duplicate display interface on back side of pass through unit.

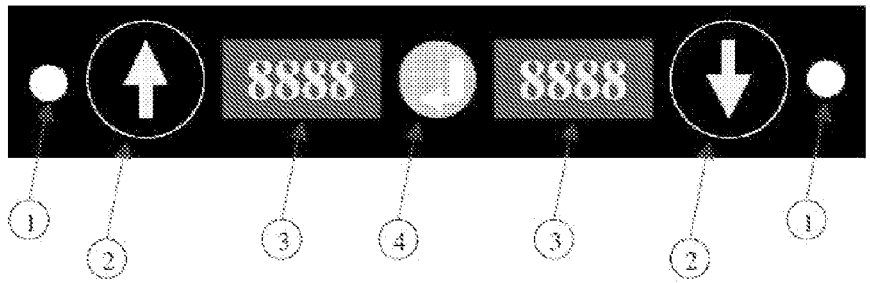

PAN STATUS KEYBOARD 2.5 [1] Status Circular LED light, 2 color switchable, Red & Green
    2.6 [2] Key with pan location arrow graphic
    2.7 [3] Status Display; 4 Character GREEN LED, 14 Segment, 7/16" Height
    2.8 [4] Key with Enter function graphic 3.0 Retherm Program 3.1 Chained events of time and temperature per stored Retherm program (example chart below)

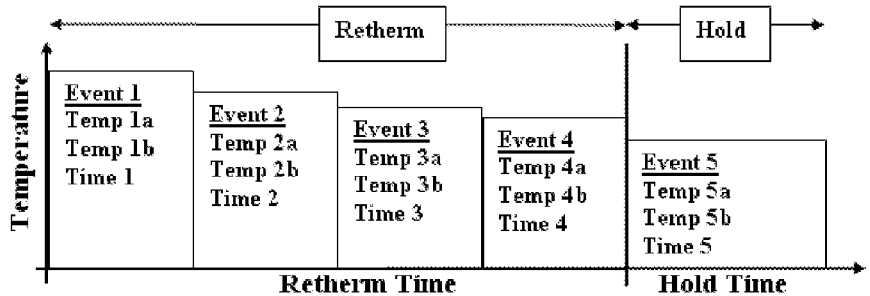

3.2 Configurable programs stored in memory.
3.3 Each program will have 5 events.
3.4 An event may have an event time of zero.
3.5 When a Retherm food program is executed, Event 1, Event 2, and Event 3, etc. are executed in series.
3.6 Each Retherm compartment can independently execute a Retherm food program.
3.7 Each Retherm unit will contain up to 12 Retherm compartments, with top and bottom heating elements in each.

4.0 Operational Description
  4.1 Power on
    4.1.1 Display will show dashes during initialization.
    4.1.2 Check for probe error fault conditions during power on cycle.
    4.1.3 Goto Ready Mode.
  4.2 Ready Mode
    4.2.1 The appliance will switch to Ready Mode when there is no active retherm cycle.
    4.2.2 Each display will scroll through the program name, bag quantity, & REDY every 2 seconds.
    4.2.3 The LED light will be OFF.
    4.2.4 The heaters will be OFF while control is in the Ready Mode.
    4.2.5 The control will allow execution of a retherm cycle.
  4.3 Retherm Mode
    4.3.1 Events 1 thru 4 will be the Retherm Mode, and will be executed when an arrow key is pressed while the compartment is in the Ready Mode.
    4.3.2 The display will scroll through the program name, bag quantity, and retherm time every 2 seconds. The LED light will be flashing RED.
    4.3.3 Optional audible alarm at the end of the retherm mode will pulse 0.5 seconds every 10 seconds. When the arrow key is pressed, the audible alarm will end and the program will enter HOLD mode.
- 4.3.4 The control will execute programmed events in series.
- 4.3.5 If the arrow key is pressed during retherm, the program will be canceled and the control will return to READY mode.
- 4.3.6 Timers default to counting down.

4.4 Hold Mode
- 4.4.1 Event 5 will execute HOLD mode.
- 4.4.2 The display will scroll through the program name, bag quantity, and Time every 2 seconds. The LED light will be GREEN.
- 4.4.3 At the end of HOLD mode, control goes to READY mode.
- 4.4.4 Optional audible alarm at the end of the HOLD mode will pulse 0.5 seconds every 10 seconds. When the arrow key is pressed, the audible alarm will end and the program will enter Ready mode.
- 4.4.5 While in HOLD mode, when the arrow key is pressed the control will return to Ready Mode.
- 4.4.6 Timer default to counting up.

4.5 Program display status
- 4.5.1 Each zone or compartment will have a display of process status.
  - 4.5.1.1 Time Display; MM:SS when < 60 minutes; HH:MM when > 60 minutes
  - 4.5.1.2 Display of Ready state; LED light will be OFF. Display will scroll through the program name, bag quantity & REDY every 2 seconds.
  - 4.5.1.3 Display of Retherm state; flashing RED LED light. Display will scroll through the program name, bag quantity and time every 2 seconds.
  - 4.5.1.4 Display of Hold state; Green LED light on. Display will scroll through program name, bag quantity and time every 2 seconds.

4.6 Display of product identification; 4 user defined characters 4.7 Each zone or compartment will have an operator key press input to accomplish the following;
- 4.7.1 Start & stop retherm process
- 4.7.2 Selecting stored Retherm programs
- 4.7.3 Selecting # of bags being processed (by compartment)
- 4.7.4 Cancel Audible alarms 4.8 Sequence for selecting program and # of bags is as follows:
- 4.8.1 Press and hold up or down arrow for 3 seconds to update corresponding compartment.

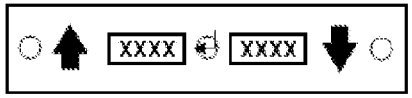

4.8.2 Display will show what product in loaded. Hit up/down arrow to scroll through available products to load where XXXX is the product name. Hit enter once desired product is listed.

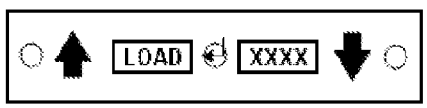

4.8.3 Display will prompt for number of bags. Scroll up/down to change number and hit enter. Use up/down arrow keys to select number of bags where X is the quantity of bags (default to 1) and hit enter. Maximum number of bags allowed = 4.

4.8.4 Display will only accept the maximum number of bags for the product that will fit in the tray. Example, bag quantity can be 1 or 2 for BEEF since only 2 beef will fit in the tray.
4.8.5 The maximum bag qty for each product should be entered in the product manager section of the web based program.
4.8.6 After selecting bag quantity, go to READY mode.

5.0 Time and Temperature parameters
  5.1 Temperature control range shall be from 50-320° F for each event.
  5.2 Time control range shall be from 0-24 hrs, input in minutes and seconds.
  5.3 Timers configurable to count up, down, or off. The timer on the last event will default to counting up. All other timers will default to counting down.
  5.4 Time Display; MM:SS when < 60 minutes; HH:MM when > 60 minutes
  5.5 Temperature control accuracy of +/- 2° F @ 140-320° F.

5.6 The control hysteresis shall be 2 °F. The control output will cycle off at the set point temperature and will cycle back on when the measured temperature drops more than 2 °F below the set point.

5.7 Temperature Offset Function
    5.7.1 Specifies a difference between the measured temperature and the displayed temperature.
    5.7.2 A positive offset parameter means that the displayed temperature will be below the measured temperature by the offset parameter.
    5.7.3 A negative offset parameter means that the displayed temperature will be above the measured temperature by the offset parameter.
    5.7.4 The offset parameter will have a range of -50 to +50 °F
    5.7.5 The default for this parameter is 0 °F 5.8 Temperature Display Function
    5.8.1 The display will be 3 numeric digits.
    5.8.2 °F or °C Parameter – Operator function to change temperature displayed between Fahrenheit (F) and Celsius (C). The default on this parameter is Fahrenheit (F).

6.0 Fault Conditions
  6.1 Under Temperature Fault
    6.1.1 The control will check for this condition during each event.
    6.1.2 An under temperature fault occurs when:
      6.1.2.1 The control senses a temperature that is 20° F lower than the set point for 10 minutes continuous.
    6.1.3 The display will show LOW and the Red circular LED light will be on. Both the display and light will flash at a frequency of 1 Hz.
    6.1.4 The control will not allow the user to load or start a Retherm cycle. An audible alarm will sound if the user tries to start a Retherm cycle. This alarm will consist of a 0.5 second sound pulse each time the key is pressed.
    6.1.5 This fault will self-clear when the temperature reaches the set temperature.

7.0 Diagnostics
  7.1 Sensor Failure
    7.1.1 A sensor failure occurs when the control senses a short circuit or open circuit in the RTD sensor circuit.
    7.1.2 The control will have a ten second delay before it indicates or reacts to a probe error.

7.1.3  The display will show PROB and the Red circular LED light will be on.
7.1.4  Both the display and light will flash at a frequency of 1 Hz.
7.1.5  Program execution will not be allowed.
7.1.6  An audible alarm will sound - the buzzer will sound for a 1 second pulse every 10 seconds. The operator can cancel the audible alarm by pushing the enter button.
7.1.7  The display will continue to show PROB and the Red circular LED light will be on.
7.1.8  The control shall remove power to both heaters on the channel in a sensor fault condition.
7.1.9  This fault can self-clear if the fault condition corrects itself.

What is claimed is:

1. A method of rethermalizing a package of refrigerated or frozen food and then holding the package of food at a selected holding temperature for a duration of holding time, said package of food comprising a portion of food contained in a flexible packaging material, the method comprising
   placing said package of food between opposing first and second heating mechanisms,
   moving the first heating mechanism toward the second heating mechanism to bring the heating mechanisms into conductive heat transfer contact with respective first and second surfaces of the package, and
   operating the first and second heating mechanisms in a rethermalizing mode for a duration of rethermalizing time during which the food is heated to a rethermalized temperature,
   after the food has reached said rethermalized temperature, operating the first and second heating mechanisms in a holding mode while the heating mechanisms are in conductive heat transfer contact with the package to hold the food at a selected holding temperature for a duration of holding time, and
   operating an electrical input/output device to display information relating to the operation of the heating mechanisms in said rethermalizing and holding modes.

2. The method of claim 1, wherein said displayed information comprises a decreasing count of time remaining in said duration of rethermalizing time and an increasing count of time in said duration of holding time.

3. The method of claim 1, further comprising audibly or visually signaling the end of said duration of rethermalizing time.

4. The method of claim 3, further comprising audibly or visually signaling the end of said duration of holding time.

5. The method of claim 1, further comprising operating at least one of the first and second heating mechanisms during an interval of said rethermalizing mode at a temperature above a softening temperature of said flexible packaging material.

6. The method of claim 1, further comprising operating at least one of the first and second heating mechanisms during an interval of said rethermalizing mode at a temperature at least 20% higher than said holding temperature.

7. Apparatus for rethermalizing a package of refrigerated or frozen food and then holding the food in the package at a selected holding temperature for a duration of holding time, said package of food comprising a portion of food contained in a flexible packaging material, the apparatus comprising
   opposing first and second heating mechanisms, the first heating mechanism being movable toward the second heating mechanism to bring the heating mechanisms into conductive heat transfer contact with respective first and second surfaces of the package,
   an electrical device for operating the first and second heating mechanisms,
   a tangible computer-readable storage medium having instructions for operating the first and second heating mechanisms in a rethermalizing mode for a duration of rethermalizing time during which the food is heated to a rethermalized temperature, and then in a holding mode while the heating mechanisms are in conductive heat transfer contact with the package to hold the food at a selected holding temperature for a duration of holding time,
   a controller connected to said storage medium for executing the instructions and connected to the electrical device for controlling the electrical device, and
   an input/output device for inputting and displaying information relating to the operation of the heating mechanisms in said rethermalizing and holding modes.

8. The apparatus of claim 7, wherein said input/output device comprises a display device that displays a decreasing count of time remaining in said duration of rethermalizing time and an increasing count of time in said duration of holding time.

9. The apparatus of claim 7, wherein said input/output device comprises an audible or visual signal that signals the end of said duration of rethermalizing time.

10. The apparatus of claim 9, wherein said input/output device comprises an audible or visual signal that signals the end of said duration of holding time.

11. The apparatus of claim 7, wherein the tangible computer-readable storage medium has instructions for operating the first and second heating mechanisms for an interval during said rethermalizing mode at a temperature above a softening temperature of said flexible packaging material.

12. A method of rethermalizing a package of refrigerated or frozen food, said package of food comprising a portion of food contained in a flexible synthetic resin packaging material having a softening temperature, the method comprising
   placing said package of food between opposing first and second heating mechanisms,
   moving the first heating mechanism toward the second heating mechanism to bring the heating mechanisms into conductive heat transfer contact with respective first and second surfaces of the package, and
   operating the first and second heating mechanisms for a duration of rethermalizing time during which the food is heated to a rethermalized temperature,
   said duration of rethermalizing time comprising a first interval during which the first heating mechanism is heated to a first rethermalizing temperature greater than said softening temperature and a second interval following the first interval during which the first heating mechanism is heated to a second rethermalizing temperature less than said softening temperature but greater than said rethermalized temperature.

13. The method of claim 12, further comprising continuing to operate the first and second heating mechanisms after the food in the package has reached said rethermalized temperature to hold the food in the package at a selected holding temperature for a duration of holding time.

14. The method of claim 12, wherein said first rethermalizing temperature is at least 10 degrees F. greater than said softening temperature.

15. Apparatus for rethermalizing a package of refrigerated or frozen food, said package of food comprising a portion of food contained in a flexible synthetic resin packaging material having a softening temperature, said apparatus comprising
   opposing first and second heating mechanisms, the first heating mechanism being movable toward the second heating mechanism to bring the heating mechanisms into conductive heat transfer contact with respective first and second surfaces of the package,
   an electrical device for operating the first and second heating mechanisms,
   a tangible computer-readable storage medium having instructions for operating the first and second heating mechanisms for a duration of rethermalizing time during which the food is heated to a rethermalized temperature,
   said duration of rethermalizing time comprising a first interval during which the first heating mechanism is heated to a first rethermalizing temperature greater than said softening temperature and a second interval following the first interval during which the first heating mechanism is heated to a second rethermalizing temperature less than said softening temperature but greater than said rethermalized temperature, and a controller connected to said storage medium for executing the instructions and connected to the electrical device for controlling the electrical device.

16. The apparatus of claim 15, wherein said instructions further comprise operating the first and second heating mechanisms to hold the food in the package at a selected holding temperature for a duration of holding time after the food in the package has reached said rethermalized temperature.

17. The apparatus of claim 15, wherein said first rethermalizing temperature is at least 10 degrees F. greater than said softening temperature.

18. A method of rethermalizing a package of refrigerated or frozen food, said package of food comprising a portion of food contained in a packaging material, the method comprising placing said package of food between opposing first and second heating mechanisms, moving the first heating mechanism toward the second heating mechanism to bring the heating mechanisms into conductive heat transfer contact with respective first and second surfaces of the package, and operating the first and second heating mechanisms for a duration of rethermalizing time during which the food is heated to a rethermalized temperature, said duration of rethermalizing time comprising a first interval during which the first heating mechanism is heated to a first rethermalizing temperature at least 20% greater than said rethermalized temperature, and a second interval following the first interval during which the first heating mechanism is heated to a second rethermalizing temperature less than said first rethermalizing temperature but greater than said rethermalized temperature.

19. The method of claim 18, wherein said packaging material is a thermoplastic synthetic resin material.

20. The method of claim 18, wherein said packaging material is a thermoset synthetic resin material.

21. The method of claim 18, wherein said packaging material is a metal foil.

* * * * *